US011323933B2

(12) United States Patent
Chong et al.

(10) Patent No.: US 11,323,933 B2
(45) Date of Patent: May 3, 2022

(54) NETWORK HANDOVER METHOD AND NETWORK DEVICE

(71) Applicant: Huawei Technologies Co., Ltd., Shenzhen (CN)

(72) Inventors: Weiwei Chong, Shanghai (CN); Xiaobo Wu, Shanghai (CN); Yang Xin, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 28 days.

(21) Appl. No.: 17/085,714

(22) Filed: Oct. 30, 2020

(65) Prior Publication Data
US 2021/0051552 A1 Feb. 18, 2021

Related U.S. Application Data

(63) Continuation of application No. 16/198,219, filed on Nov. 21, 2018, now Pat. No. 10,939,345, which is a (Continued)

(30) Foreign Application Priority Data

Jul. 14, 2017 (CN) .......................... 201710577345.7
Aug. 14, 2017 (CN) .......................... 201710693995.8

(51) Int. Cl.
*H04W 36/12* (2009.01)
*H04W 76/12* (2018.01)
(Continued)

(52) U.S. Cl.
CPC ....... *H04W 36/12* (2013.01); *H04W 36/0022* (2013.01); *H04W 60/00* (2013.01); *H04W 76/12* (2018.02)

(58) Field of Classification Search
CPC . H04W 76/12; H04W 36/00; H04W 36/0011; H04W 36/0016; H04W 36/0022;
(Continued)

(56) References Cited

U.S. PATENT DOCUMENTS

| 2011/0002267 | A1 | 1/2011 | Dwyer et al. |
| 2012/0014324 | A1 | 1/2012 | Dwyer et al. |

(Continued)

FOREIGN PATENT DOCUMENTS

| CN | 101291453 A | 10/2008 |
| CN | 101453719 A | 6/2009 |

(Continued)

OTHER PUBLICATIONS

3rd Generation Partnership Project; Technical Specification Group Services and System Aspects; Architectural requirements (Release 14), 3GPP TS 23.221 V14.1.0 (Dec. 2016), 52 pages.
(Continued)

*Primary Examiner* — Peter Chen
(74) *Attorney, Agent, or Firm* — Slater Matsil, LLP

(57) ABSTRACT

This application discloses a network handover method and a network device. The method includes: receiving, by a first access network device, first session management information from a session management network element, where the first session management information is for requesting to set up a user plane tunnel for a voice service of a terminal device; and sending, by the first access network device, a handover request to a first mobility management network element based on the first session management information and a first condition, where the handover request is for handing over the terminal device from a first network to a second network, and the first condition includes that the (Continued)

voice service cannot be performed in the first network. This application is applicable to the field of communication technologies.

17 Claims, 26 Drawing Sheets

Related U.S. Application Data continuation of application No. PCT/CN2018/091759, filed on Jun. 19, 2018.

(51) Int. Cl.
*H04W 60/00* (2009.01)
*H04W 36/00* (2009.01)

(58) Field of Classification Search
CPC ... H04W 36/12; H04W 36/125; H04W 36/16; H04W 60/00
See application file for complete search history.

(56) References Cited

U.S. PATENT DOCUMENTS

| | | |
|---|---|---|
| 2013/0128865 A1 | 5/2013 | Wu et al. |
| 2013/0337804 A1 | 12/2013 | Boulos |
| 2014/0126540 A1 | 5/2014 | Lindholm et al. |
| 2015/0024751 A1 | 1/2015 | Wong et al. |
| 2015/0181470 A1 | 6/2015 | Chai et al. |
| 2015/0365851 A1 | 12/2015 | Wang et al. |
| 2016/0183156 A1 | 6/2016 | Chin et al. |
| 2016/0249257 A1 | 8/2016 | Wu et al. |
| 2016/0309439 A1 | 10/2016 | Wu et al. |
| 2017/0034749 A1 | 2/2017 | Chandramouli et al. |
| 2017/0195935 A1 | 7/2017 | Xu et al. |
| 2017/0311151 A1 | 10/2017 | Ohashi et al. |
| 2018/0132141 A1 | 5/2018 | Huang-Fu et al. |
| 2018/0139670 A1 | 5/2018 | Shaw et al. |
| 2018/0343635 A1 | 11/2018 | Edge et al. |
| 2019/0007877 A1* | 1/2019 | Keller ............... H04W 36/32 |
| 2020/0015128 A1* | 1/2020 | Stojanovski ...... H04W 36/0022 |
| 2020/0112894 A1* | 4/2020 | Koshimizu ........... H04W 36/14 |

FOREIGN PATENT DOCUMENTS

| | | |
|---|---|---|
| CN | 101472313 A | 7/2009 |
| CN | 101841836 A | 9/2010 |
| CN | 101931859 A | 12/2010 |
| CN | 102378295 A | 3/2012 |
| CN | 102387557 A | 3/2012 |
| CN | 102461276 A | 5/2012 |
| CN | 102883309 A | 1/2013 |
| CN | 102984770 A | 3/2013 |
| CN | 103190187 A | 7/2013 |
| CN | 103313334 A | 9/2013 |
| CN | 104010324 A | 8/2014 |
| CN | 104254111 A | 12/2014 |
| CN | 106465080 A | 2/2017 |
| CN | 106549928 A | 3/2017 |
| CN | 109041149 B | 1/2020 |
| EP | 2803225 A1 | 11/2014 |
| EP | 3079388 A1 | 10/2016 |
| JP | 2013501388 A | 1/2013 |
| JP | 2014522150 A | 8/2014 |
| RU | 2597254 C2 | 9/2016 |
| WO | 2014036338 A2 | 3/2014 |
| WO | 2015062087 A1 | 5/2015 |
| WO | 2015100608 A1 | 7/2015 |
| WO | 2016053435 A1 | 4/2016 |
| WO | 2016185962 A1 | 11/2016 |

OTHER PUBLICATIONS

3rd Generation Partnership Project; Technical Specification Group Services and System Aspects; System Architecture for the 5G System; Stage 2 (Release 15), 3GPP TS 23.501 V1.0.0 (Jun. 2017), 146 pages.

3rd Generation Partnership Project; Technical Specification Group Services and System Aspects; Procedures for the 5G System; Stage 2 (Release 15), 3GPP TS 23.502 V0.4.0 (May 2017), 126 pages.

China Mobile, "5GC support of T-ADS for IMS voice service," SA WG2 Meeting #122, S2-175065, Jun. 26-30, 2017, San Jose Del Cabo, Mexico, 2 pages.

Firstnet et al., "New Clause 4.13.X Mission Critical Services," SA WG2 Meeting #122, S2-174341, San Jose Del Cabo, Mexico, Jun. 26-30, 2017, 7 pages.

Intel et al., "EPS fallback," SA WG2 Meeting #122, S2-174550, Jun. 26-30, 2017, San Jose Del Cabo, Mexico, 4 pages.

Intel et al., "EPS fallback," SA WG2 Meeting #122, S2-174552, Jun. 26-30, 2017, San Jose Del Cabo, Mexico, 2 pages.

Mediatek Inc., "RAT/EPS Fallback for IMS Multimedia calls [online]", 3GPP TSG SA WG2#118, S2-166581, http://www.3gpp.org/ftp/tsg_sa/WG2_Arch/TSGS2_118_Reno/Docs/S2-166581.zip, Nov. 10, 2016, 16 pages.

NTT Docomo, "TS 23.501: IMS Supported Indicator," SA WG2 Meeting #122, S2-174531, Jun. 26-30, 2017, San Jose Del Cabo, Mexico, 3 pages.

Qualcomm Incorporated, "TS 23.501: Voice Domain selection for 5GS", SA WG2 Meeting #121, SA WG3 Temporary Document, S2-173126, May 15-19, 2017, Hangzhou, P.R. China, 5 pages.

Qualcomm Incorporated, "TS 23.501: Idle camping priority for voice and fallback to E-UTRA," SA WG2 Meeting #122, S2-174459, Jun. 26-30, 2017, San Jose Del Cabo, Mexico, 4 pages.

Qualcomm Incorporated, "TS 23.502: Idle camping priority for voice and fallback to E-UTRA procedures," SA WG2 Meeting #122, S2-174460, Jun. 26-30, 2017, San Jose Del Cabo, Mexico, 9 pages.

SP-170384-S2-174079, Cover Sheet for TS 23501 SA WG2, "Presentation of TR 23.501: System Architecture for the 5G System (Release 15) to TSG SA for Approval," 3GPP TSG SA Meeting #76, Jun. 7-9, 2017, West Palm Beach, Florida, USA, 2 pages.

3GPP TR 24.890 V0.2.1 (Jun. 2017), 3rd Generation Partnership Project; Technical Specification Group Core Network and Terminals, 5G System Phase 1, CT WG1 Aspects (Release 15), Jun. 2017, 71 pages, XP51450219.

3rd Generation Partnership Project; Technical Specification Group Services and System Aspects; Procedures for the 5G System; Stage 2 (Release 15), 3GPP TS 23.502 V0.2.0 (Feb. 2017), 71 pages.

Firstnet et al., "New Clause 4.13.X Mission Critical Services", SA WG2 Meeting #122 S2-175069, Jun. 26-30, 2017, San Jose Del Cabo, Mexico, 7 pages.

Ericsson, "Handover procedure", SA WG2 Meeting #120, S2-172713, Busan, Korea, Mar. 27-31, 2017, 5 pages.

Huawei et al., "TS 23.502: Handling PDU sessions rejected by RAN during handover", SA WG2 Meeting #121, S2-173138, Hangzhou, P. R. China, May 15-19, 2017, 10 pages.

3rd Generation Partnership Project; Technical Specification Group Services and System Aspects; Circuit Switched (CS) fallback in Evolved Packet System (EPS); Stage 2 (Release 13), 3GPP TS 23.272 V13.4.0 (Jun. 2016), 103 pages.

* cited by examiner

NETWORK HANDOVER METHOD AND NETWORK DEVICE

CROSS-REFERENCE TO RELATED APPLICATIONS

This application is a continuation of U.S. patent application Ser. No. 16/198,219, filed on Nov. 21, 2018, which is a continuation of International Application No. PCT/CN2018/091759, filed on Jun. 19, 2018, which claims priority to Chinese Patent Application No. 201710577345.7, filed on Jul. 14, 2017, and Chinese Patent Application No. 201710693995.8, filed on Aug. 14, 2017. All of the aforementioned patent applications are hereby incorporated by reference in their entireties.

TECHNICAL FIELD

This application relates to the field of communication technologies, and in particular, to a network handover method and a network device.

BACKGROUND

Currently, on one hand, many operators have not intended or do not intend to deploy an Internet Protocol Multimedia Subsystem (IMS) voice service in a fifth-generation (5G) wireless communications system. On the other hand, most frequency spectrums in a 5G network are on high frequency bands, a high frequency signal has small coverage, while the IMS voice service requires relatively large signal coverage. Consequently, a terminal device in the 5G network cannot perform the IMS voice service.

SUMMARY

Embodiments of this application provide a network handover method and apparatus, to resolve a problem that a terminal device cannot perform an IMS voice service.

To achieve the foregoing objective, the embodiments of this application provide the following technical solutions.

According to a first aspect, a network handover method is provided. The method includes: receiving, by a first access network device, first session management information from a session management network element, where the first session management information is for requesting to set up a user plane tunnel for a voice service of a terminal device; and sending, by the first access network device, a handover request to a first mobility management network element based on the first session management information and a first condition, where the handover request is for handing over the terminal device from a first network to a second network, and the first condition includes that the voice service cannot be performed in the first network.

In the method according to the first aspect, when the terminal device in the first network performs a voice service, the terminal device may be handed over to the second network, so that the terminal device may perform the voice service in the second network, to resolve a problem that the terminal device in the first network cannot perform the voice service.

In a possible design, the first condition further includes at least one of that the second network supports the voice service, that signal quality of the second network satisfies a requirement of the voice service, and a network device of the first network and the terminal device supports handover between the first network and the second network.

In a possible design, the method further includes: sending, by the first access network device, second session management information to the session management network element, where the second session management information includes information indicating that setup of the user plane tunnel of the voice service is accepted. In such possible design, a network element in the first network sets up the user plane tunnel for the voice service of the terminal device.

In a possible design, before the sending, by the first access network device, second session management information to the session management network element, the method further includes: determining, by the first access network device based on the first session management information and the first condition, not to allocate a radio resource to the user plane tunnel of the voice service. In such possible design, a network element in the first network sets up the user plane tunnel for the voice service of the terminal device.

In a possible design, the method further includes: sending, by the first access network device, third session management information to the session management network element, where the third session management information includes information indicating that setup of the user plane tunnel of the voice service is rejected. In such possible design, after the terminal device completes handover from the first network to the second network, a network element in the second network sets up the user plane tunnel for the voice service of the terminal device.

In a possible design, the information indicating that setup of the user plane tunnel of the voice service is rejected includes reason information indicating rejection. In such possible design, after the terminal device completes handover from the first network to the second network, a network element in the second network sets up the user plane tunnel for the voice service of the terminal device.

In a possible design, the reason information is that the terminal device is performing a handover process. In such possible design, after the terminal device completes handover from the first network to the second network, a network element in the second network sets up the user plane tunnel for the voice service of the terminal device.

In a possible design, the first condition further includes that the voice service cannot be performed in the second network, and the method further includes: sending, by the first access network device, fourth session management information to the session management network element, where the fourth session management information includes information indicating that setup of the user plane tunnel of the voice service is rejected, and the information indicating that setup of the user plane tunnel of the voice service is rejected includes that a radio resource is insufficient. In such possible design, after the terminal device completes handover from the first network to the second network, a network element in the second network does not set up the user plane tunnel for the voice service of the terminal device.

According to a second aspect, a network handover method is provided. The method includes: receiving, by a session management network element, third session management information sent from a first access network device, where the third session management information includes reason information indicating that setup of a user plane tunnel of a voice service of a terminal device is rejected; determining, by the session management network element, that the terminal device has handed over from a first network to a second network; and setting up, by the session management network element, the user plane tunnel for the voice service in the second network based on the reason information.

In the method according to the second aspect, when the terminal device in the first network is handed over from the first network to the second network, the session management network element sets up the user plane tunnel for the voice service in the second network based on the reason information, and if the voice service may be performed in the second network, the user plane tunnel may be set up successfully, so that the terminal device may perform the voice service in the second network, to resolve a problem that the terminal device in the first network cannot perform the voice service.

In a possible design, the reason information is that the terminal device is performing a handover process.

In a possible design, the setting up, by the session management network element, the user plane tunnel for the voice service in the second network based on the reason information includes: setting up, by the session management network element, the user plane tunnel for the voice service in the second network after a first preset period based on the reason information and a second condition, where the second condition includes that the voice service cannot be performed in the second network. In such possible design, the first preset period is reserved for the terminal device to complete joint registration, and by properly setting the first preset period, after completing the joint registration, the terminal device may initiate a CSFB call, thereby ensuring that the terminal device successfully initiates the CSFB call.

In a possible design, the setting up, by the session management network element, the user plane tunnel for the voice service in the second network after a first preset period based on the reason information and a second condition includes: sending, by the session management network element, a tunnel setup request to a serving gateway of the second network after the first preset period based on the reason information and the second condition, where the tunnel setup request is for requesting to set up the user plane tunnel of the voice service.

In a possible design, the setting up, by the session management network element, the user plane tunnel for the voice service in the second network after a first preset period based on the reason information and a second condition includes: sending, by the session management network element, a tunnel setup request to a serving gateway of the second network based on the reason information, where the tunnel setup request is for requesting to set up the user plane tunnel of the voice service; receiving, by the session management network element, a tunnel setup response sent from the serving gateway, where the tunnel setup response includes information indicating that setup of the user plane tunnel of the voice service is rejected; and sending, by the session management network element, a first message to a policy function control network element after the first preset period based on the second condition, where the first message is for indicating that setup of the user plane tunnel of the voice service fails.

According to a third aspect, a network handover method is provided. The method includes: receiving, by a second mobility management network element, a tunnel setup request sent by a serving gateway, where the tunnel setup request is for requesting to set up a user plane tunnel of a voice service for a terminal device; and sending, by the second mobility management network element, a tunnel setup response to the serving gateway based on a second condition, where the tunnel setup response includes information indicating that setup of the user plane tunnel of the voice service of the terminal device is rejected, and the second condition includes that the voice service cannot be performed in a second network.

In the method according to the third aspect, when the voice service cannot be performed in the second network, the second mobility management network element sends the tunnel setup response to the serving gateway, so that the serving gateway transfers, to an IMS network, the information indicating that setup of the user plane tunnel is rejected, so that the IMS network may trigger a CSFB service of the terminal device, and then the terminal device performs a CS voice service.

In a possible design, the second condition further includes that the terminal device is a terminal device handed over from a first network to the second network.

In a possible design, before the sending, by the second mobility management network element, a tunnel setup response to the serving gateway based on a second condition, the method further includes: determining, by the second mobility management network element, that the terminal device completes joint registration. Such possible design may ensure that the terminal device successfully initiates a CSFB call.

In a possible design, the determining, by the second mobility management network element, that the terminal device completes joint registration includes: determining, by the second mobility management network element, that a joint registration complete message from the terminal device is received.

According to a fourth aspect, a network handover method is provided. The method includes: sending, by a second mobility management network element, a radio tunnel setup request to a second access network device, where the radio tunnel setup request is for requesting to set up a user plane tunnel for a voice service of a terminal device; receiving, by the second mobility management network element, a radio tunnel setup response sent by the second access network device, where the radio tunnel setup response includes information indicating that setup of the user plane tunnel of the voice service of the terminal device is rejected; and sending, by the second mobility management network element, a tunnel setup response to the serving gateway based on a second condition, where the tunnel setup response includes the information indicating that setup of the user plane tunnel of the voice service of the terminal device is rejected, and the second condition includes that the voice service cannot be performed in a second network.

In the method according to the fourth aspect, the second mobility management network element sends, to the serving gateway, the information indicating that setup of the user plane tunnel is rejected, so that the serving gateway transfers, to an IMS network, the information indicating that setup of the user plane tunnel is rejected, the IMS network may trigger a CSFB service of the terminal device, and then the terminal device performs a CS voice service.

In a possible design, the second condition further includes that the terminal device is a terminal device handed over from a first network to the second network.

In a possible design, the sending, by the second mobility management network element, a tunnel setup response to the serving gateway based on a second condition includes: determining, by the second mobility management network element, that the second condition is satisfied and the terminal device completes joint registration; and sending, by the second mobility management network element, the tunnel setup response to the serving gateway. Such possible design may ensure that the terminal device successfully initiates a CSFB call.

In a possible design, the determining, by the second mobility management network element, that the terminal device completes joint registration includes: determining, by the second mobility management network element, that a registration complete message from the terminal device is received.

According to a fifth aspect, a network handover method is provided. The method includes: receiving, by a second mobility management network element, a tunnel setup request sent by a serving gateway, where the tunnel setup request is for requesting to set up a user plane tunnel of a voice service for user equipment, namely, a terminal device; if a second condition is satisfied, determining, by the second mobility management network element, that the terminal device completes joint registration, where the second condition includes that the voice service cannot be performed in a second network; sending, by the second mobility management network element, a radio tunnel setup request to a second access network device, where the radio tunnel setup request is for requesting to set up the user plane tunnel for the voice service of the terminal device; receiving, by the second mobility management network element, a radio tunnel setup response sent by the second access network device, where the radio tunnel setup response includes information indicating that setup of the user plane tunnel of the voice service of the terminal device is rejected; and sending, by the second mobility management network element, a tunnel setup response to the serving gateway based on the radio tunnel setup response, where the tunnel setup response includes the information indicating that setup of the user plane tunnel of the voice service of the terminal device is rejected.

In the method according to the fifth aspect, after determining that the terminal device completes joint registration, the second mobility management network element sends, to the serving gateway, the information indicating that setup of the user plane tunnel is rejected, so that the serving gateway transfers, to an IMS network, the information indicating that setup of the user plane tunnel is rejected, the IMS network may trigger a CSFB service of the terminal device, and then the terminal device performs a CS voice service, to further ensure that the terminal device successfully initiates a CSFB call.

In a possible design, the second condition further includes that the terminal device is a terminal device handed over from a first network to the second network.

In a possible design, the determining, by the second mobility management network element, that the terminal device completes joint registration includes: determining, by the second mobility management network element, that a registration complete message sent by the terminal device is received.

According to a sixth aspect, a network handover method is provided. The method includes: receiving, by a second access network device, a radio tunnel setup request sent by a second mobility management network element, where the radio tunnel setup request is for requesting the second access network device to set up a user plane tunnel of a voice service for a terminal device; and sending, by the second access network device, a radio tunnel setup response to the second mobility management network element based on a second condition, where the radio tunnel setup response includes information indicating that setup of the user plane tunnel of the voice service is rejected, and the second condition includes that the voice service cannot be performed in a second network.

In the method according to the sixth aspect, when the voice service cannot be performed in the second network, the second access network device rejects allocating a radio resource to the user plane tunnel, adds, to the radio tunnel setup response, the information indicating that setup of the user plane tunnel of the voice service is rejected, and sends the radio tunnel setup response to the second mobility management network element, and the second mobility management network element may transfer, to an IMS network, the information indicating that setup of the user plane tunnel is rejected, so that the IMS network triggers a CSFB service of the terminal device, and then the terminal device performs a CS voice service.

In a possible design, the second condition further includes that the terminal device is a terminal device handed over from a first network to the second network.

According to a seventh aspect, a network handover method is provided. The method includes: receiving, by an IMS network element, a request message for setting up a voice service for a terminal device in a PS domain; determining, by the IMS network element, that a voice service cannot be set up in a PS domain of a first network or a second network; determining, by the IMS network element, that the terminal device completes joint registration; and triggering, by the IMS network element, a CSFB service of the terminal device.

In the method according to the seventh aspect, when determining that a voice service cannot be set up in the PS domain of the first network or the second network, and the terminal device completes joint registration, the IMS network element triggers the CSFB service of the terminal device. Because that the terminal device completes joint registration is a necessary condition on which the terminal device initiates a CSFB call, the method according to the seventh aspect may further ensure that the terminal device successfully initiates the CSFB call, so that the terminal device performs a CS voice service.

In a possible design, after the receiving, by an IMS network element, a request message for setting up a voice service for a terminal device in a PS domain, the method further includes: determining, by the IMS network element that the terminal device is registered with the first network.

In a possible design, the determining, by the IMS network element, that a voice service cannot be set up in a PS domain of a first network or a second network includes: obtaining, by the IMS network element, voice service setup failure information that is from the PS domain of the first network; or obtaining, by the IMS network element, voice service setup failure information that is from the PS domain of the second network.

In a possible design, the determining, by the IMS network element, that the terminal device completes joint registration includes: after a second preset period since the IMS network element determines that the voice service cannot be set up in the PS domain of the first network or the second network, determining, by the IMS network element, that the terminal device completes joint registration; or determining, by the IMS network element based on registration location information of the terminal device obtained from a policy control network element or a home subscriber server, that the terminal device completes joint registration.

In a possible design, the terminal device is a calling terminal device of the voice service, and the triggering, by the IMS network element, a CSFB service of the terminal device includes: sending, by the IMS network element, a second message to the calling terminal device, where the second message is for triggering the calling terminal device to initiate a CSFB calling service.

In a possible design, the terminal device is a called terminal device of the voice service, and the triggering, by the IMS network element, a CSFB service of the terminal device includes: sending, by the IMS network element, a third message to a terminating access domain selection device, where the third message is for indicating that setup of a called voice service in the PS domain of the first network or the second network fails, so that the terminating access domain selection device triggers a CSFB called voice service of the called terminal device.

According to an eighth aspect, a network handover method is provided. The method includes: receiving, by a second mobility management network element, a fourth message sent by a first mobility management network element, where the fourth message is for determining that a terminal device completes relocation; and sending, by the second mobility management network element, a tunnel modification request to a serving gateway based on a second condition, where the tunnel modification request is for modifying signaling plane tunnel information of a voice service of the terminal device, and the second condition includes that the voice service cannot be performed in a second network.

In the method according to the eighth aspect, when the voice service cannot be performed in the second network, the second mobility management network element sends the tunnel modification request to the serving gateway, the serving gateway forwards the tunnel modification request to a session management network element, and because only after receiving the tunnel modification request, the session management network element sends, to the terminal device, a message (that is, the following second message) for triggering the terminal device to initiate a CSFB call, in the method according to the eighth aspect, the terminal device may be triggered to initiate the CSFB call when the voice service cannot be performed in the second network, so that the terminal device performs a CS voice service.

In a possible design, the sending, by the second mobility management network element, a tunnel modification request to a serving gateway based on a second condition includes: determining, by the second mobility management network element, that the second condition is satisfied and the UE completes joint registration; and sending, by the second mobility management network element, the tunnel modification request to the serving gateway. Such possible design may ensure that the terminal device successfully initiates a CSFB call.

According to a ninth aspect, a network registration method is provided. The method includes: receiving, by a first mobility management network element, a registration request from a terminal device, where the registration request is for requesting to register the terminal device with a first network; and sending, by the first mobility management network element, first indication information to the terminal device if a third condition is satisfied, where the first indication information is for indicating that a voice service of a PS domain is supported, and the third condition includes that the first network supports movement of the terminal device to a second network. In the method according to the ninth aspect, regardless of whether the first network supports the voice service of the terminal device, provided that the first network has a capability of enabling, in a handover or another manner, the terminal device to fall back to a network that can provide the voice service when the terminal device initiates the voice service, when the terminal device is registered with the first network, the first mobility management network element indicates that the voice service in the PS domain of the terminal device is supported, thereby ensuring that the terminal device is registered with and camps on the first network and does not reselect another network, thereby saving network resources, and ensuring that the terminal device normally performs a PS domain voice service registration process and initiates a PS domain voice call process by using the first network.

In a possible design, the first network and the second network have a same core network and different access types; or the first network and the second network have different core networks and different access types.

In a possible design, that the first network supports movement of the terminal device to a second network includes that a first access network device in the first network supports, when receiving first session management information from a session management network element, access of the terminal device to the second network, where the first session management information is for requesting to set up a user plane tunnel for the voice service of the terminal device.

In a possible design, the third condition further includes at least one of that a handover interoperation is supported between the first network and the second network, and that the second network can support the voice service of the PS domain.

In a possible design, that a handover interoperation is supported between the first network and the second network includes that a handover interoperation interface exists between the first network and the second network.

In a possible design, before the sending, by the first mobility management network element, first indication information to the terminal device, the method further includes: determining, by the first mobility management network element, that the terminal device is a voice service centric terminal device. Because a data service centric terminal device is unrelated to the voice service, the optional method may distinguish terminal types. The data service centric terminal device does not need to perform this set of solution, that is, does not need to determine whether the third condition is satisfied, and does not need to send the first indication information either.

In a possible design, the registration request carries indication information indicating that the terminal device is a voice service centric terminal device, and the determining, by the first mobility management network element, that the terminal device is a voice service centric terminal device includes: determining, by the first mobility management network element based on the registration request, that the terminal device is a voice service centric terminal device.

In a possible design, before the sending, by the first mobility management network element, first indication information to the terminal device, the method further includes: determining, by the first mobility management network element, that the terminal device supports movement from the first network to the second network in a voice service initiation process and continuity of the voice service initiation process by using the second network. Because the method according to the first aspect may be implemented only when the terminal device supports movement from the first network to the second network in a voice service initiation process and continuity of the voice service initiation process by using the second network, the information may be determined in advance, to avoid impact on a terminal device that cannot support movement from the first network to the second network in a voice service initiation process and continuity of the voice service initiation process by using the second network.

In a possible design, the registration request further carries indication information indicating that the terminal device supports movement from the first network to a second network in a voice service initiation process and continuity of the voice service initiation process by using the second network, and the determining, by the first mobility management network element, that the terminal device supports movement from the first network to the second network in a voice service initiation process and continuity of the voice service initiation process by using the second network includes: determining, by the first mobility management network element based on the registration request, that the terminal device supports movement from the first network to the second network in a voice service initiation process and continuity of the voice service initiation process by using the second network.

According to a tenth aspect, a network registration method is provided. The method includes: generating, by a terminal device, a registration request, where the registration request is for requesting to register the terminal device with a first network, and the registration request carries indication information indicating that the terminal device is a voice service centric terminal device; and sending, by the terminal device, the registration request to the first mobility management network element.

In a possible design, the registration request further includes indication information indicating that the terminal device supports movement from the first network to a second network in a voice service initiation process and continuity of the voice service initiation process by using the second network.

In a possible design, the first network and the second network have a same core network and different access types; or the first network and the second network have different core networks and different access types.

According to an eleventh aspect, a network device is provided. The network device may be a first access network device, a session management network element, a second mobility management network element, a second access network device, an IMS network element, or a first mobility management network element. When the network device is the first access network device, the network device has a function of implementing any method according to the first aspect; when the network device is the session management network element, the network device has a function of implementing any method according to the second aspect; when the network device is the second mobility management network element, the network device has a function of implementing any method according to the third aspect, the fourth aspect, the fifth aspect, or the eighth aspect; when the network device is the second access network device, the network device has a function of implementing any method according to the sixth aspect; when the network device is the IMS network element, the network device has a function of implementing any method according to the seventh aspect; and when the network device is the first mobility management network element, the network device has a function of implementing any method according to the ninth aspect. A function implemented by the network device may be implemented by using hardware, or may be implemented by executing corresponding software by using hardware. The hardware or software includes one or more functional units corresponding to the foregoing method.

According to a twelfth aspect, a terminal device is provided. The terminal device has a function of implementing any method according to the tenth aspect. A function implemented by the terminal device may be implemented by using hardware, or may be implemented by executing corresponding software by using hardware. The hardware or software includes one or more functional units corresponding to the method according to the tenth aspect.

According to a thirteenth aspect, a network device is provided. The network device includes: a memory, a processor, and a communications interface. The memory is configured to store a computer executable instruction, and the processor executes the computer executable instruction stored in the memory, and enables, by using the communications interface, the network device to implement the method according to the foregoing aspect. Specifically, the network device may be a first access network device, a session management network element, a second mobility management network element, a second access network device, an IMS network element, or a first mobility management network element. When the network device is the first access network device, the network device may implement any method according to the first aspect; when the network device is the session management network element, the network device may implement any method according to the second aspect; when the network device is the second mobility management network element, the network device may implement any method according to the third aspect, the fourth aspect, the fifth aspect, or the eighth aspect; when the network device is the second access network device, the network device may implement any method according to the sixth aspect; when the network device is the IMS network element, the network device may implement any method according to the seventh aspect; when the network device is the first mobility management network element, the network device has a function of implementing any method according to the ninth aspect.

According to a fourteenth aspect, a terminal device is provided. The terminal device includes: a memory, a processor, and a communications interface. The memory is configured to store a computer executable instruction, and the processor executes the computer executable instruction stored in the memory, and enables, by using the communications interface, the terminal device to implement any method according to the tenth aspect.

According to a fifteenth aspect, a computer readable storage medium is provided. The computer readable storage medium includes an instruction, and when run on a computer, the instruction enables the computer to perform any method according to the first aspect.

According to a sixteenth aspect, a computer readable storage medium is provided. The computer readable storage medium includes an instruction, and when run on a computer, the instruction enables the computer to perform any method according to the second aspect.

According to a seventeenth aspect, a computer readable storage medium is provided. The computer readable storage medium includes an instruction, and when run on a computer, the instruction enables the computer to perform any method according to the third aspect.

According to an eighteenth aspect, a computer readable storage medium is provided. The computer readable storage medium includes an instruction, and when run on a computer, the instruction enables the computer to perform any method according to the fourth aspect.

According to a nineteenth aspect, a computer readable storage medium is provided. The computer readable storage medium includes an instruction, and when run on a computer, the instruction enables the computer to perform any method according to the fifth aspect.

According to a twentieth aspect, a computer readable storage medium is provided. The computer readable storage medium includes an instruction, and when run on a computer, the instruction enables the computer to perform any method according to the sixth aspect.

According to a twenty first aspect, a computer readable storage medium is provided. The computer readable storage medium includes an instruction, and when run on a computer, the instruction enables the computer to perform any method according to the seventh aspect.

According to a twenty second aspect, a computer readable storage medium is provided. The computer readable storage medium includes an instruction, and when run on a computer, the instruction enables the computer to perform any method according to the eighth aspect.

According to a twenty third aspect, a computer readable storage medium is provided. The computer readable storage medium includes an instruction, and when run on a computer, the instruction enables the computer to perform any method according to the ninth aspect.

According to a twenty fourth aspect, a computer readable storage medium is provided. The computer readable storage medium includes an instruction, and when run on a computer, the instruction enables the computer to perform any method according to the tenth aspect.

According to a twenty fifth aspect, a computer program product including an instruction is provided. When run on a computer, the instruction enables the computer to perform any method according to the first aspect.

According to a twenty sixth aspect, a computer program product including an instruction is provided. When run on a computer, the instruction enables the computer to perform any method according to the second aspect.

According to a twenty seventh aspect, a computer program product including an instruction is provided. When run on a computer, the instruction enables the computer to perform any method according to the third aspect.

According to a twenty eighth aspect, a computer program product including an instruction is provided. When run on a computer, the instruction enables the computer to perform any method according to the fourth aspect.

According to a twenty ninth aspect, a computer program product including an instruction is provided. When run on a computer, the instruction enables the computer to perform any method according to the fifth aspect.

According to a thirtieth aspect, a computer program product including an instruction is provided. When run on a computer, the instruction enables the computer to perform any method according to the sixth aspect.

According to a thirty first aspect, a computer program product including an instruction is provided. When run on a computer, the instruction enables the computer to perform any method according to the seventh aspect.

According to a thirty second aspect, a computer program product including an instruction is provided. When run on a computer, the instruction enables the computer to perform any method according to the eighth aspect.

According to a thirty third aspect, a computer program product including an instruction is provided. When run on a computer, the instruction enables the computer to perform any method according to the ninth aspect.

According to a thirty fourth aspect, a computer program product including an instruction is provided. When run on a computer, the instruction enables the computer to perform any method according to the tenth aspect.

For a technical effect brought by any design manner in the eleventh aspect to the thirty fourth aspect, refer to a technical effect brought by different design manners in the first aspect to the tenth aspect. Details are not described herein again.

BRIEF DESCRIPTION OF THE DRAWINGS

For a more complete understanding of the present invention, and the advantages thereof, reference is now made to the following descriptions taken in conjunction with the accompanying drawings, in which.

Each of FIG. 8

Figure 10:
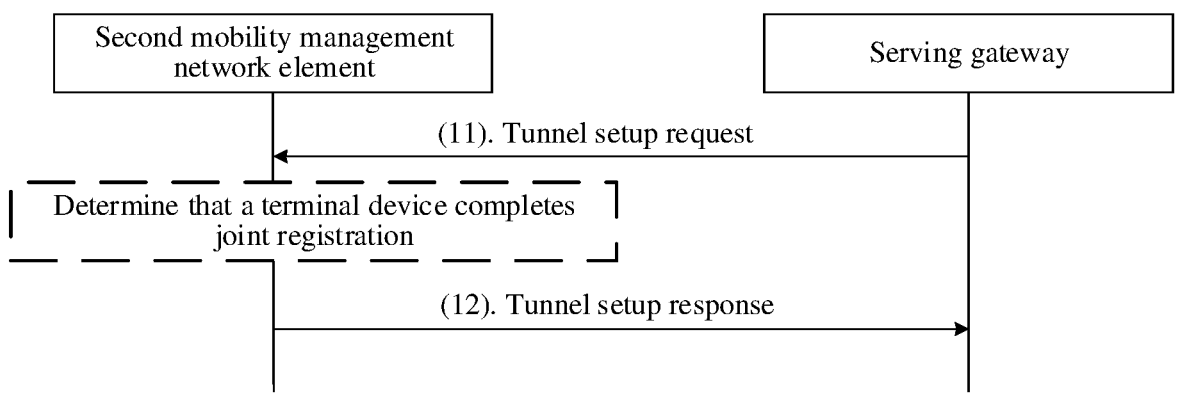
Figure 11:
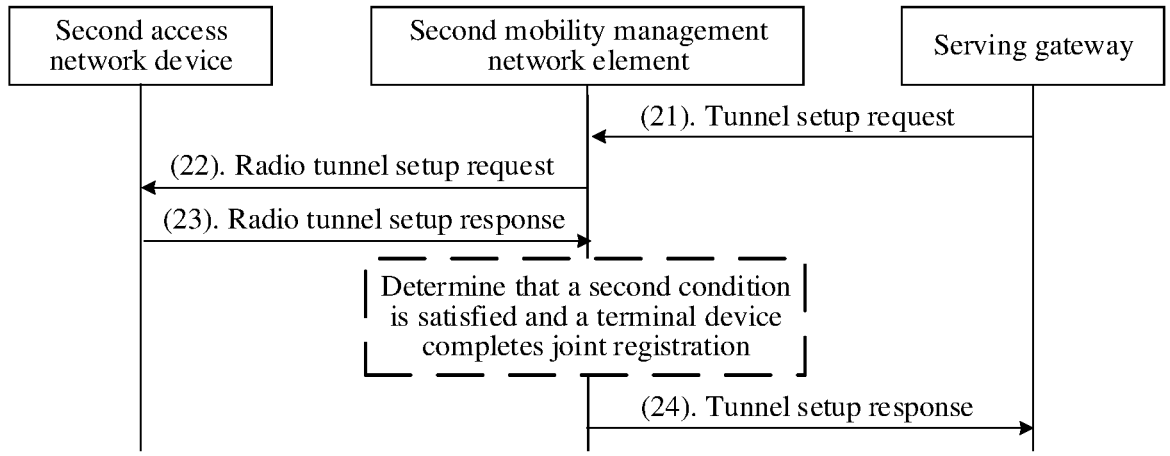
Figure 12:
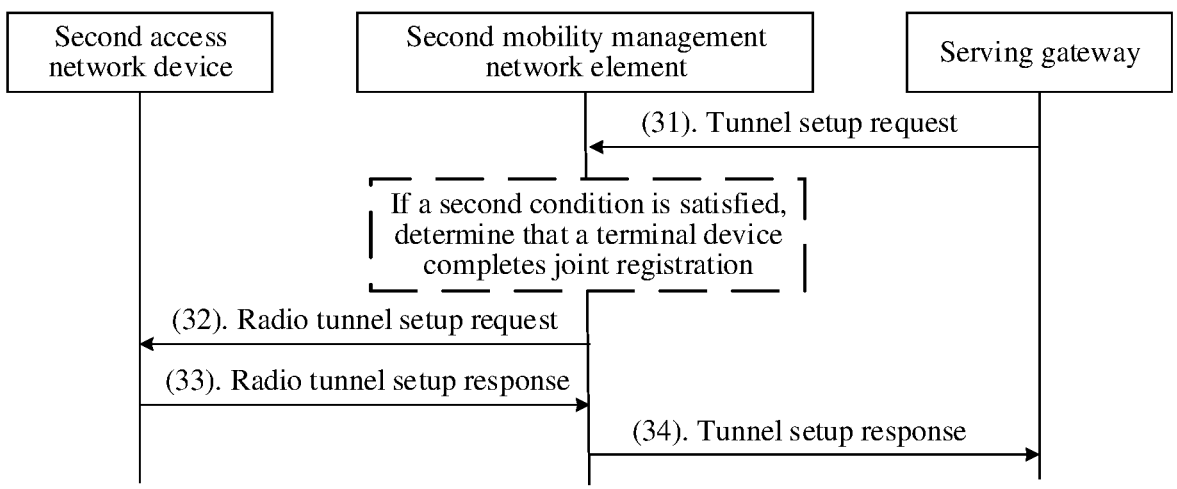
Figure 28:
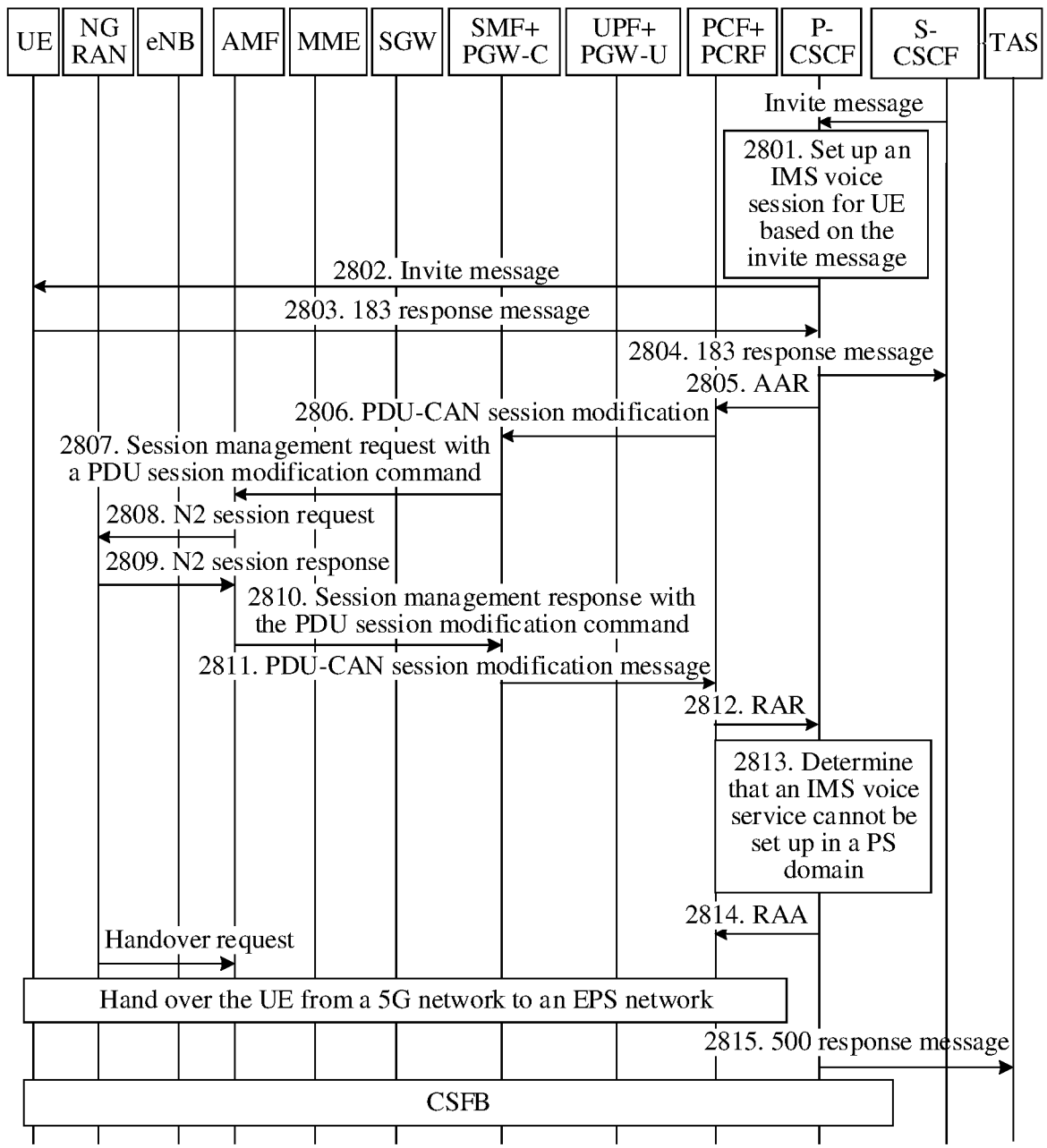
Figure 28A:
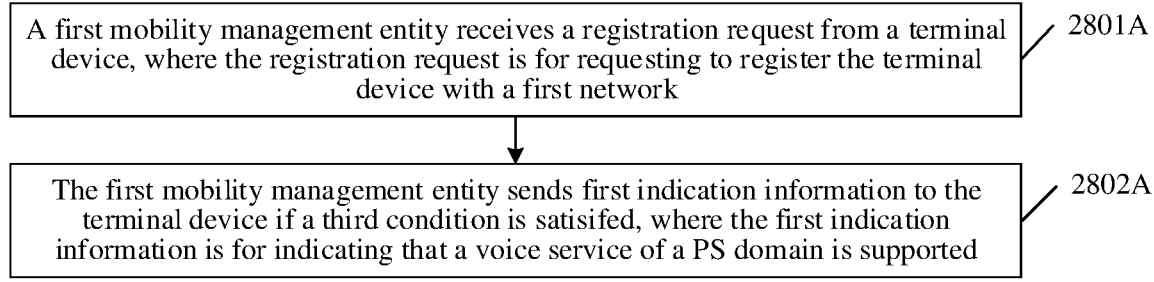
Figure 28B:
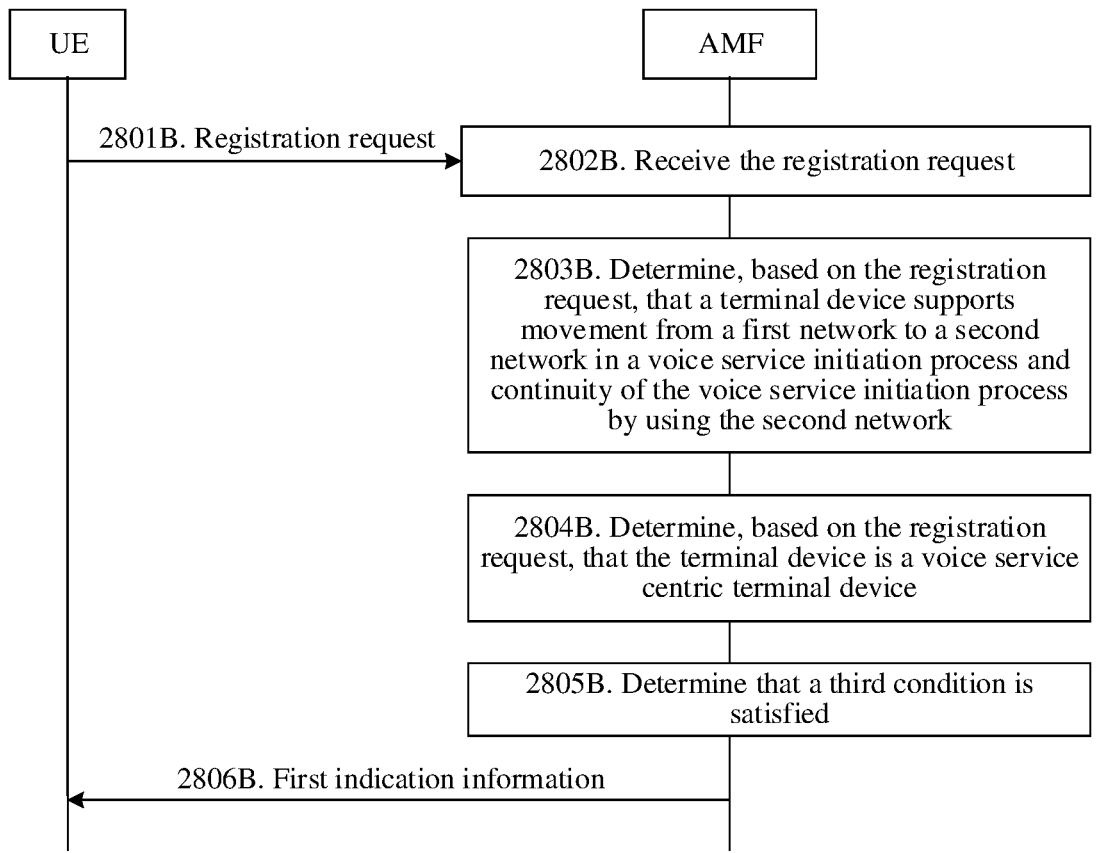
Figure 29:
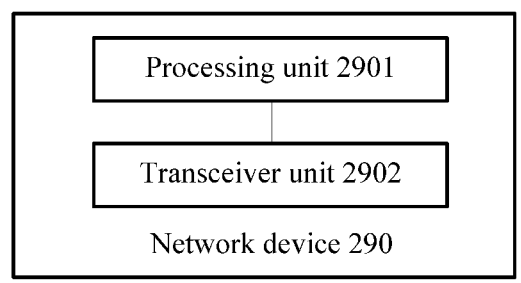
Figure 29A:
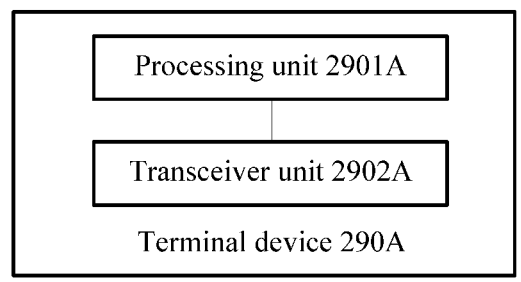

Each of FIG. 10 to FIG. 12 is a schematic diagram of a user plane tunnel setup process according to an embodiment of this application;

Each of FIG. 13 to FIG. 17 is a schematic diagram of a method for ensuring that a terminal device successfully initiates a CSFB call according to an embodiment of this application;

Each of FIG. 18A and FIG. 18B to FIG. 28 is an interaction flowchart of a network handover method according to an embodiment of this application;

FIG. 28A is a flowchart of a network registration method according to an embodiment of this application;

FIG. 28B is a flowchart of another network registration method according to an embodiment of this application;

FIG. 29 is a schematic diagram of a network device according to an embodiment of this application; and FIG. 29A is a schematic diagram of a terminal device according to an embodiment of this application.

DETAILED DESCRIPTION OF ILLUSTRATIVE EMBODIMENTS

The following describes the technical solutions in the embodiments of this application with reference to the accompanying drawings in the embodiments of this application. In description of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists.

Additionally, in the description of this application, "a plurality of" means two or more than two.

A method provided in the embodiments of this application may be applied to various communications systems, such as: a Global System for Mobile Communications (GSM), a Code Division Multiple Access (CDMA) system, a Wideband Code Division Multiple Access (WCDMA), a general packet radio service (GPRS), an LTE system, and a Universal Mobile Telecommunication System (UMTS), an EPS network, a 5G network, and a future wireless communications system.

Figure 1:
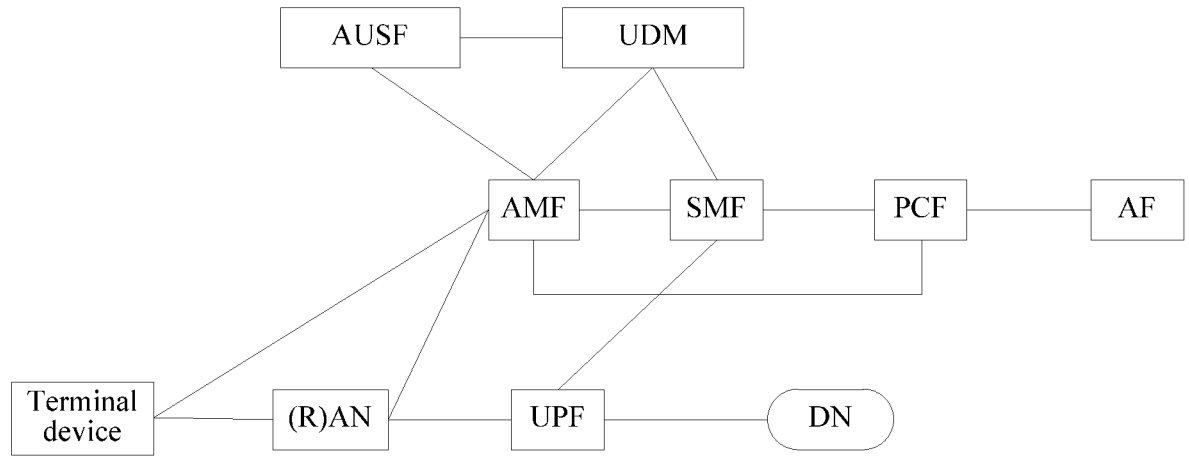
FIG. 1 is a schematic architectural diagram of a 5G network according to an embodiment of this application.

Specifically, the method provided in the embodiments of this application may be applied to a 5G network shown in FIG. 1. As shown in FIG. 1, the 5G network may include: an authentication server function (AUSF) network element, an access and mobility management function (AMF) network element, a data network (DN), a unified data management (UDM) network element, a policy control function (PCF) network element, a (radio) access network ((R)AN) device, a user plane function (UPF) network element, a terminal device, an application function AF) network element, and a session management function (SMF) network element.

Figure 1A:
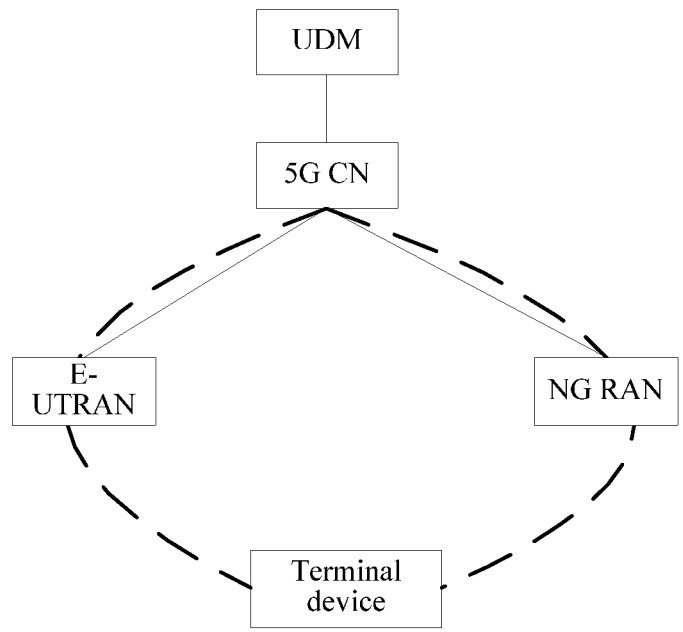
FIG. 1A is a schematic diagram of access of a terminal device to a 5G CN according to an embodiment of this application.

The (R)AN device of the 5G network may be a next generation (NG) RAN device, or may be an evolved universal terrestrial radio access network (E-UTRAN) device, and the 5G network may be connected to both of the foregoing two access network devices, that is, the 5G network may both have two different radio access types (RAT). Referring to FIG. 1A, a terminal device may access a 5G core network (CN) by using an E-UTRAN device or an NG RAN device. In this embodiment of this application, an example of the method provided in the embodiments of this application is described by using an example in which the terminal device is registered with a 5G network through an NG RAN and initiates a voice service in an NG RAN access type.

Control plane (CP) function network elements include: a UDM network element, an AUSF network element, a PCF network element, an AMF network element, and an SMF network element.

Specifically, main functions of the (R)AN device include: providing a wireless connection. Main functions of the UPF network element include: routing and forwarding a data packet, a mobility anchor, an uplink classifier to support routing a service flow to a DN, a BP to support a multi-homing packet data unit (PDU) session, and the like. The DN may be an operator service DN, an Internet access service DN, or a third-party service DN. Main functions of the AMF network element include: user registration management, accessibility detection, SMF node selection, mobile state conversion management, and the like. Main functions of the SMF network element include: control setup, modification, and deletion of a session, user plane node selection, and the like. Main functions of the PCF network element include: a policy decision point, and providing rules such as a rule based on a service data stream and application detection, a gating control rule, a quality of service (QoS) rule, and a flow-based charging control rule. Main functions of the AF network element include: interacting with a 3rd Generation Partnership Project (3GPP) core network to provide a service, to affect service flow routing, access network capability open-up, policy control, and the like. Main functions of the AUSF network element include: providing an authentication service. Main functions of the UDM network element include: storing user subscription data.

The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device may be a station (ST) in a wireless local area network (WLAN), a cellular phone, a cordless phone, a Session Initiation Protocol (SIP) phone, a wireless local loop (WLL) station, a personal digital assistant PDA), a handheld device having a wireless communication function, a computing device, another processing device connected to a wireless modem, an in-vehicle device, or a wearable device (which may also be referred to as a wearable intelligent device). The terminal device may further be a terminal device in a next generation communications system, for example, a terminal device in 5G or a terminal device in a future evolved public land mobile network (PLMN), or a terminal device in a new radio (NR) communications system.

Figure 2:
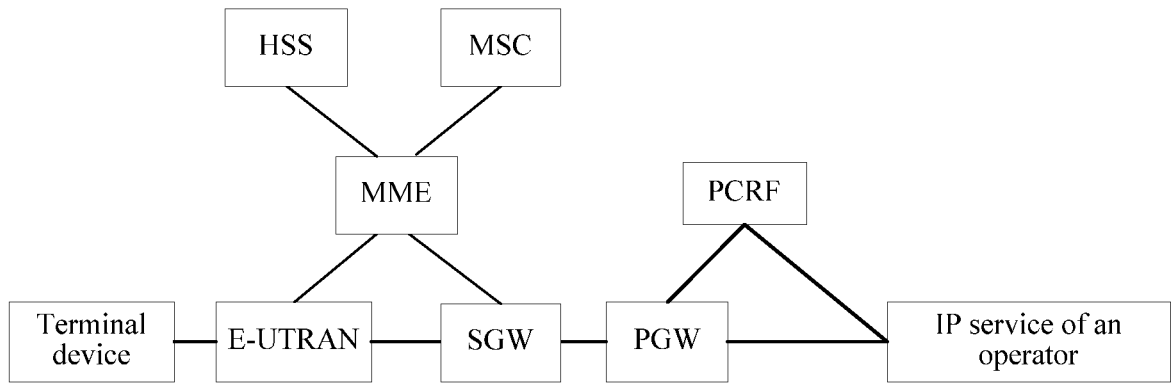
FIG. 2 is a schematic architectural diagram of an EPS network according to an embodiment of this application.

Specifically, the method provided in the embodiments of this application may be further applied to an evolved packet system (EPS) network (that is, a 4G network usually mentioned) shown in FIG. 2. As shown in FIG. 2, the EPS network may include the following plurality of function network elements: a terminal device, an E-UTRAN (which may be specifically an eNodeB), a serving gateway (SGW), a packet data network gateway (PGW), a mobility management entity (MME), a home subscriber server (HSS), a mobile switching center (MSC), and a policy and charging rules function (PCRF) network element.

Figure 3:
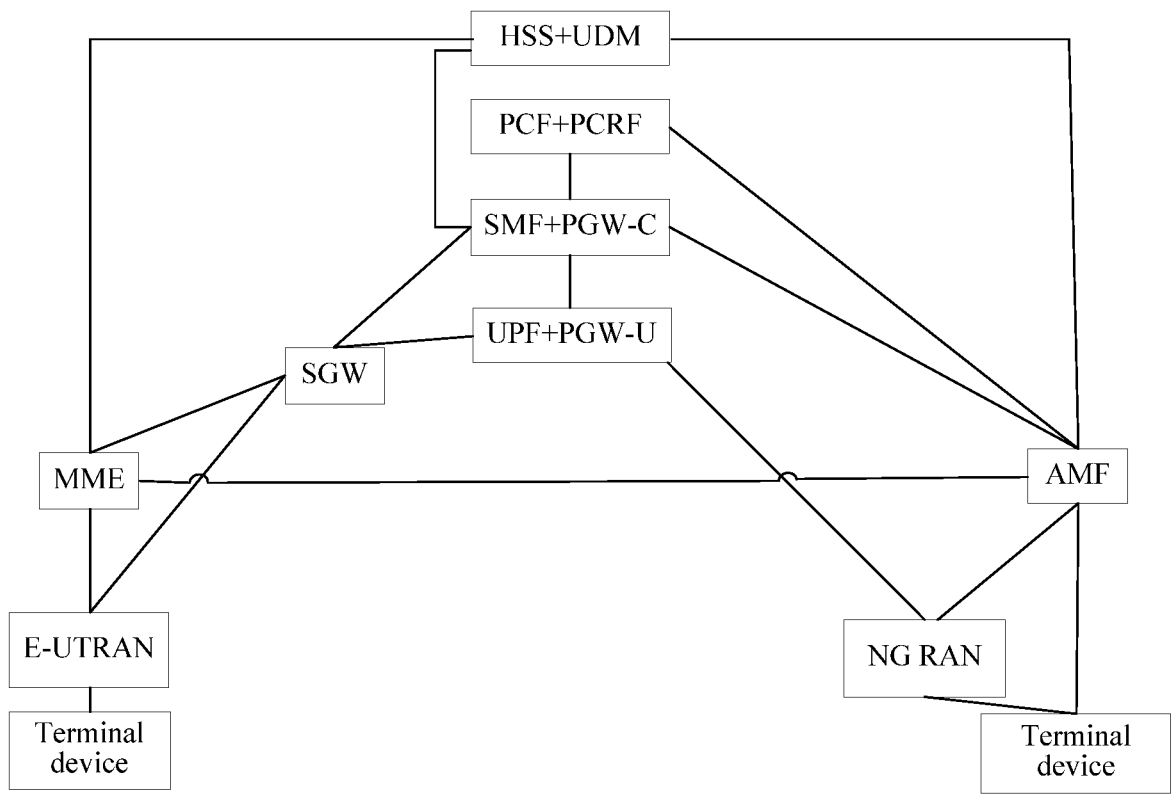
FIG. 3 is a schematic diagram of a network architecture obtained after integrating a 5G network and an EPS network according to an embodiment of this application.

When both a 5G network and an EPS network are deployed, function network elements in the 5G network and function network elements in the EPS network may be integrated, so that the 5G network may interact with the EPS network. Referring to FIG. 3, function network elements in an integrated network include: an HSS+UDM function network element (which is a function network element having both a function of an HSS and a function of a UDM), a PCF+PCRF function network element (which is a function network element having both a function of a PCF and a function of a PCRF), an SMF+PGW-C function network element (which is a function network element having both a function of an SMF and a function of a packet data network gateway-control plane (PGW-C)), a UPF+PGW-U function network element (which is a function network element having both a function of a UPF and a function of a packet data network gateway-user plane (PGW-U)), an SGW, an MME, an E-UTRAN, an AMF, an NG RAN, and a terminal device. In the embodiments in this application, the HSS+UDM function network element, the PCF+PCRF function network element, the SMF+PGW-C function network element, and the UPF+PGW-U are described only by using an example, and each network element may alternatively be two network elements separated from each other. This is not limited herein.

Currently, relatively mature voice service solutions include an IMS voice service solution in an EPS network and a circuit switching (CS) voice service solution in a 2G/3G network. Because a 5G network does not support IMS and CS voice services in the prior art, an embodiment of this application provides a network handover method, so that when needing to perform a voice service, a terminal device may be handed over from the 5G network to an EPS network or a 2G/3G network to perform the voice service.

Figure 4:
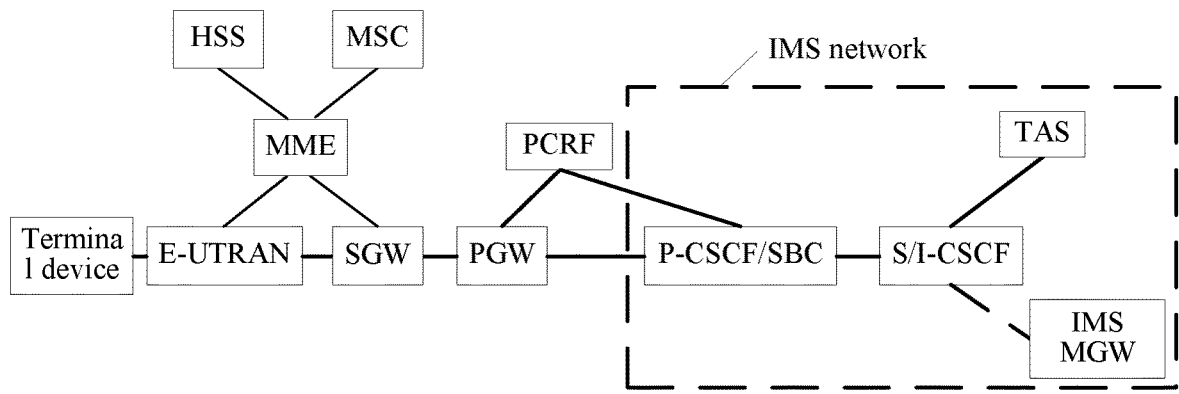
FIG. 4 is a schematic diagram of communication between an EPS network and an IMS network according to an embodiment of this application.

Referring to FIG. 2, if an IP service of an operator is an IMS voice service, for a schematic diagram of communication between an EPS network and an IMS network, refer to FIG. 4. The IMS network includes: a proxy-call session control function (P-CSCF)/session border control (SBC), an interrogating-call session control function (I-CSCF)/serving-call session control function (S-CSCF), a telephony application server (TAS), and an IMS media gateway (IMS MGW). A terminating access domain selection function module (T-ADS) may be included in the TAS. Therefore, a terminating access domain selection device in the following may be considered as the TAS. The TAS may alternatively be a service centralization and continuity application server (SCC AS).

Figure 5:
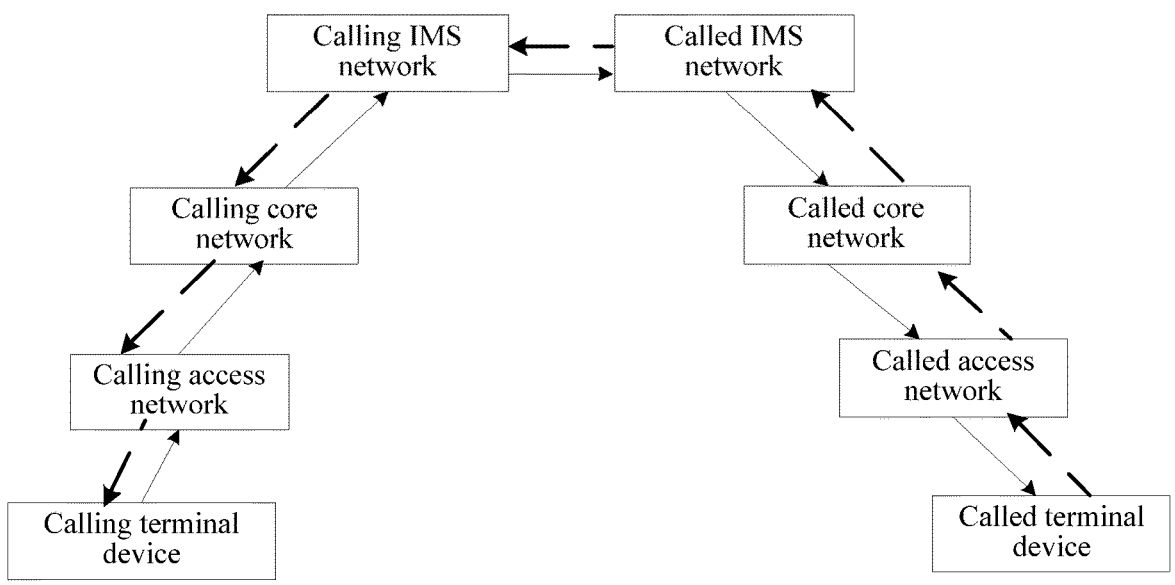
FIG. 5 is a schematic diagram of performing IMS voice communication between terminal devices according to an embodiment of this application.

When terminal devices are performing an IMS voice service, for a process of communication between a calling terminal device and a called terminal device, refer to FIG. 5. The process specifically includes: The calling terminal device sends call related information to a calling access network, the call related information passes through the calling access network, a calling core network, a calling IMS network, a called IMS network, a called core network, and a called access network and then reaches the called terminal device, and information fed back by the called terminal device to the calling terminal device is sent in an opposite direction.

Figure 6:
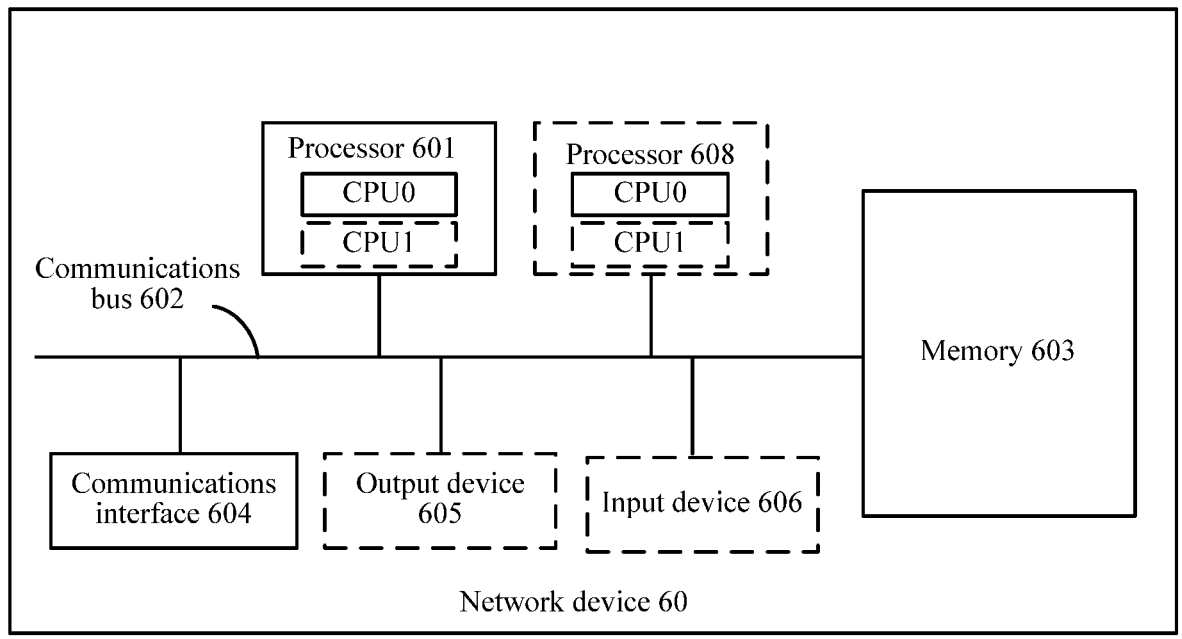
FIG. 6 is a schematic composition diagram of a network device according to an embodiment of this application.

As shown in FIG. 6, FIG. 6 is a schematic diagram of a hardware structure of a network device 60 according to an embodiment of this application. The network device 60 includes at least one processor 601, a communications bus 602, a memory 603, and at least one communications interface 604. The network device 60 may be a first access network device, a second access network device, a first mobility management network element, a second mobility management network element, a session management network element, an IMS network element, a user plane gateway, or a serving gateway in this application.

The processor 601 may be a general-purpose central processing unit (CPU), a microprocessor, an application-specific integrated circuit (ASIC), or one or more integrated circuits configured to control program execution of the solution of this application.

The communications bus 602 may include a path for transmitting information between the foregoing components.

By using any apparatus such as a transceiver, the communications interface 604 is configured to communicate with another device or communications network such as the Ethernet, a radio access network (RAN), or a wireless local area network (WLAN).

The memory 603 may be a read-only memory (ROM) or another type of static storage device that can store static information and a static instruction, or a random access memory (RAM) or another type of dynamic storage device that can store information and an instruction, or may be an electrically erasable programmable read-only memory (EEPROM), a compact disc read-only memory (CD-ROM) or another compact disc storage medium, optical disc storage medium (including a compact disc, a laser disc, an optical disc, a digital versatile disc, a Blu-ray disc, and the like) and magnetic disk storage medium, another magnetic storage device, or any other medium that can be configured to carry or store desired program code in a form of an instruction or a data structure and that is accessible to a computer, but is not limited thereto. The memory may independently exist and be connected to the processor through the bus. Alternatively, the memory may be integrated with the processor.

The memory 603 is configured to store application program code for performing the solution of this application, and the processor 601 controls the performing. The processor 601 is configured to execute the application program code stored in the memory 603, thereby implementing a method described below.

During specific implementation, in an embodiment, the processor 601 may include one or more CPUs such as a CPU0 and a CPU1 in FIG. 6.

During specific implementation, in an embodiment, the network device 60 may include a plurality of processors such as the processor 601 and a processor 608 in FIG. 6. Each of these processors may be a single-core (single-CPU) processor, or may be a multi-core (multi-CPU) processor. The processor herein may be one or more devices, circuits, and/or processing cores configured to process data (for example, a computer program instruction).

During specific implementation, in an embodiment, the network device 60 may further include an output device 605 and an input device 606. The output device 605 communicates with the processor 601, and may display information in various manners.

Figure 6A:
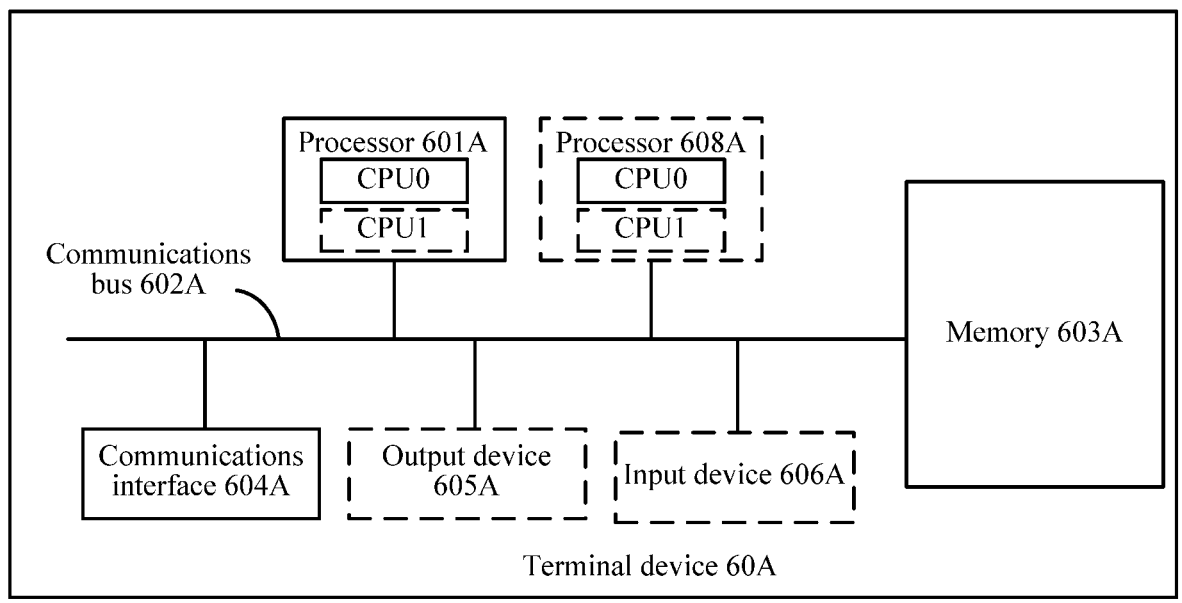
FIG. 6A is a schematic composition diagram of a terminal device according to an embodiment of this application.

As shown in FIG. 6A, FIG. 6A is a schematic diagram of a hardware structure of a terminal device 60A according to an embodiment of this application. The terminal device 60A includes at least one processor 601A, a communications bus 602A, a memory 603A, and at least one communications interface 604A.

During specific implementation, in an embodiment, the processor 601A may include one or more CPUs such as a CPU0 and a CPU1 in FIG. 6A.

During specific implementation, in an embodiment, the terminal device 60A may include a plurality of processors such as the processor 601A and a processor 608A in FIG. 6A.

During specific implementation, in an embodiment, the terminal device 60A may further include an output device 605A and an input device 606A. For an example of a function of each device shown in FIG. 6A and other description, refer to the foregoing description.

In this embodiment of this application, a first network and a second network may be two networks whose access types are different and whose core networks are also different, for example, a 5G network having an NG RAN access type and an EPS network having an E-UTRAN access type; or may be two networks whose access types are different but whose core networks are the same, for example, a 5G network having an NG RAN access type and a 5G network having an E-UTRAN access type. In this embodiment of this application, an example of the method provided in the embodiments of this application is described by using that the first network and the second network are two networks whose access types are different and whose core networks are different, but this should not be considered as a limitation on the protection scope of this application. The method provided in the embodiments of this application is likewise applicable to two networks whose core networks are the same but whose access types are different.

The solution provided in the embodiments of this application may be based on a service-based architecture, and communication between network elements may be based on a service-based interface or a conventional non-service-based interface. This is not specifically limited in the embodiments of this application.

Figure 7:
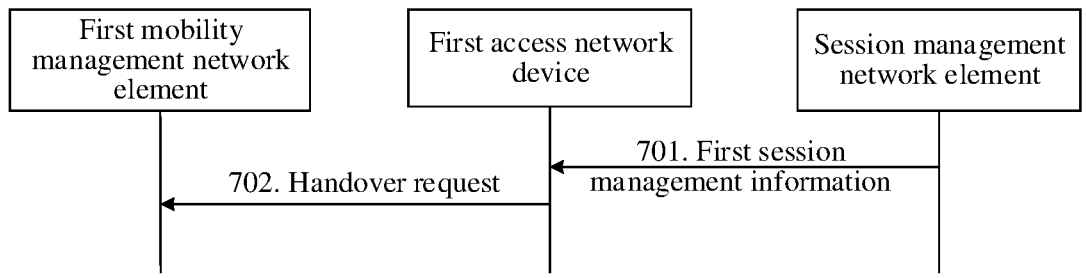
FIG. 7 is an interaction flowchart of a network handover method according to an embodiment of this application.

An embodiment of this application provides a network handover method. As shown in FIG. 7, the method may include the following steps.

701. A first access network device receives first session management (SM) information from a session management network element, where the first session management information is for requesting to set up a user plane tunnel for a voice service of a terminal device.

Specifically, the first session management information is for requesting to set up the user plane tunnel for the voice service of the terminal device in a first network. The voice service of the terminal device may be an IMS voice service.

The terminal device may be a calling terminal device of the voice service, or may be a called terminal device of the voice service. The user plane tunnel may be referred to as a QoS flow in a 5G network.

702. The first access network device sends a handover request to a first mobility management network element based on the first session management information and a first condition, where the handover request is for handing over the terminal device from a first network to a second network, and the first condition includes that the voice service cannot be performed in the first network.

The first access network device may be an NG RAN, the session management network element may be an SMF+PGW-C function network element, the first mobility management network element may be an AMF, the first network may be a 5G network, and the second network may be an EPS network. Additionally, the first network and the second network may each be a 5G network, and have a difference in that the first network and the second network have different access types.

The first session management information is session management information related to the user plane tunnel of the IMS voice service of the terminal device, the first session management information may include QoS parameters of the user plane tunnel of the IMS voice service of the terminal device, for example, parameters such as a 5G QoS indicator (referred to as 5QI below) equal to 1, an allocation/retention priority (ARP), a guaranteed bit rate (GBR), and a maximum bit rate (MBR), and the first session management information may further include other information.

The SMF+PGW-C function network element may add the first session management information to a session management request with a PDU modification command and send the session management request to the AMF, and then the AMF adds the first session management information to an N2 session request and sends the N2 session request to the NG RAN.

In the method provided in this embodiment of this application, when the terminal device in the 5G network performs a voice service, the terminal device may be handed over to the EPS network, so that the terminal device may perform the IMS voice service in the EPS network, to resolve a problem that the terminal device in the 5G network cannot perform the IMS voice service.

Based on a rule in a current 5G network protocol, for a voice centric terminal device, if a network side of a 5G network does not support an IMS voice service, the voice centric terminal device should not initially select NR to access a 5G core network (5GC), or even if accessing a 5GC, the voice centric terminal device needs to perform reselection to access an E-UTRAN and an evolved packet core (EPC). Therefore, if the 5G network does not support the IMS voice service, the terminal device cannot camp on the 5G network to enjoy a high-speed data service. However, in the method provided in this embodiment of this application, when the IMS voice service cannot be performed in the 5G network, the NG RAN may send a handover request to the AMF, so that the terminal device in the 5G network is handed over from the 5G network to the EPS network, and the terminal device may perform the IMS voice service in the EPS network. Therefore, the terminal device may first camp on the 5G network to enjoy a high-speed data service, and then be handed over, when needing to perform the IMS voice service, to the EPS network to perform the IMS voice service.

Further, to ensure that the terminal device in the 5G network may smoothly perform the voice service, the embodiments of this application provide methods for performing network handover of the terminal device in two scenarios.

Scenario 1. The voice service cannot be performed in the first network, and the voice service may be performed in the second network.

In the scenario, the first condition may further include at least one of that the second network supports the voice service, that signal quality of the second network satisfies a requirement of the voice service, and that a network device of the first network and the terminal device supports handover between the first network and the second network.

In the scenario, the terminal device may perform network handover in either of the following manner 1 and manner 2.

Manner 1. The session management network element is notified of information indicating that setup of the user plane tunnel of the voice service is accepted, so that the network device in the first network sets up the user plane tunnel for the voice service of the terminal device. In a process of handing over the terminal device from the first network to the second network, the user plane tunnel that is set up by the network device in the first network for the voice service of the terminal device is switched to a user plane tunnel of a voice service in the second network.

Figure 8:
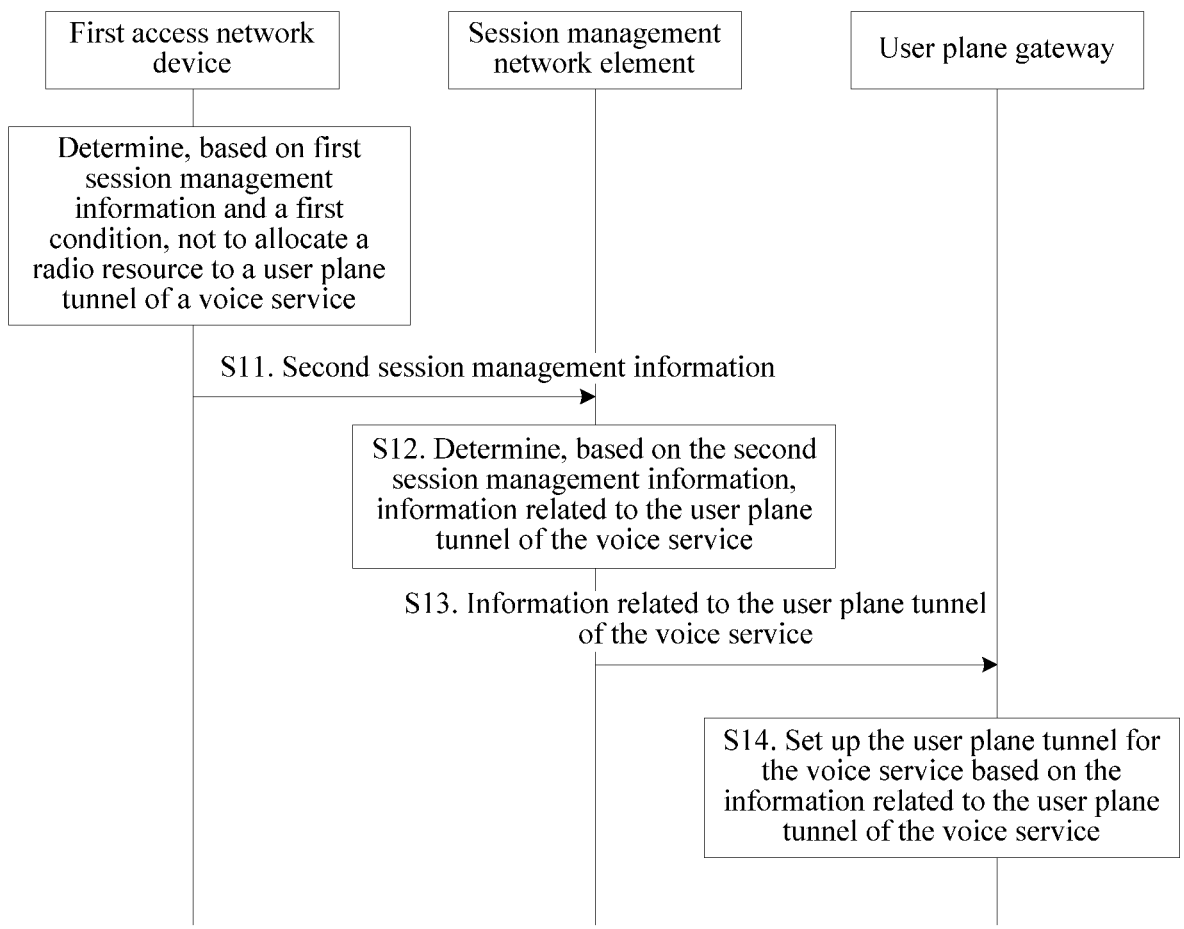

Referring to FIG. 8, the manner 1 may specifically include the following steps.

S11. The first access network device sends second session management information to the session management network element, where the second session management information includes the information indicating that setup of the user plane tunnel of the voice service is accepted.

Specifically, the first access network device may add the second session management information to an N2 session response and send the N2 session response to the first mobility management network element, and then the first mobility management network element adds the second session management information to a session management response with a PDU session modification command and sends the session management response to the session management network element.

It should be noted that, because the voice service cannot be performed in the first network, although the second session management information includes the information indicating that setup of the user plane tunnel of the voice service is accepted, actually the first access network device does not allocate a radio resource to the voice service.

Optionally, referring to FIG. 8, before step S11, the method may further include: determining, by the first access network device based on the first session management information and the first condition, not to allocate a radio resource to the user plane tunnel of the voice service.

S12. The session management network element receives the second session management information sent from the first access network device, and determines, based on the second session management information, information related to the user plane tunnel of the voice service.

Specifically, the information related to the user plane tunnel of the voice service of the terminal device may be specifically packet detection, an enforcement rule, a reporting rule, core network tunnel information, and the like related to the user plane tunnel of the voice service.

S13. The session management network element sends the information related to the user plane tunnel of the voice service to a user plane gateway.

The user plane gateway may be a UPF+PGW-U function network element.

The SMF+PGW-C function network element may add the information related to the user plane tunnel of the voice service to an N4 session modification request and send the N4 session modification request to the UPF+PGW-U function network element.

S14. The user plane gateway receives the information related to the user plane tunnel of the voice service sent by the session management network element, and sets up the user plane tunnel for the voice service based on the information related to the user plane tunnel of the voice service.

Steps S11 to S14 may be performed before step 702, or may be performed after step 702 and before the user plane tunnel of the voice service begins to be switched. Therefore, the user plane tunnel that is set up by the user plane gateway for the voice service may also be switched to the user plane tunnel of the voice service in the second network by switching the user plane tunnel of the voice service, so that the terminal device may perform the voice service in the second network.

Manner 2. The session management network element is notified of reason information indicating that setup of the user plane tunnel of the voice service is rejected, so that the session management network element sets up a user plane tunnel for the voice service of the terminal device after the terminal device completes handover from the first network to the second network.

Figure 9:
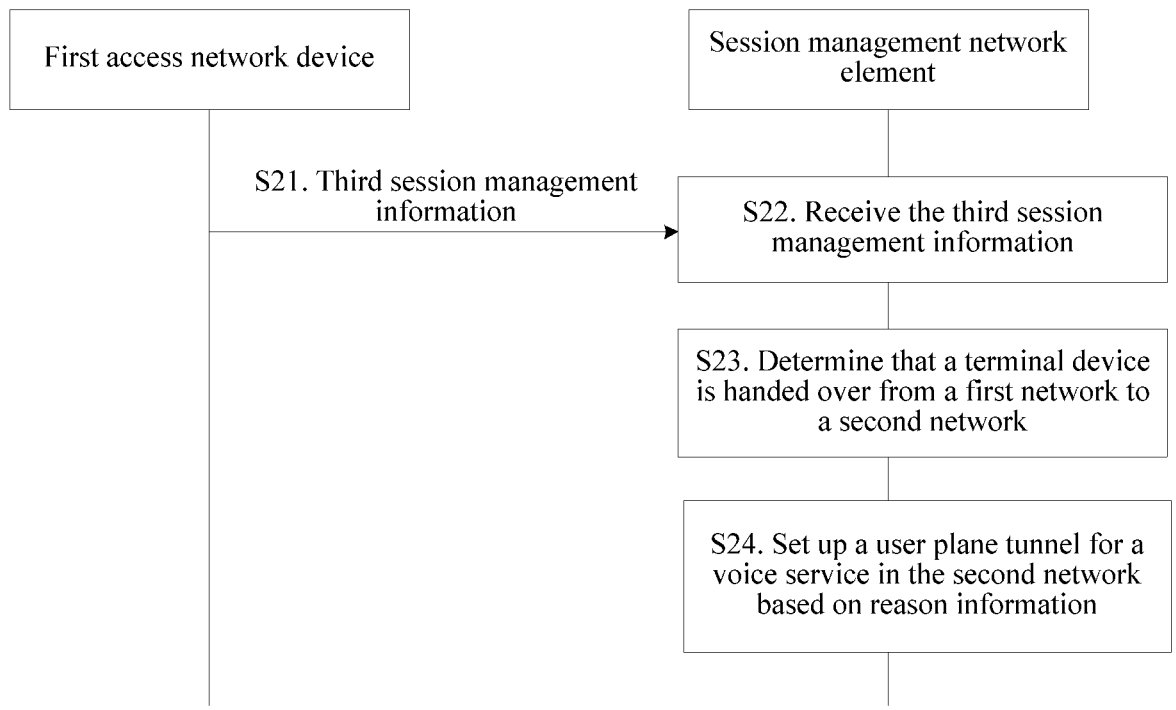
FIG. 9 is a flowchart of a network handover process according to an embodiment of this application.

Referring to FIG. 9, the manner 2 may specifically include the following steps.

S21. The first access network device sends third session management information to the session management network element, where the third session management information includes reason information indicating that setup of the user plane tunnel of the voice service of the terminal device is rejected.

Specifically, the NG RAN may add the third session management information to an N2 session response and send the N2 session response to the AMF, and then the AMF adds the third session management information to a session management response with a PDU session modification command and sends the session management response to the SMF+PGW-C function network element.

Optionally, the reason information indicating rejection may be that the terminal device is performing a handover process.

S22. The session management network element receives the third session management information sent from the first access network device.

S23. The session management network element determines that the terminal device has handed over from a first network to a second network.

During specific implementation, step S23 may be implemented in either of the manner (1) and the manner (2). In the manner (1), a timer is set in the session management network element, and when the timer times out, it is determined that the terminal device is handed over from the first network to the second network. In the manner (2), when a tunnel modification request (modify bearer request) is received, the session management network element determines that the terminal device is handed over from the first network to the second network, where the tunnel modification request is for modifying signaling plane tunnel information of the voice service of the terminal device.

S24. The session management network element sets up the user plane tunnel for the voice service in the second network based on the reason information.

During specific implementation of step S24, when the session management network element determines that the third session management information includes the reason information or the reason information is that the terminal device is performing a handover process, the user plane tunnel may be set up for the voice service in the second network after the terminal device is handed over from the first network to the second network.

In the manner 2, although the network device in the first network does not set up a user plane tunnel for the voice service, after determining that the terminal device is handed over from the first network to the second network, the session management network element sets up the user plane tunnel for the voice service of the terminal device in the second network, so that the terminal device may perform the voice service in the second network.

The manner 2 provides a method for performing network handover of the terminal device in a scenario in which the voice service cannot be performed in the first network but the voice service may be performed in the second network. When receiving the first session management information, the first access network device can hand over the terminal device in the first network to the second network in time, so that the terminal device in the first network continues to perform a voice call setup process in the second network. Moreover, the first access network device rejects setup of the user plane tunnel of the voice service because the reason information is that the terminal device is performing a handover process, so as to trigger the user plane gateway to set up a user plane tunnel of the voice service after the terminal device is successfully handed over to the second network (because a voice session may be performed in the second network in the scenario, the user plane tunnel may be set up successfully), so that the terminal device performs the voice service in the second network.

Scenario 2. Neither the first network nor the voice service may be performed in the second network.

In the scenario, the first condition may further include that the voice service cannot be performed in the second network.

In the scenario, the terminal device may perform network handover in either of the following manner 3 and manner 4.

Manner 3. The session management network element is notified of reason information indicating that setup of the user plane tunnel of the voice service is rejected, so that the session management network element sets up a user plane tunnel for the voice service of the terminal device after the terminal device completes handover from the first network to the second network, and when setup of the user plane tunnel fails, the terminal device is enabled to falls back to a 2G/3G network to perform the voice service.

The manner 3 may specifically include:

S31 to S34.

Steps S31 to S34 are respectively correspondingly the same as steps S21 to S24, that is, step S31 is the same as step S21, step S32 is the same as step S22, step S33 is the same as step S23, and step S34 is the same as step S24. For details, refer to FIG. 9.

During specific implementation of step S34, a process of setting up the user plane tunnel may be specifically implemented by using any one of the following processes P1 to P3.

Referring to FIG. 10, the process P1 may include the following steps.

(11). A serving gateway sends a tunnel setup request (create bearer request) to a second mobility management network element, where the tunnel setup request is for requesting to set up a user plane tunnel of a voice service for a terminal device.

The serving gateway may be an SGW, the second mobility management network element may be an MME, and the user plane tunnel of the voice service may be a dedicated bearer whose QCI (the QCI is a quality of service class identifier, English full name qos class identifier) is equal to 1.

(12). The second mobility management network element receives the tunnel setup request sent by the serving gateway, and sends a tunnel setup response (create bearer response) to the serving gateway based on a second condition.

The tunnel setup response includes information indicating that setup of the user plane tunnel of the voice service of the terminal device is rejected.

The second condition includes that the voice service cannot be performed in the second network, and the second condition may further include that the terminal device is a terminal device handed over from the first network to the second network.

Specifically, when the second mobility management network element determines that the second condition is satisfied, the second mobility management network element rejects setup of the user plane tunnel for the voice service, and sends the tunnel setup response including the information to the serving gateway.

After step (12), the serving gateway may inform, through a session management network element and a policy control function network element, an IMS network element of the information indicating that setup of the user plane tunnel of the voice service is rejected, so that the IMS network element triggers a circuit switched fallback (CSFB) service of the terminal device. The IMS network element may be a P-CSCF.

Referring to FIG. 11, the process P2 may include the following steps.

(21). A serving gateway sends a tunnel setup request to a second mobility management network element, where the tunnel setup request is for requesting to set up a user plane tunnel of a voice service for a terminal device.

(22). The second mobility management network element sends a radio tunnel setup request (bearer setup request) to a second access network device, where the radio tunnel setup request is for requesting to set up the user plane tunnel for the voice service of the terminal device.

The second access network device may be an eNB, and the user plane tunnel of the voice service may be a dedicated bearer whose QCI is equal to 1.

(23). The second access network device receives the radio tunnel setup request sent by the second mobility management network element, and sends a radio tunnel setup response (bearer setup response) to the second mobility management network element based on a second condition.

The radio tunnel setup response includes information indicating that setup of the user plane tunnel of the voice service is rejected. The second condition includes that the voice service cannot be performed in the second network, and the second condition may further include that the terminal device is a terminal device handed over from the first network to the second network.

Specifically, when the second access network device determines that the second condition is satisfied, the second access network device rejects setup of the user plane tunnel for the voice service, and sends the radio tunnel setup response including the information to the second mobility management network element.

(24). The second mobility management network element receives the radio tunnel setup response sent by the second access network device and sends a tunnel setup response to the serving gateway based on the second condition.

The tunnel setup response includes the information indicating that setup of the user plane tunnel of the voice service of the terminal device is rejected.

After step (24), the serving gateway may inform, through a session management network element and a policy control function network element, an IMS network element of the information indicating that setup of the user plane tunnel of the voice service is rejected, so that the IMS network element triggers a CSFB service of the terminal device.

The policy control function network element may be a PCF+PCRF function network element.

Referring to FIG. 12, the process P3 may include the following steps.

(31). A serving gateway sends a tunnel setup request to a second mobility management network element, where the tunnel setup request is for requesting to set up a user plane tunnel of a voice service for a terminal device.

(32). The second mobility management network element receives the tunnel setup request sent by the serving gateway and sends a radio tunnel setup request to a second access network device, where the radio tunnel setup request is for requesting to set up the user plane tunnel for the voice service of the terminal device.

(33). The second access network device receives the radio tunnel setup request sent by the second mobility management network element, and sends a radio tunnel setup response to the second mobility management network element based on a second condition.

The radio tunnel setup response includes information indicating that setup of the user plane tunnel of the voice service is rejected. The second condition includes that the voice service cannot be performed in the second network, and the second condition may further include that the terminal device is a terminal device handed over from the first network to the second network.

Specifically, when the second access network device determines that the second condition is satisfied, the second access network device rejects setup of the user plane tunnel for the voice service, and sends the radio tunnel setup response including the information to the second mobility management network element.

(34). The second mobility management network element receives the radio tunnel setup response sent by the second access network device and sends a tunnel setup response to the serving gateway based on the radio tunnel setup response.

The radio tunnel setup response includes the information indicating that setup of the user plane tunnel of the voice service of the terminal device is rejected, and the tunnel setup response includes the information indicating that setup of the user plane tunnel of the voice service of the terminal device is rejected.

After step (34), the serving gateway may inform, through a session management network element and a policy control function network element, an IMS network element of the information indicating that setup of the user plane tunnel of the voice service is rejected, so that the IMS network element triggers a CSFB service of the terminal device.

Because a voice session cannot be performed in the second network in the scenario, the user plane tunnel of the voice service cannot be set up successfully. In this case, the terminal device may be enabled to fall back to a 2G/3G network to perform the voice service. Therefore, the terminal device needs to perform a CSFB service. Joint registration is a necessary precondition on which the terminal device subsequently initiates a CSFB call, and that the terminal device completes joint registration means that the terminal device completes a joint registration process of an EPS and a CS domain. Therefore, to ensure that the terminal device successfully initiates the CSFB call, the CSFB service of the terminal device needs to be triggered after the terminal device completes joint registration. This may be specifically implemented in any one of the following four manners W1 to W4.

Manner W1:

Referring to FIG. 10, in the process P1, step (12) is performed after the second mobility management network element determines that the terminal device completes joint registration. Specifically, when the second mobility management network element determines that a joint registration complete message from the terminal device is received, where the joint registration complete message may be specifically a tracking area update complete message, the second mobility management network element determines that the terminal device completes joint registration.

Referring to FIG. 11, in the process P2, in step (24), after the second mobility management network element determines that the second condition is satisfied and the terminal device completes joint registration, the second mobility management network element sends the tunnel setup response to the serving gateway. Specifically, when the second mobility management network element determines that a joint registration complete message from the terminal device is received, the second mobility management network element determines that the terminal device completes joint registration.

Referring to FIG. 12, in the process P3, if the second condition is satisfied, step (32) is performed after the second mobility management network element determines that the terminal device completes joint registration. Specifically, when the second mobility management network element determines that a joint registration complete message from the terminal device is received, the second mobility management network element determines that the terminal device completes joint registration.

In the manner, because the IMS network element triggers, after receiving the information indicating that setup of the user plane tunnel of the voice service is rejected, the CSFB service of the terminal device, and the second mobility management network element sends, after determining that the terminal device completes joint registration, the tunnel setup response to the serving gateway, the IMS network element triggers the CSFB service of the terminal device after the terminal device completes joint registration, thereby ensuring that the terminal device successfully initiates the CSFB call.

Manner W2:

During specific implementation of step S34, the session management network element sets up the user plane tunnel for the voice service in the second network after a first preset period based on the reason information and a second condition.

Step S34 may be specifically implemented in a manner m1 and a manner m2.

The manner m1 is: sending, by the session management network element, a tunnel setup request to a serving gateway of the second network after the first preset period based on the reason information and the second condition, where the tunnel setup request is for requesting to set up the user plane tunnel of the voice service.

Specifically, a start time point of the first preset period may be a time point at which the reason information is received.

The manner m2 is: sending, by the session management network element, a tunnel setup request to a serving gateway of the second network based on the reason information, where the tunnel setup request is for requesting to set up the user plane tunnel of the voice service; receiving, by the session management network element, a tunnel setup response sent from the serving gateway, where the tunnel setup response includes information indicating that setup of the user plane tunnel of the voice service is rejected; and sending, by the session management network element, a first message to a policy function control network element after the first preset period based on the second condition, where the first message is for indicating that setup of the user plane tunnel of the voice service fails. The first message may be a credit control request (CCR), and information indicating that setup of the user plane tunnel fails may be included in the CCR.

Specifically, a start time point of the first preset period may be a time point at which the reason information is received.

In the manner, it is considered that when the IMS network element triggers the CSFB service of the terminal device after a delay of the first preset period, the terminal device completes joint registration. Specifically, the session management network element may send the tunnel setup request or the first message after a delay of the first preset period, so that the IMS network element triggers the CSFB service of the terminal device after a delay of the first preset period, thereby ensuring that the terminal device successfully initiates the CSFB call.

Figure 13:
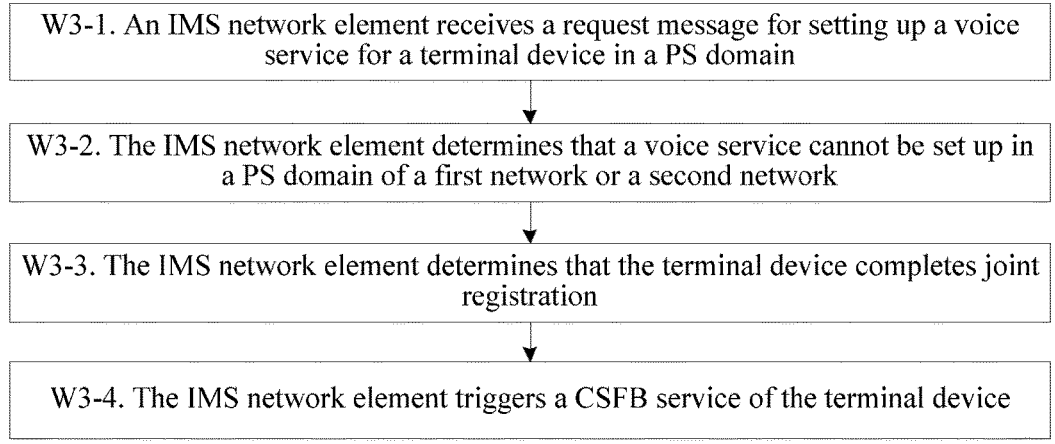

Manner W3:

Referring to FIG. 13, the manner W3 may include the following steps.

W3-1. An IMS network element receives a request message for setting up a voice service for a terminal device in a packet switched (PS) domain.

The request message may be specifically an invite message.

W3-2. The IMS network element determines that a voice service cannot be set up in a PS domain of a first network or a second network.

W3-3. The IMS network element determines that the terminal device completes joint registration.

W3-4. The IMS network element triggers a CSFB service of the terminal device.

In the manner, after determining that the terminal device completes joint registration, the IMS network element triggers the CSFB service of the terminal device, thereby ensuring that the terminal device successfully initiates a CSFB call.

Optionally, after step W3-1, the method may further include: determining, by the IMS network element, based on the request message for setting up the voice service in the packet switched domain, that the terminal device is registered with the first network, and then determining that the request message is received in the first network.

Optionally, W3-2 may specifically include: obtaining, by the IMS network element, voice service setup failure information that is from the PS domain of the first network, where specifically, when receiving information indicating that setup of the user plane tunnel of the voice service fails, the IMS network element determines, by determining that the terminal device is registered with the first network, that the information indicating that setup of the user plane tunnel of the voice service fails is from the PS domain of the first network; or obtaining, by the IMS network element, voice service setup failure information that is from the PS domain of the second network, where specifically, when receiving information indicating that setup of the user plane tunnel of the voice service fails, the IMS network element determines, by determining that the terminal device is registered with the second network, that the information indicating that setup of the user plane tunnel of the voice service fails is from the PS domain of the second network.

The voice service setup failure information may be reported by another network device to the IMS network element.

Optionally, W3-3 may specifically include: after a second preset period since the IMS network element determines that the voice service cannot be set up in the PS domain of the first network or the second network, determining, by the IMS network element, that the terminal device completes joint registration; or determining, by the IMS network element based on registration location information of the terminal device obtained from a policy control network element or a home subscriber server (HSS), that the terminal device completes joint registration.

Specifically, the policy control network element or the home subscriber server may actively report the registration location information of the terminal device to the IMS network element, or the registration location information may be queried by the IMS network element from the policy control network element or the home subscriber server.

When the terminal device is a calling terminal device of the voice service, W3-4 may specifically include: sending, by the IMS network element, a second message to the calling terminal device, where the second message is for triggering the calling terminal device to initiate a CSFB calling voice service.

When the terminal device is a called terminal device of the voice service, W3-4 may specifically include: sending, by the IMS network element, a third message to a terminating access domain selection device, where the third message is for indicating that setup of a called voice service in the PS domain of the first network or the second network fails, so that the terminating access domain selection device triggers a CSFB called voice service of the called terminal device.

The second message and the third message may be a 500 response message, a 380 response message, or a 503 response message.

Manner 4. The first access network device notifies the session management network element of information indicating that setup of the user plane tunnel of the voice service is rejected, and if the information indicating that setup of the user plane tunnel of the voice service is rejected includes that a radio resource is insufficient (or resource allocation fails), the session management network element does not set up the user plane tunnel for the voice service of the terminal device after the terminal device completes handover from the first network to the second network, and information indicating that setup of the user plane tunnel fails is transmitted to an IMS network through the first network, so that the IMS network triggers a CSFB service of the terminal device.

The manner 4 specifically includes: sending, by the first access network device, fourth session management information to the session management network element, where the fourth session management information includes the information indicating that setup of the user plane tunnel of the voice service is rejected The information indicating that setup of the user plane tunnel of the voice service is rejected includes that a radio resource is insufficient.

In the manner, after the terminal device is handed over from the first network to the second network, the session management network element does not set up a user plane tunnel for the voice service of the terminal device, but a handover process is improved, thereby ensuring that the terminal device successfully initiates a CSFB call. This may be specifically implemented in any one of W3 and the following manners W4 to W7, where W5 and W6 are directed to a situation in which the terminal device is a calling terminal device.

Figure 14:
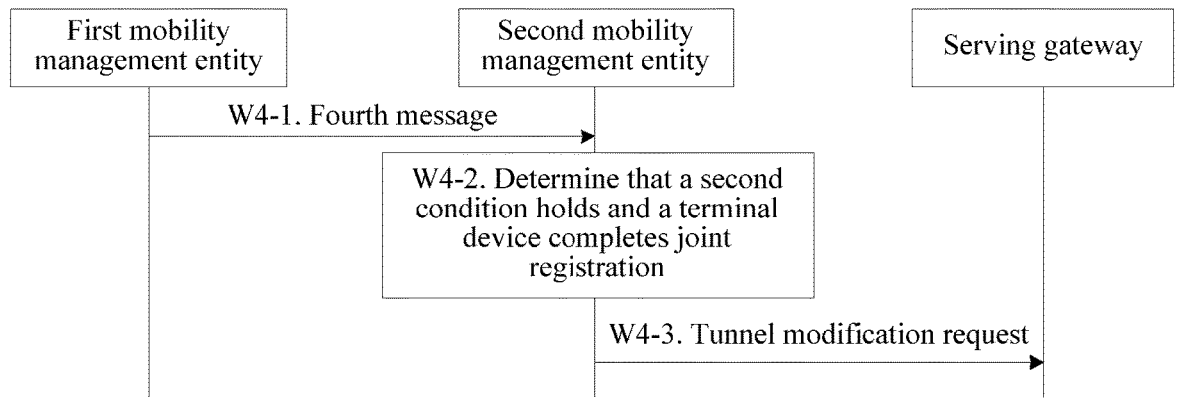

Manner W4:

Referring to FIG. 14, the manner W4 includes the following steps.

W4-1. A second mobility management network element receives a fourth message sent by a first mobility management network element, where the fourth message is for determining that a terminal device completes relocation.

The fourth message may be specifically a relocation request complete acknowledge message. Relocation herein means that in a process in which the terminal device is handed over from the first network to the second network, a mobility management network element corresponding to the terminal device is relocated, and is relocated from the first mobility management network element to the second mobility management network element.

W4-2. The second mobility management network element determines that the second condition is satisfied and the terminal device completes joint registration.

The second condition includes that the voice service cannot be performed in the second network, and the second condition may further include that the terminal device is a terminal device handed over from the first network to the second network.

W4-3. The second mobility management network element sends a tunnel modification request to a serving gateway, where the tunnel modification request is for modifying signaling plane tunnel information of a voice service of the terminal device.

After receiving the tunnel modification request, the serving gateway sends the tunnel modification request to a session management network element, and then the session management network element sends the tunnel modification request to a user plane gateway, so that the user plane gateway sets up a corresponding signaling plane tunnel of the voice service based on the signaling plane tunnel information of the voice service. The signaling plane tunnel of the voice service herein may be specifically a dedicated bearer whose QCI is equal to 5.

It should be noted that, after learning that setup of the user plane tunnel fails, the IMS network element may send a second message (the meaning of the second message is the same as that mentioned above) to the terminal device, and the second message needs to be transmitted to the terminal device by using the signaling plane tunnel (that is, the dedicated bearer whose QCI is equal to 5) of the voice service. After receiving the tunnel modification request and completing setup of the signaling plane tunnel of the voice service, the user plane gateway sends the second message to the terminal device by using the signaling plane tunnel. In the manner, only after determining that the terminal device completes joint registration, the second mobility management network element sends the tunnel modification request to the serving gateway, thereby ensuring that the terminal device successfully initiates a CSFB call.

Figure 15:
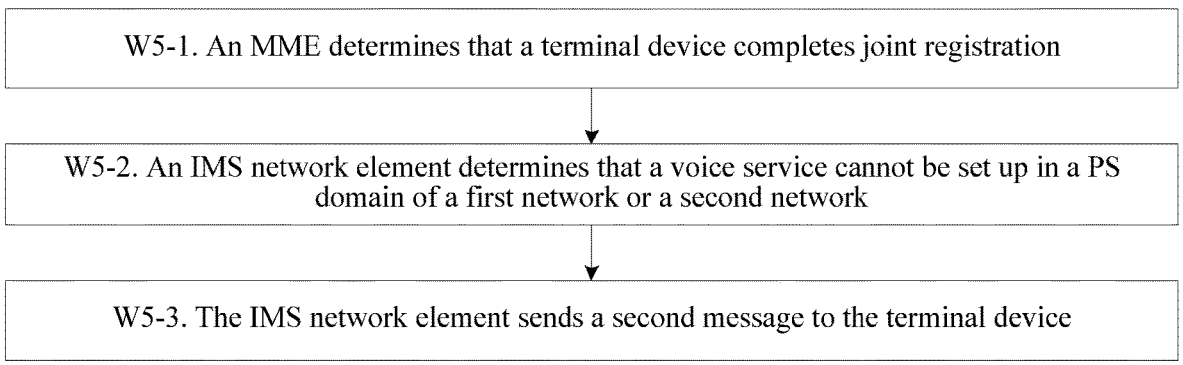

Manner W5:

Referring to FIG. 15, the manner W5 includes the following steps.

W5-1. An MME determines that a terminal device completes joint registration.

W5-2. An IMS network element determines that a voice service cannot be set up in a PS domain of a first network or a second network.

W5-3. The IMS network element sends a second message to the terminal device.

For a method for implementing steps in the manner W5, refer to the foregoing description. Details are not described herein again.

In the manner, only after the MME determines that the terminal device completes joint registration, the IMS network element sends the second message to the terminal device. Therefore, it may be ensured that the terminal device successfully initiates a CSFB call.

Figure 16:
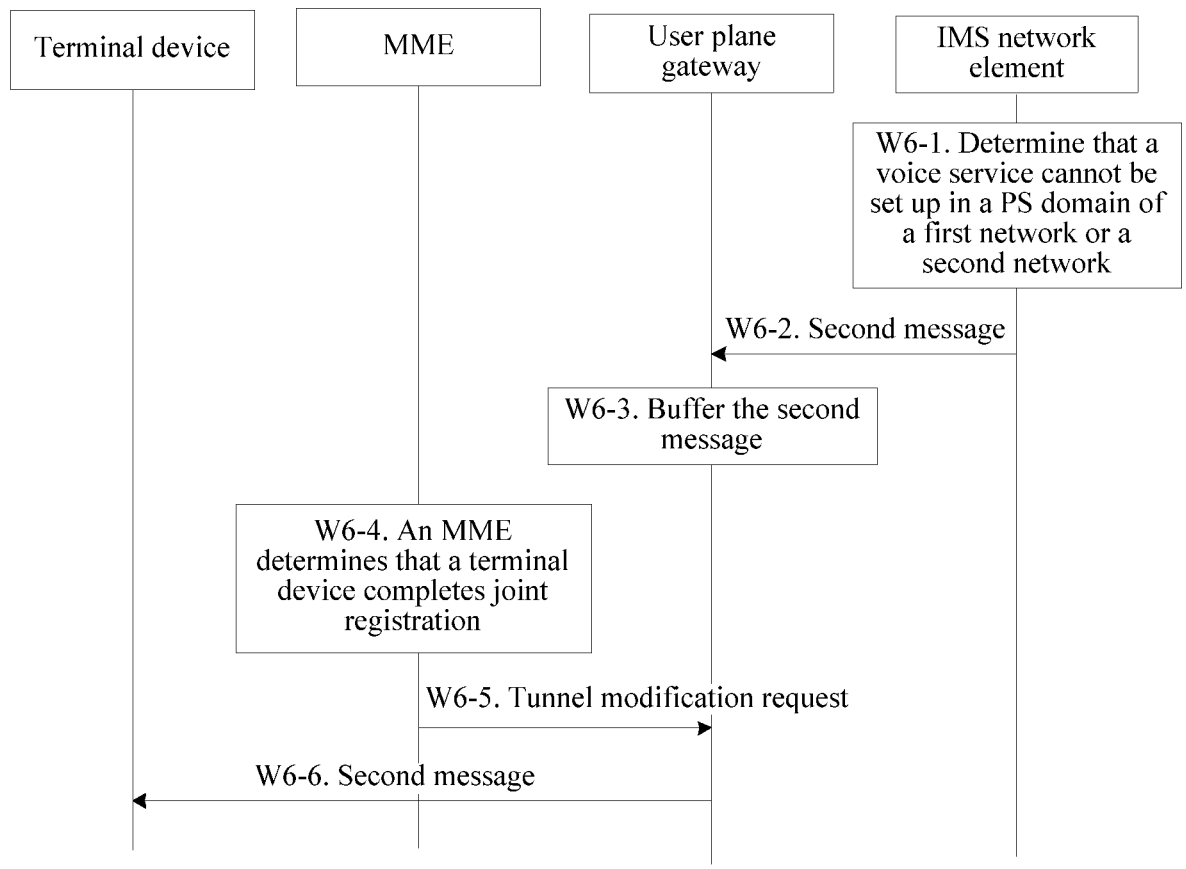

Manner W6:

Referring to FIG. 16, the manner W6 includes the following steps.

W6-1. The IMS network element determines that a voice service cannot be set up in a PS domain of a first network or a second network.

W6-2. The IMS network element sends a second message to a user plane gateway.

W6-3. The user plane gateway buffers the second message.

W6-4. An MME determines that a terminal device completes joint registration.

W6-5. The MME sends a tunnel modification request to the user plane gateway.

W6-6. After receiving the tunnel modification request, the user plane gateway sends the second message to the terminal device.

For a method for implementing steps in the manner W6 and meanings of related terms, refer to the foregoing description. Details are not described herein again.

In the manner, the user plane gateway first buffers the second message sent by the IMS network element, and after receiving the tunnel modification request, the user plane gateway sends the second message to the terminal device. The tunnel modification request is sent to the user plane gateway after the MME determines that the terminal device completes joint registration. Therefore, it may be ensured that the terminal device successfully initiates a CSFB call.

Figure 17:
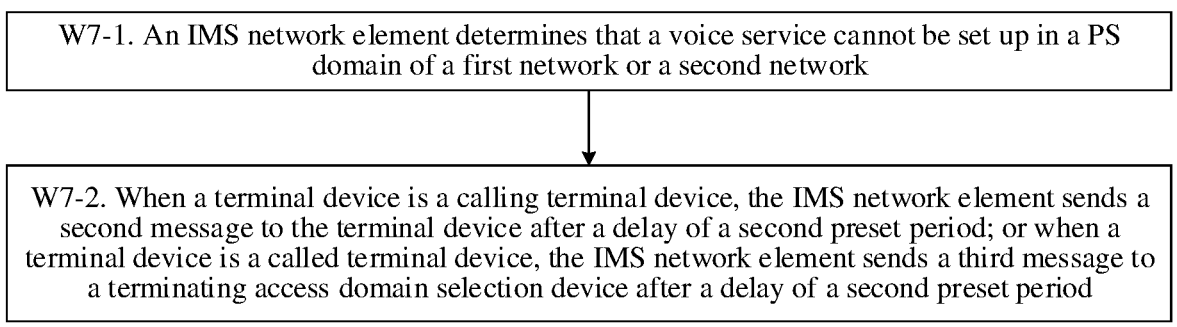

Manner W7:

Referring to FIG. 17, the manner W7 includes the following steps.

W7-1. An IMS network element determines that a voice service cannot be set up in a PS domain of a first network or a second network.

W7-2. When a terminal device is a calling terminal device, the IMS network element sends a second message to the terminal device after a delay of a second preset period; or when a terminal device is a called terminal device, the IMS network element sends a third message to a terminating access domain selection device after a delay of a second preset period.

For a method for implementing steps in the manner W7 and meanings of related terms, refer to the foregoing description. Details are not described herein again.

In the manner, it is considered that when the IMS network element triggers a CSFB service of the terminal device after the delay of the second preset period, the terminal device completes joint registration, thereby ensuring that the terminal device successfully initiates a CSFB call.

The first preset period and the second preset period may be preset based on an actual network situation, and the first preset period may be the same as or different from the second preset period. For example, the first preset period may be 500 ms, and the second preset period may be 100 ms.

It should be noted that, a 5G network is unlike a 2G/3G network in which a dedicated CS domain is deployed. Therefore, the 5G network cannot provide a CS voice service similar to a conventional voice to the terminal device. In the manner 3 and the manner 4, the method provided in the embodiments of this application may further enable the terminal device to perform a CS voice service when the terminal device cannot perform an IMS voice service.

This application further provides the following four embodiments, to describe the foregoing method in an example. Each of application scenarios of an embodiment (1) and an embodiment (2) is a scenario in which an IMS voice service cannot be performed in a 5G network but the IMS voice service may be performed in an EPS network, and each of application scenarios of an embodiment (3) and an embodiment (4) is a scenario in which an IMS voice service cannot be performed in a 5G network and the IMS voice service cannot be performed in an EPS network either. In each embodiment, there may be a calling side and a called side. Unless otherwise specified, UE and network elements in a method for describing the calling side are UE and network elements on the calling side, and UE and network elements in a method for describing the called side are UE and network elements on the called side.

Embodiment (1)

Figure 18A:
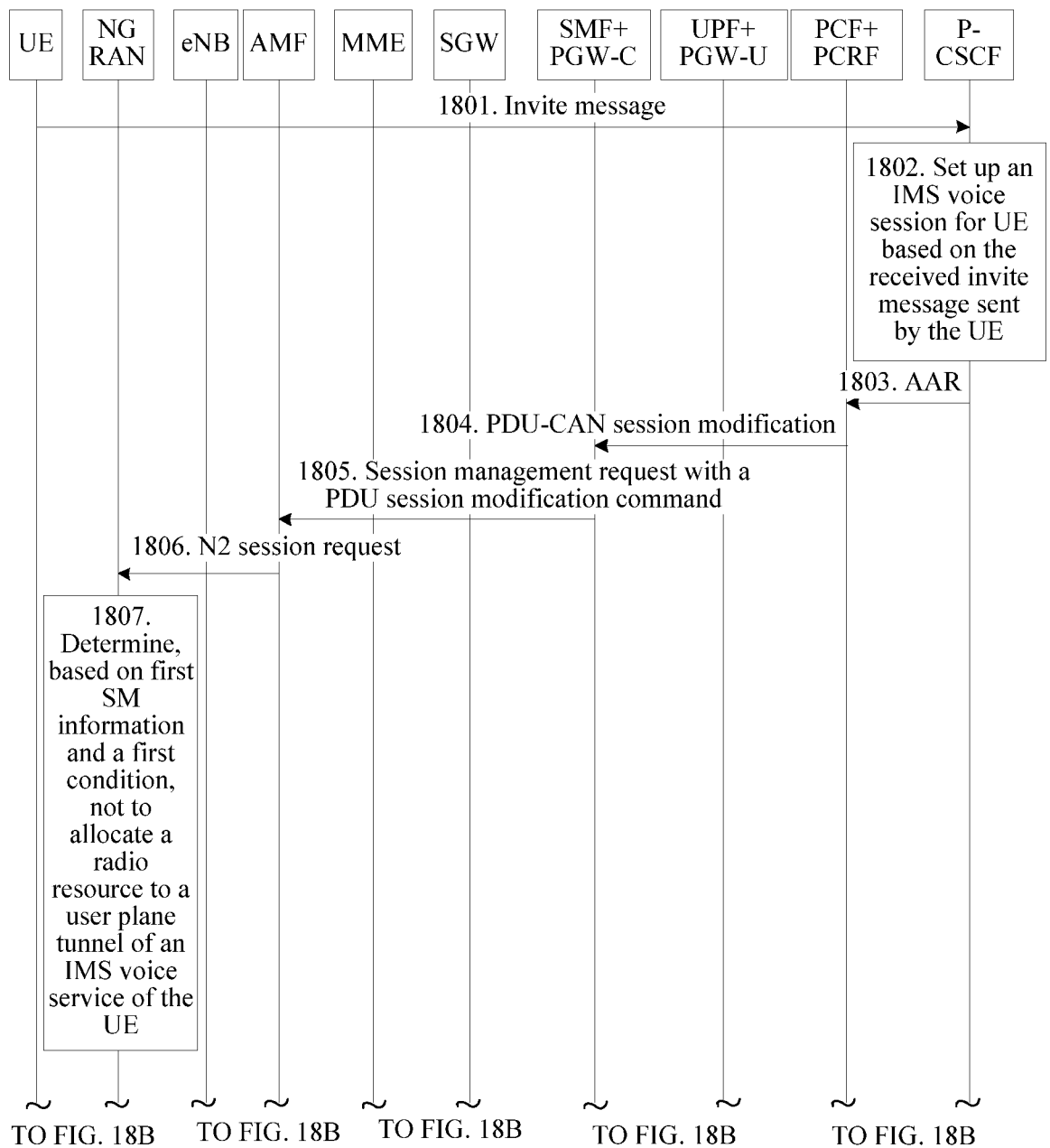
Figure 18B:
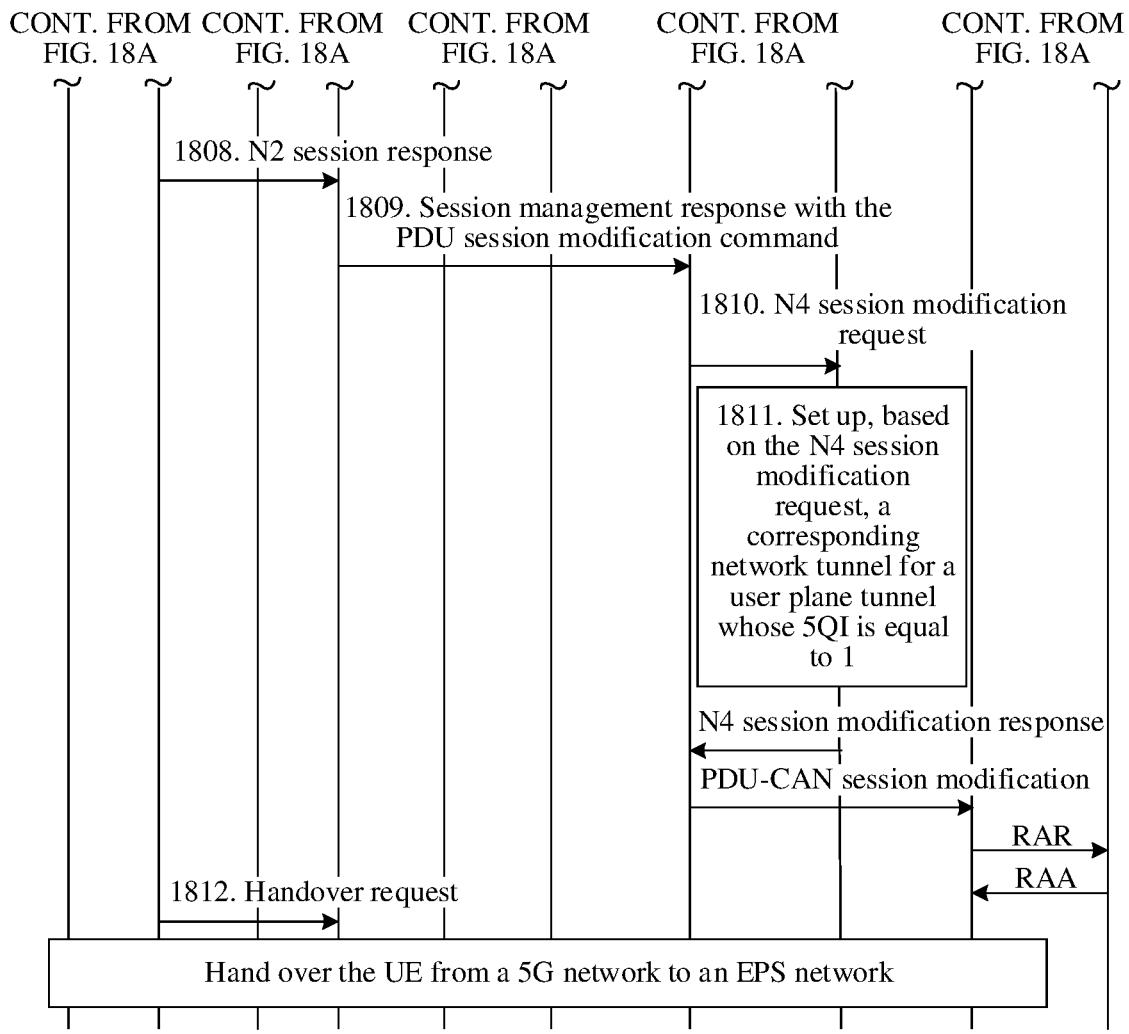

This embodiment provides a method for performing network handover of calling UE. Referring to FIG. 18A and FIG. 18B, the method includes the following steps.

1801. UE sends an invite message to a P-CSCF, where the invite message is for requesting to set up an IMS voice service.

The UE is UE in a 5G network, and the invite message is a message for requesting to set up, in a PS domain, a voice service for the UE in the 5G network.

1802. The P-CSCF sets up an IMS voice session for the UE based on the received invite message sent by the UE.

The P-CSCF further sends the invite message to a node (for example, an IMS node such as an S-CSCF and a TAS) in a subsequent calling IMS network, the node in the subsequent IMS network begins to process the received invite message, and called UE may receive the invite message of the calling UE forwarded by a called IMS network.

1803. The P-CSCF sends an authentication authorization request (AAR) to a PCF+PCRF to trigger setup of a user plane tunnel of the IMS voice service of the UE.

The AAR may carry a user identifier of the UE, an IMS application layer charging identifier, media description information of the IMS voice service, and the like. The media description information may include at least one piece of the following information: a classifier identifier, bandwidth requirement description information, media type description information, and a QoS parameter.

It should be noted that, the P-CSCF may directly send the AAR to the PCF+PCRF, or may send, after receiving a 183 response message sent by the S-CSCF in the IMS network, the AAR to the PCF+PCRF.

1804. The PCF+PCRF sends a packet data unit-connectivity access network (PDU-CAN) session modification process request to an SMF+PGW-C based on media description information carried in the AAR sent by the P-CSCF, to trigger a network element in a 5G network to set up the user plane tunnel for the IMS voice service of the UE.

The PDU-CAN session modification carries QoS rules, the QoS rules include a QoS parameter set (profile), a packet filter, and the like, and the QoS parameter set usually includes one or more of the following QoS key parameters: a GBR, an ARP, a 5QI, an MBR, and the like.

A user plane tunnel in the 5G network is usually a QoS flow used to transmit user plane data, and a 5QI of the user plane tunnel of the IMS voice service may be equal to 1 or another value. As an example of the method provided in this embodiment of this application, the 5QI of the user plane tunnel of the IMS voice service is equal to 1.

1805. After receiving the PDU-CAN session modification process request sent by the PCF+PCRF network element, the SMF+PGW-C sends a session management request with a PDU session modification command to an AMF, where the request includes first SM information, the first SM information is SM information related to the user plane tunnel of the IMS voice service of the UE, the first SM information may include QoS parameters of the user plane tunnel, for example, parameters such as a 5QI equal to 1, an ARP, a GBR, and an MBR, and the first SM information may further include other information.

1806. The AMF sends an N2 session request to an NG RAN based on the received first SM information sent by the SMF+PGW-C, where the first SM information is transparently transmitted to the NG RAN, so that the NG RAN allocates, based on the first SM information, a corresponding radio resource to the user plane tunnel whose 5QI is equal to 1.

1807. The NG RAN determines, based on the first SM information and a first condition, not to allocate a radio resource to the user plane tunnel of the IMS voice service of the UE.

It should be noted that, step 1807 may be performed or not performed. This is not specifically limited in this embodiment of this application.

The first condition may include the following conditions: (1) a condition that the IMS voice service cannot be performed in a 5G network, where the condition indicates that the IMS voice service is not deployed in the 5G network, or signal coverage of the current 5G network is too poor to satisfy a requirement of the IMS voice service; (2) a condition that an EPS network supports a voice service, where the condition may be configured, as a local policy, in the NG RAN by an operator; (3) a condition that signal quality of the EPS network satisfies a requirement of the voice service, where the NG RAN may determine, by instructing the UE to measure and report signal quality of a neighboring EPS cell, whether the signal quality of the EPS network satisfies the requirement of the voice service; and (4) a condition that a network device (the AMF, the NG RAN, or the like) of the 5G network and the UE support handover between the 5G network and the EPS network, where whether the UE and the AMF support handover between the 5G network and the EPS network may be notified, by using an N2 message, to the NG RAN by the AMF when the UE is changed from an idle state to a connected state.

1808. The NG RAN sends an N2 session response to the AMF.

The N2 session response includes second SM information, and the second SM information includes information indicating that setup of the user plane tunnel of the IMS voice service of the UE is accepted.

1809. The AMF sends a session management response with the PDU session modification command to the SMF+PGW-C based on the received N2 session response, where the second SM information is transparently transmitted to the SMF+PGW-C.

1810. The SMF+PGW-C sends an N4 session modification request to a UPF+PGW-U based on the received session management response with the PDU session modification command sent by the AMF. N4 herein indicates that an N4 interface is between the SMF+PGW-C and the UPF+PGW-U, but a name of the interface is not limited in this embodiment of this application, that is, a name of the message is not limited to the N4 session modification request.

The N4 session modification request carries packet detection, an enforcement rule, a reporting rule, core network tunnel information, and the like related to the user plane tunnel whose 5QI is equal to 1, so that the UPF+PGW-U can set up a corresponding core network tunnel for the user plane tunnel whose 5QI is equal to 1.

The UPF+PGW-U receives the N4 session modification request sent by the SMF+PGW-C, and sets up, based on the N4 session modification request, a corresponding core network tunnel for the user plane tunnel whose 5QI is equal to 1.

It should be noted that, a user plane tunnel in the 5G network is usually a QoS flow used to transmit user plane data, and a user plane tunnel in the EPS network is usually a bearer used to transmit user plane data. After setting up the corresponding user plane tunnel for the user plane tunnel whose 5QI is equal to 1, the UPF+PGW-U switches the user plane tunnel in a process of handing over the UE from the 5G network to the EPS network, that is, switches the user plane tunnel from a QoS flow whose 5QI is equal to 1 to a dedicated bearer whose QCI is equal to 1. Specifically, the SMF+PGW-C may determine, by using a received tunnel modification request sent by an SGW, that the user plane tunnel whose 5QI is equal to 1 of the UE in the 5G network is switched to a user plane tunnel whose QCI is equal to 1 in the EPS network, and the user plane tunnel whose QCI is equal to 1 is set up successfully. After the UE is handed over from the 5G network to the EPS network, and the UE receives related signaling of the IMS voice service forwarded by the EPS network, the UE continues to perform a subsequent IMS voice call setup process in the EPS network, thereby completely setting up the IMS voice session.

After step 1811, the UPF+PGW-U further sends an N4 session modification response to the SMF+PGW-C, the SMF+PGW-C sends the PDU-CAN session modification to the PCF+PCRF, the PCF+PCRF sends a re-authentication request (RAR) to the P-CSCF, and the P-CSCF sends a credit re-authentication answer (RAA) to the PCF+PCRF. Therefore, the P-CSCF can learn that the user plane tunnel of the IMS voice service is set up successfully.

1812. The NG RAN sends a handover request to the AMF based on the received first SM information and the first condition to trigger the UE to be handed over from the 5G network to the EPS network.

Specifically, when the first condition is satisfied, and the NG RAN determines, based on the first SM information, that a user plane tunnel whose 5QI is equal to 1 needs to be set up, the handover request may be sent to the AMF.

For a handover process of handing over the UE from the 5G network to the EPS network, refer to a standard protocol. Details are not described herein again. After the UE is handed over from the 5G network to the EPS network, and the UE receives related signaling of the IMS voice service forwarded by the EPS network, the UE continues to perform a subsequent IMS voice call setup process in the EPS network, thereby completely setting up the IMS voice session.

Figure 19A:
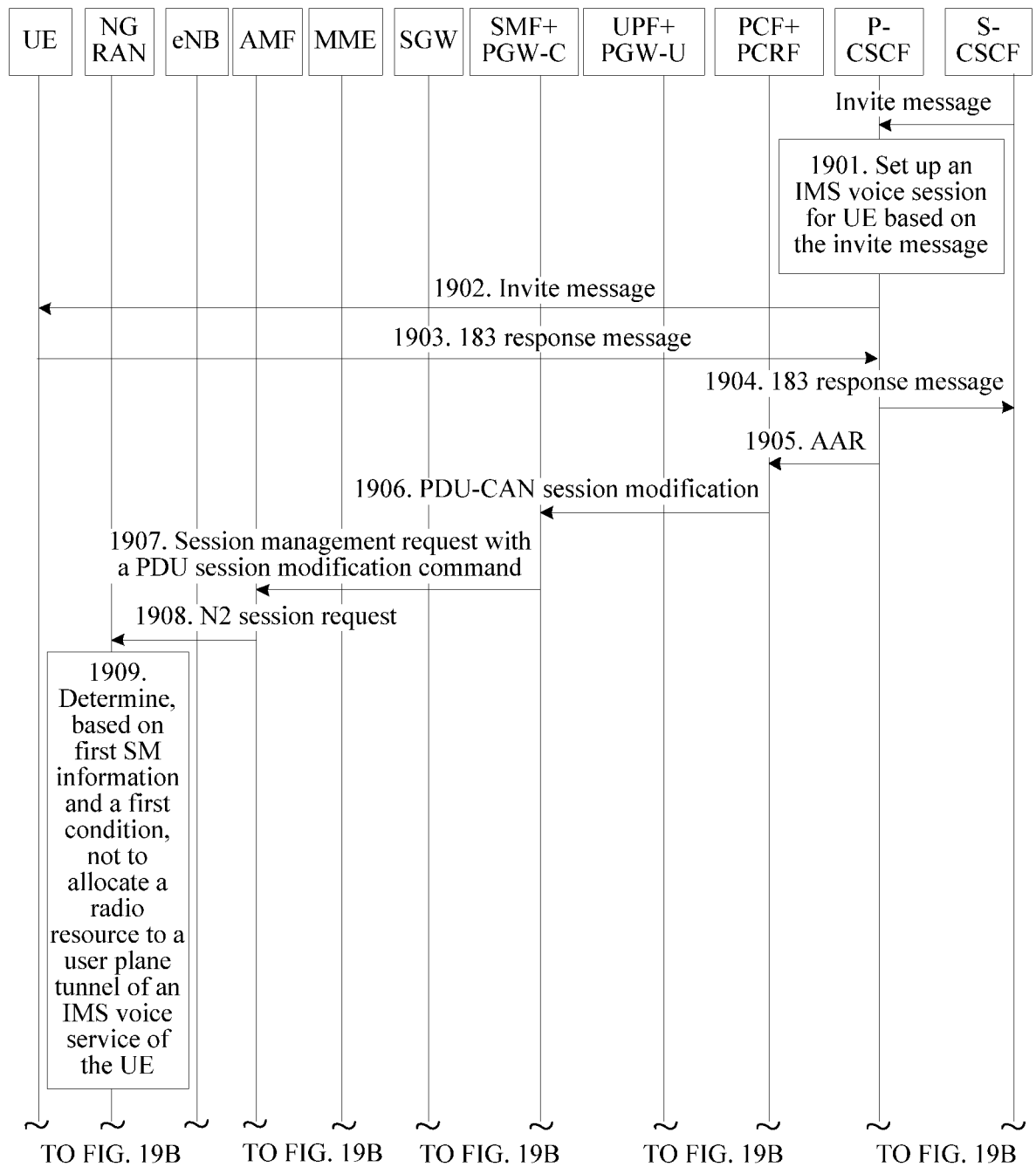
Figure 19B:
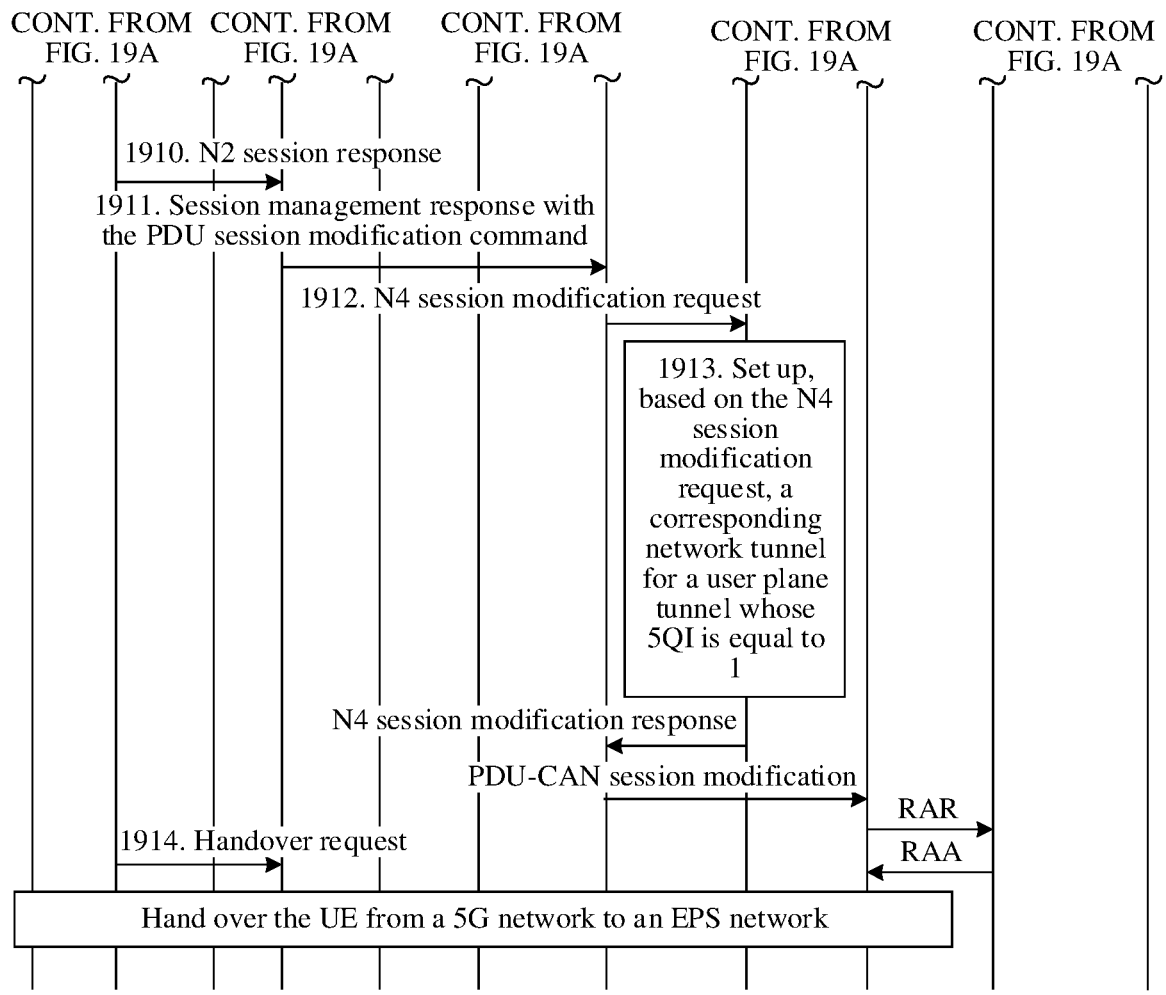

This embodiment further provides a method for performing network handover of called UE. Referring to FIG. 19A and FIG. 19B, the method includes the following steps.

1901. A P-CSCF receives an invite message sent by an S-CSCF, and sets up an IMS voice session for UE based on the invite message.

The invite message is a message for requesting to set up, in a PS domain, a voice service for the UE in a 5G network.

1902. The P-CSCF sends the invite message to the UE.

1903. The UE receives the invite message sent by the P-CSCF and replies to the P-CSCF with a 183 response message.

1904. The P-CSCF receives the 183 response message sent by the UE, and sends the 183 response message to the S-CSCF.

The S-CSCF may further send the 183 response message to a calling S-CSCF, the calling S-CSCF further sends the 183 response message to a calling P-CSCF, and if receiving the 183 response message sent by the calling S-CSCF, the calling P-CSCF may forward the 183 response message to calling UE.

1905 to 1914.

Steps 1905 to 1914 are respectively correspondingly the same as steps 1803 to 1812. That is, step 1905 is the same as step 1803, step 1906 is the same as step 1804, the rest may be deduced by analogy, step 1914 is the same as step 1812, and the following similar description has a same meaning.

Embodiment (1) provides a method for performing network handover of a terminal device in a scenario in which an IMS voice service cannot be performed in a 5G network but the IMS voice service may be performed in an EPS network. When receiving a request for setting up a user plane tunnel whose 5QI is equal to 1, the NG RAN can hand over a 5G terminal to the EPS network in time, so that the terminal device in 5G continues to perform the IMS voice call setup process in the EPS network.

Embodiment (2)

Figure 20:
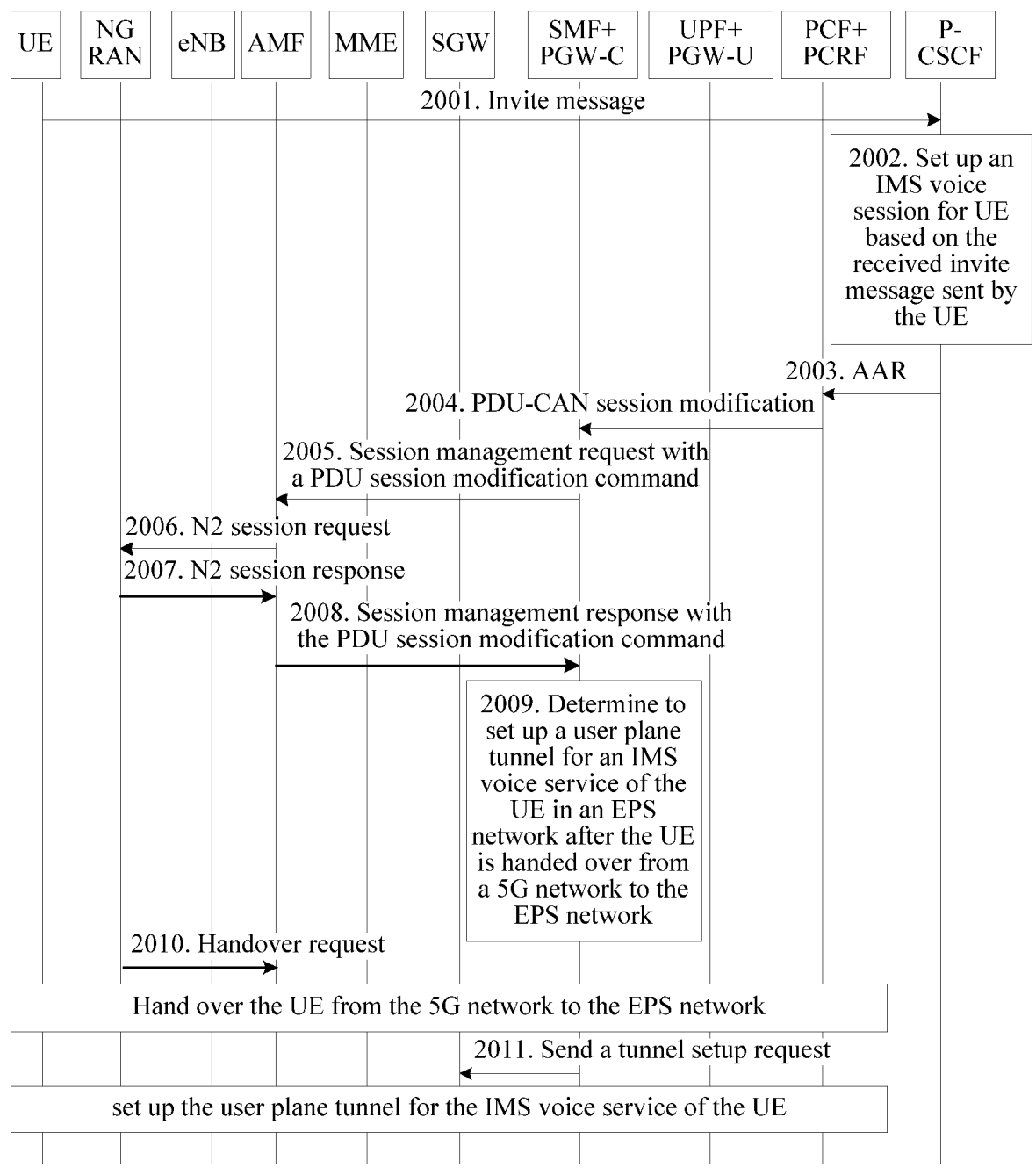

This embodiment provides a method for performing network handover of calling UE. Referring to FIG. 20, the method includes the following steps.

2001 to 2006.

Steps 2001 to 2006 are respectively correspondingly the same as steps 1801 to 1806.

2007. The NG RAN sends an N2 session response to the AMF based on the first SM information and a first condition.

The NG RAN may determine, based on the first SM information, that the user plane tunnel of the IMS voice service that is specifically the user plane tunnel whose 5QI is equal to 1 is requested to be set up.

The N2 session response includes third SM information, the third SM information may include SM information indicating that the NG RAN rejects allocation of a radio resource to the user plane tunnel whose 5QI is equal to 1 and carry reason information indicating rejection, and the reason information is that the UE is performing a handover process. Furthermore, the reason information may be that the UE is performing handover from the 5G network to the EPS network, so that the SMF+PGW-C determines, based on the reason information, to initiate setup of the user plane tunnel of the IMS voice service of the UE after the handover process of the UE ends.

The first condition may include the following conditions: (1) a condition that the IMS voice service cannot be performed in a 5G network, where the condition indicates that the IMS voice service is not deployed in the 5G network, or signal coverage of the current 5G network is too poor to satisfy a requirement of the IMS voice service; (2) a condition that an EPS network supports a voice service, where the condition may be configured, as a local policy, in the NG RAN by an operator; (3) a condition that signal quality of the EPS network satisfies a requirement of the voice service, where the NG RAN may determine, by instructing the UE to measure and report signal quality of a neighboring EPS cell, whether the signal quality of the EPS network satisfies the requirement of the voice service; and (4) a condition that a network device (the AMF, the NG RAN, or the like) of the 5G network and the UE support handover between the 5G network and the EPS network, where whether the UE and the AMF support handover between the 5G network and the EPS network may be notified, by using an N2 message, to the NG RAN by the AMF when the UE is changed from an idle state to a connected state.

2008. The AMF sends the session management request with the PDU session modification command to the SMF+PGW-C based on the received N2 session response, where the third SM information is transparently transmitted to the SMF+PGW-C.

2009. The SMF+PGW-C determines, based on the third SM information in the received session management request with the PDU session modification command sent by the AMF, to set up a user plane tunnel for the IMS voice service of the UE in an EPS network after the UE is handed over from the 5G network to the EPS network.

It should be noted that, the setting up a user plane tunnel for the IMS voice service of the UE in the EPS network is setting up a user plane tunnel whose QCI is equal to 1.

In a process of handing over the UE from the 5G network to the EPS network, the SMF+PGW-C may determine, by using a received tunnel modification request sent by an SGW, that the UE is successfully handed over from the 5G network to the EPS network. Alternatively, the SMF+PGW-C may further set a timer, and trigger the timer at the beginning of receiving the third SM information. If the timer times out, it is determined that the UE is successfully handed over from the 5G network to the EPS network.

2010. The NG RAN sends a handover request to the AMF based on the received first SM information and the first condition to trigger the UE to be handed over from the 5G network to the EPS network.

Specifically, when the first condition is satisfied, and the NG RAN determines, based on the first SM information, that a user plane tunnel whose 5QI is equal to 1 needs to be set up, the handover request may be sent to the AMF.

For a handover process of handing over the UE from the 5G network to the EPS network, refer to a standard protocol. Details are not described herein again.

2011. The SMF+PGW-C sends, after handover of the UE is completed, a tunnel setup request (create bearer request) to the SGW to trigger setup of a user plane tunnel whose QCI is equal to 1.

Subsequently, the user plane tunnel whose QCI is equal to 1 is successfully set up in the EPS network, and the EPS network feeds back, to an IMS network, that the user plane tunnel of the IMS voice service is successfully set up. For details of a process of setting up the user plane tunnel whose QCI is equal to 1 and a process of setting up the IMS voice session in the EPS network, refer to a standard protocol. Details are not described herein again.

Figure 21:
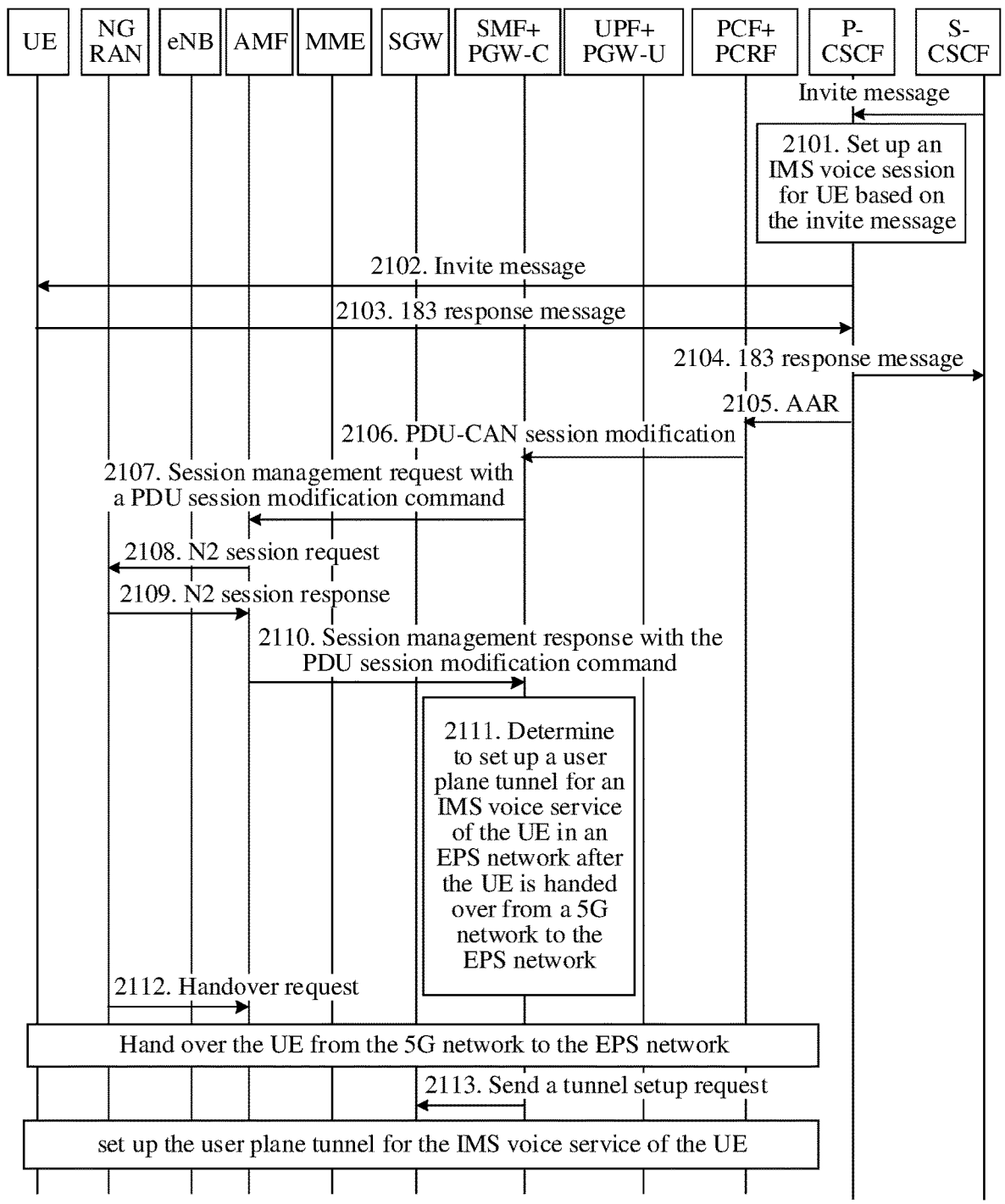

This embodiment further provides a method for performing network handover of called UE. Referring to FIG. 21, the method includes the following steps.

2101 to 2113.

Steps 2101 to 2104 are respectively correspondingly the same as steps 1901 to 1904, and steps 2105 to 2113 are respectively correspondingly the same as steps 2003 to 2111.

Embodiment (2) provides a method for performing network handover of a terminal device in a scenario in which an IMS voice service cannot be performed in a 5G network but the IMS voice service may be performed in an EPS network. When receiving a request for setting up a user plane tunnel whose 5QI is equal to 1, the NG RAN can hand over a 5G terminal to the EPS network in time, so that the terminal device in 5G continues to perform the IMS voice call setup process in the EPS network. Moreover, the NG RAN rejects setup of the user plane tunnel whose 5QI is equal to 1 based on reason information being that handover is being performed, so as to trigger a gateway of a core network to set up the user plane tunnel whose QCI is equal to 1 after the UE is successfully handed over to the EPS network.

Embodiment (3)

Figure 22A:
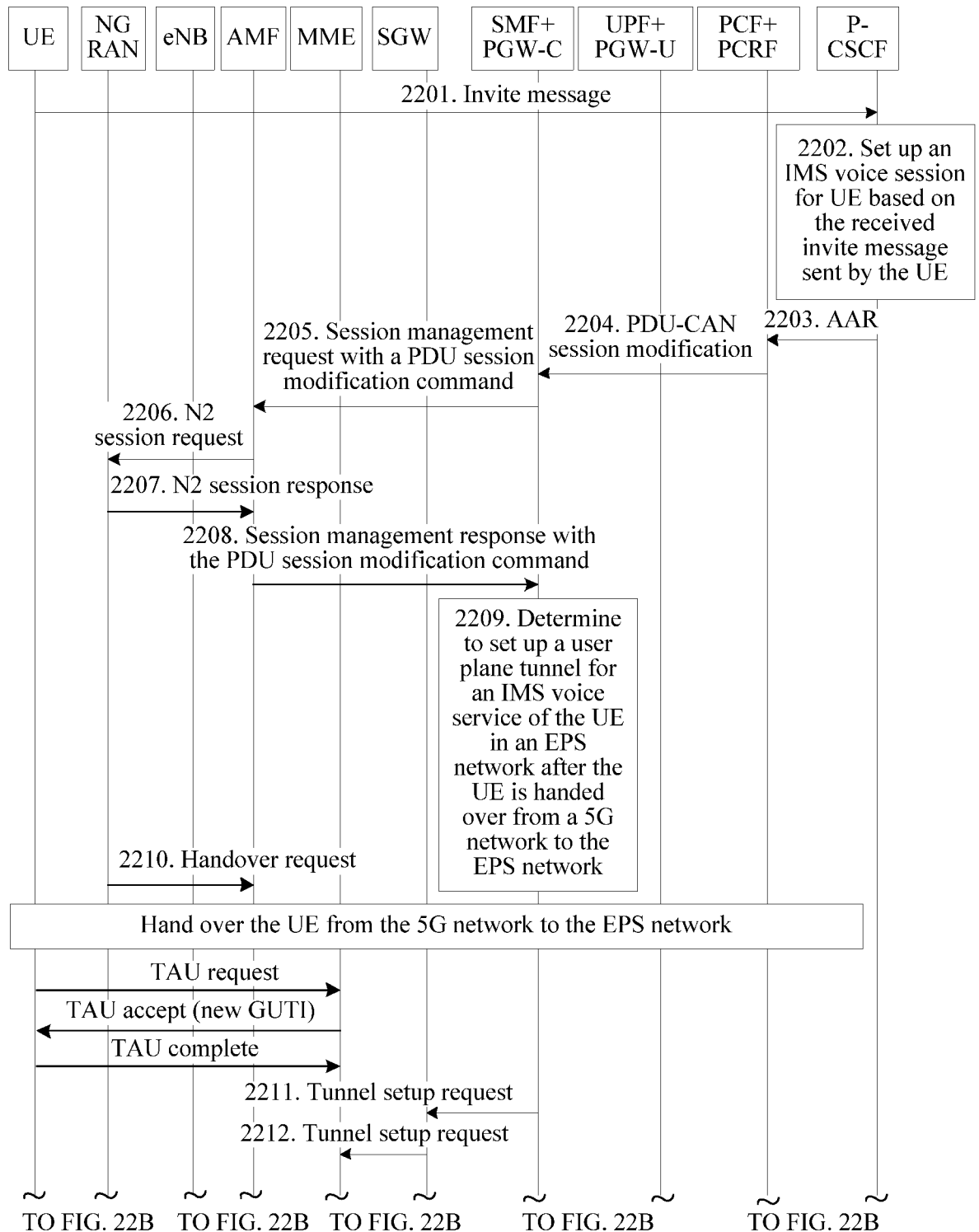
Figure 22B:
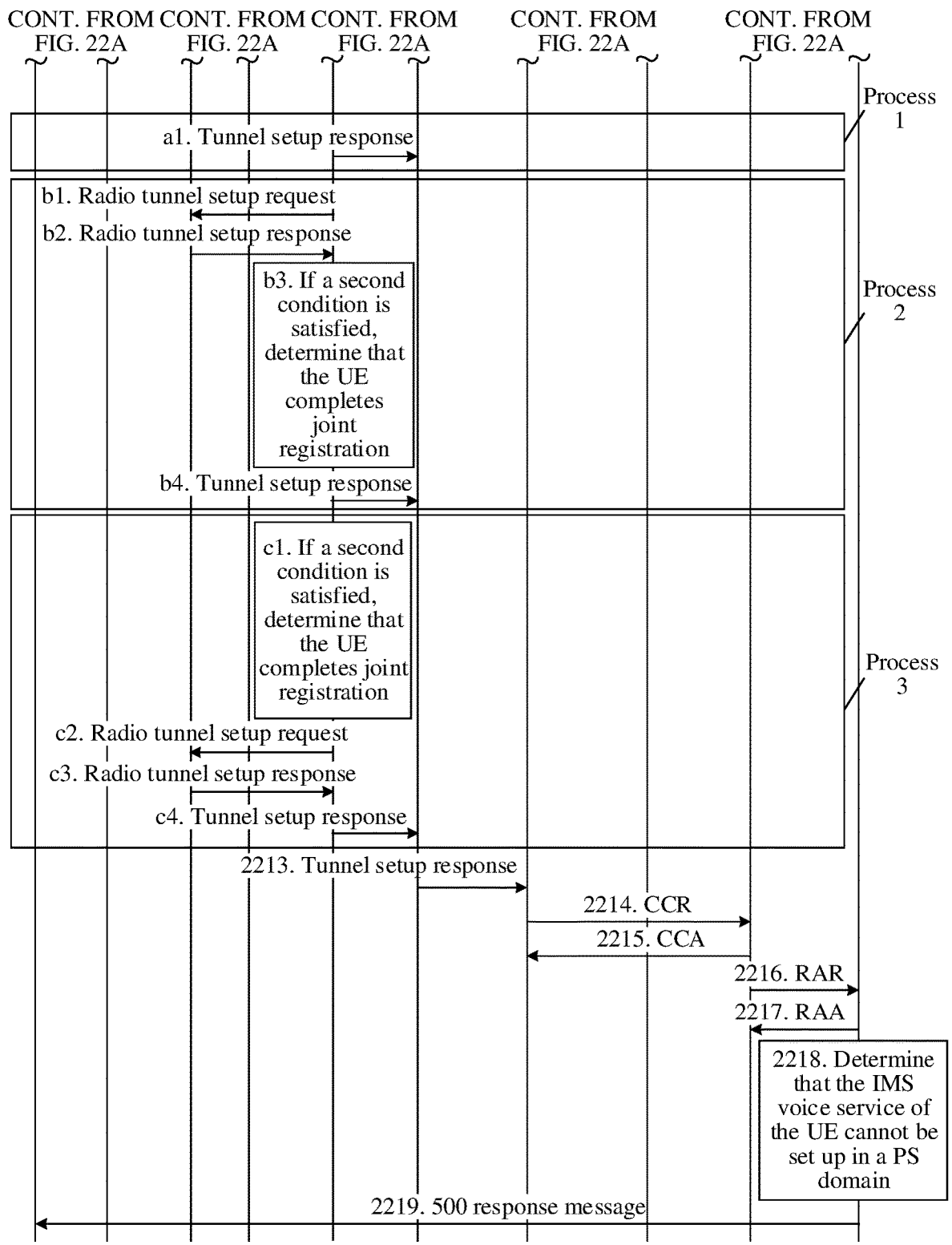

This embodiment provides a method for performing network handover of calling UE. Referring to FIG. 22A and FIG. 22B, the method includes the following steps.

2201 to 2210.

Steps 2201 to 2210 are respectively correspondingly the same as steps 2001 to 2010.

2211. The SMF+PGW-C sends, after handover of the UE is completed, a tunnel setup request to the SGW to trigger setup of a user plane tunnel whose QCI is equal to 1.

2212. The SGW forwards the tunnel setup request to an MME.

After step 2212, the MME receives the tunnel setup request and performs any one of a process 1 (which includes a1), a process 2 (which includes b1 to b4), and a process 3 (which includes c1 to c4) in the following processes.

Process 1:

a1. The MME sends a tunnel setup response to the SGW based on a second condition, where the tunnel setup response includes information indicating that setup of the user plane tunnel of the voice service of the UE is rejected.

In the process 1, the second condition may include that the voice service cannot be performed in the second network, and may further include at least one of that the UE is UE handed over from the 5G network to the EPS network and that the UE completes joint registration, where that the voice service cannot be performed in the second network may specifically mean that the IMS voice service cannot be performed in the second network, and that the UE completes joint registration means that the UE completes a joint registration process of an EPS and a CS domain.

Specifically, the MME may determine, based on a received registration complete message sent by the UE, that the UE completes joint registration.

Before a1, the MME may send a radio tunnel setup request to an eNB for the IMS voice service and receive a response message, or may neither send a radio tunnel setup request nor receive a response message. This is not limited herein.

Process 2:

b1. The MME sends a radio tunnel setup request to an eNB, where the radio tunnel setup request is for requesting to set up the user plane tunnel for the IMS voice service of the UE. Specifically, the user plane tunnel of the IMS voice service may be a dedicated bearer whose QCI is equal to 1.

b2. The eNB receives the radio tunnel setup request, and sends a radio tunnel setup response to the MME based on a second condition, where the radio tunnel setup response includes information indicating that setup of the user plane tunnel of the IMS voice service of the UE is rejected.

In the process 2, the second condition includes that the IMS voice service cannot be performed in the second network, and may further include that the UE is UE handed over from the 5G network to the EPS network.

b3. The MME receives the radio tunnel setup response sent by the eNB, and if the second condition is satisfied, the MME determines that the UE completes joint registration.

The radio tunnel setup response includes the information indicating that setup of the user plane tunnel of the IMS voice service of the UE is rejected.

Specifically, during specific implementation of step b3, when the MME determines that a registration complete message sent by the UE is received, the MME determines that the UE completes joint registration.

b4. The MME sends a tunnel setup response to the SGW, where the tunnel setup response includes the information indicating that setup of the user plane tunnel of the IMS voice service of the UE is rejected.

Process 3:

c1. If a second condition is satisfied, the MME determines that the UE completes joint registration.

Specifically, during specific implementation of step c1, when the MME determines that a registration complete message sent by the UE is received, the MME determines that the UE completes joint registration.

In the process 3, the second condition includes that the IMS voice service cannot be performed in the second network, and may further include that the UE is UE handed over from the 5G network to the EPS network.

c2. The MME sends a radio tunnel setup request to an eNB, where the radio tunnel setup request is for requesting to set up the user plane tunnel for the IMS voice service of the UE.

c3. The eNB receives the radio tunnel setup request sent by the MME, and sends a radio tunnel setup response to the MME based on a second condition, where the radio tunnel setup response includes information indicating that setup of the user plane tunnel of the IMS voice service of the UE is rejected.

c4. The MME receives the radio tunnel setup response sent by the eNB, and sends a tunnel setup response to the SGW based on the radio tunnel setup response, where the tunnel setup response includes the information indicating that setup of the user plane tunnel of the IMS voice service of the UE is rejected.

2213. The SGW receives a tunnel setup response sent by the MME, and sends the tunnel setup response to the SMF+PGW-C.

2214. The SMF+PGW-C sends a CCR to a PCF+PCRF.

The CCR carries an indication for indicating that setup of the user plane tunnel whose QCI is equal to 1 fails, and may further carry reason information indicating that setup of the tunnel fails, and the reason information is specifically set with reference to reason information carried in the tunnel setup response sent by the SGW. The CCR herein may be further replaced with a message having another name, for example, an IP-CAN session modification request. This is not limited herein.

2215. The PCF+PCRF sends a credit control answer (CCA) to the SMF+PGW-C.

2216. The PCF+PCRF sends an RAR to a P-CSCF based on the CCR, where the RAR may carry indication information for indicating that a radio resource is insufficient (or indication information for indicating that resource allocation fails).

2217. The P-CSCF sends an RAA to the PCF+PCRF.

2218. The P-CSCF determines, based on the obtained indication information indicating that the radio resource is insufficient (or indication information indicating that resource allocation fails), that the IMS voice service of the UE cannot be set up in a PS domain.

2219. The P-CSCF sends a 500 response message to the UE.

After step 2219, after receiving the 500 response message sent by the P-CSCF, the UE may perform calling domain selection and initiate a CSFB call, a UE side cooperates with a network side to perform a CSFB process, and finally a voice call may be set up in a CS domain.

After step 2219, if the P-CSCF receives a 183 response message, the P-CSCF may send a cancel message to a node in an IMS network such as an S-CSCF, to cancel a requested call related to the IMS voice service.

It should be noted that, in a process of handing over the UE from the 5G network to the EPS network, a mobility management network element serving the UE is changed from the AMF to the MME. Therefore, the MME allocates a new globally unique temporary identity (GUTI) to the UE. Referring to FIG. 22A and FIG. 22B, after the handover process, the UE sends a tracking area update (TAU) request to the MME, and when receiving the TAU request sent by the NG RAN, the MME provides the allocated new GUTI to the UE by using a TAU accept message, so that after receiving the TAU accept message carrying the new GUTI, the UE replies to the MME with a TAU complete message (that is, a joint registration complete message).

In the foregoing description of this embodiment, only after determining that the UE completes the joint registration process of the EPS and the CS domain, the MME sends the tunnel setup response to the SGW, aiming to ensure that a message indicating that setup of the user plane tunnel whose QCI is equal to 1 fails reaches the IMS network only after the UE completes the joint registration process of the EPS and the CS domain, so that the 500 response message sent by the IMS network may reach the UE only after the UE completes the joint registration process of the EPS and the CS domain, to finally ensure that the UE successfully initiates the CSFB call.

To ensure that the 500 response message sent by the IMS network may reach the UE only after the UE completes the joint registration process of the EPS and the CS domain, in addition to enabling the MME to send, only after determining that the UE completes the joint registration process of the EPS and the CS domain, the tunnel setup response to the SGW, any one of the following manner 1 to manner 5 may be implemented.

Manner 1. The SMF+PGW-C sends the tunnel setup request to the SGW after a delay of a first preset period based on the second condition.

In the manner 1, the second condition includes that the IMS voice service cannot be performed in the EPS network.

Manner 2. The SMF+PGW-C sends the CCR to the PCF+PCRF after a delay of a first preset period.

Manner 3. After obtaining the indication information indicating that the radio resource is insufficient or the indication information indicating that resource allocation fails, the P-CSCF sends the 500 response message to the UE after a delay of a second preset period.

Manner 4. After the SMF+PGW-C sends the CCR to the PCF+PCRF, the SMF+PGW-C instructs the UPF+PGW-U to buffer, for a first preset period, data that is on a user plane tunnel whose QCI is equal to 5 and that is to be sent to the UE, and after the first preset period, the UPF+PGW-U may continue to send the data to the UE.

Manner 5. After determining that the UE completes joint registration, the P-CSCF sends the 500 response message to the UE.

During specific implementation, the manner 5 may include: after a second preset period since the P-CSCF determines that a voice service cannot be set up in the PS domain of the 5G network or the EPS network, determining, by the P-CSCF, that the terminal device completes joint registration; or determining, by the P-CSCF based on registration location information of the terminal device obtained from an HSS/home location register (HLR), that the terminal device completes joint registration.

The first preset period and the second preset period may be set based on an actual network communication condition. For example, the first preset period and the second preset period may each be 500 ms.

Figure 23A:
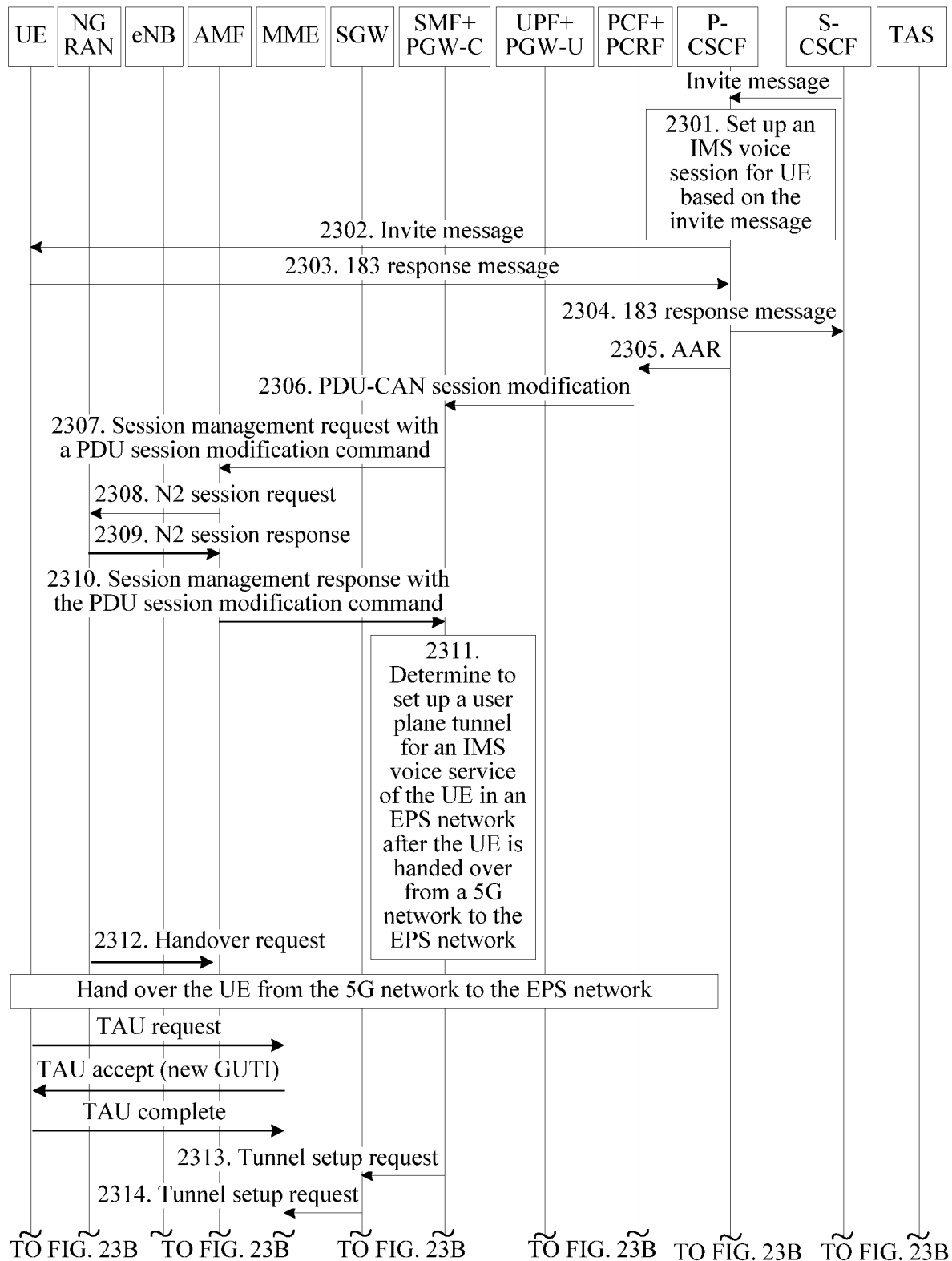
Figure 23B:
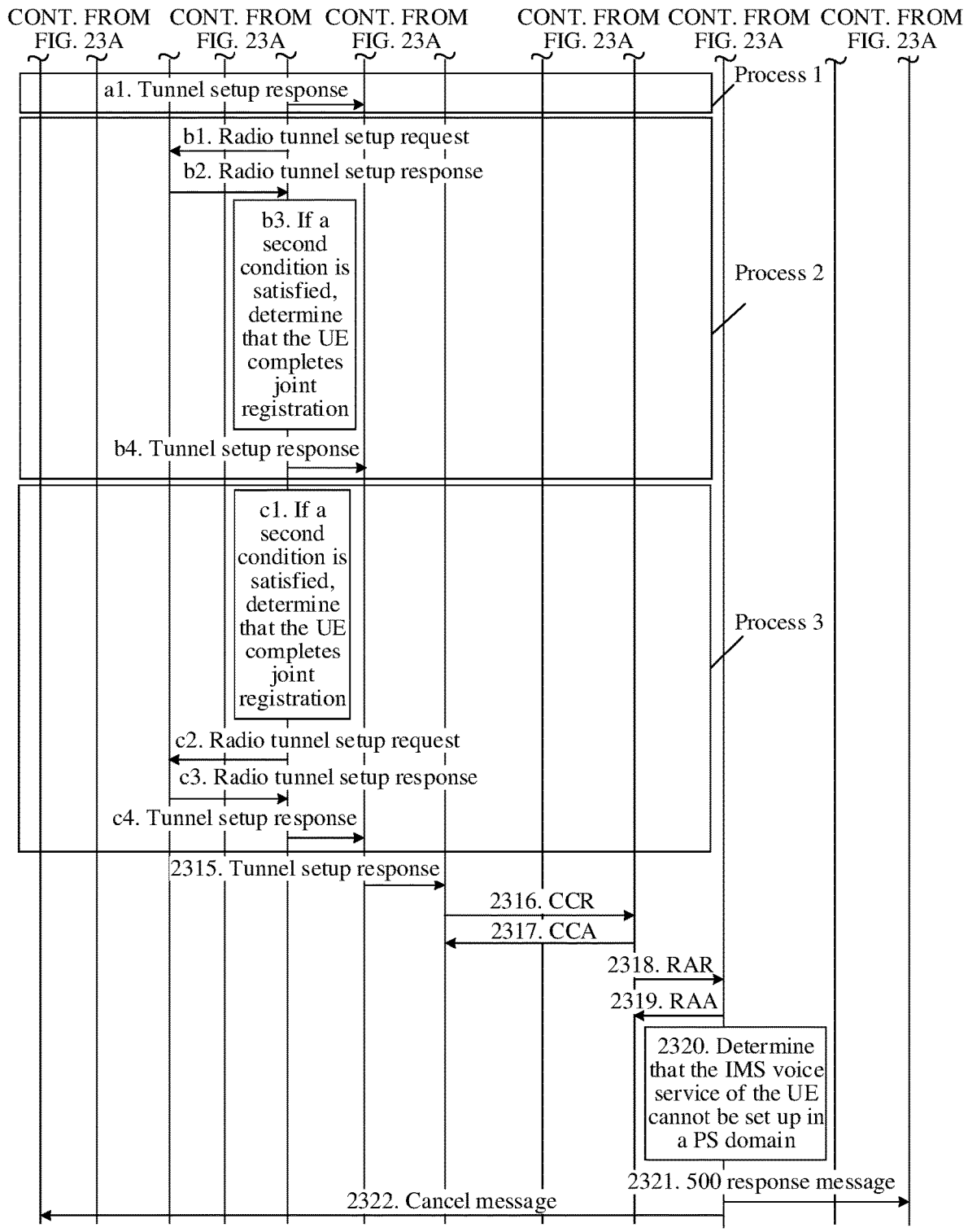
Figure 24:
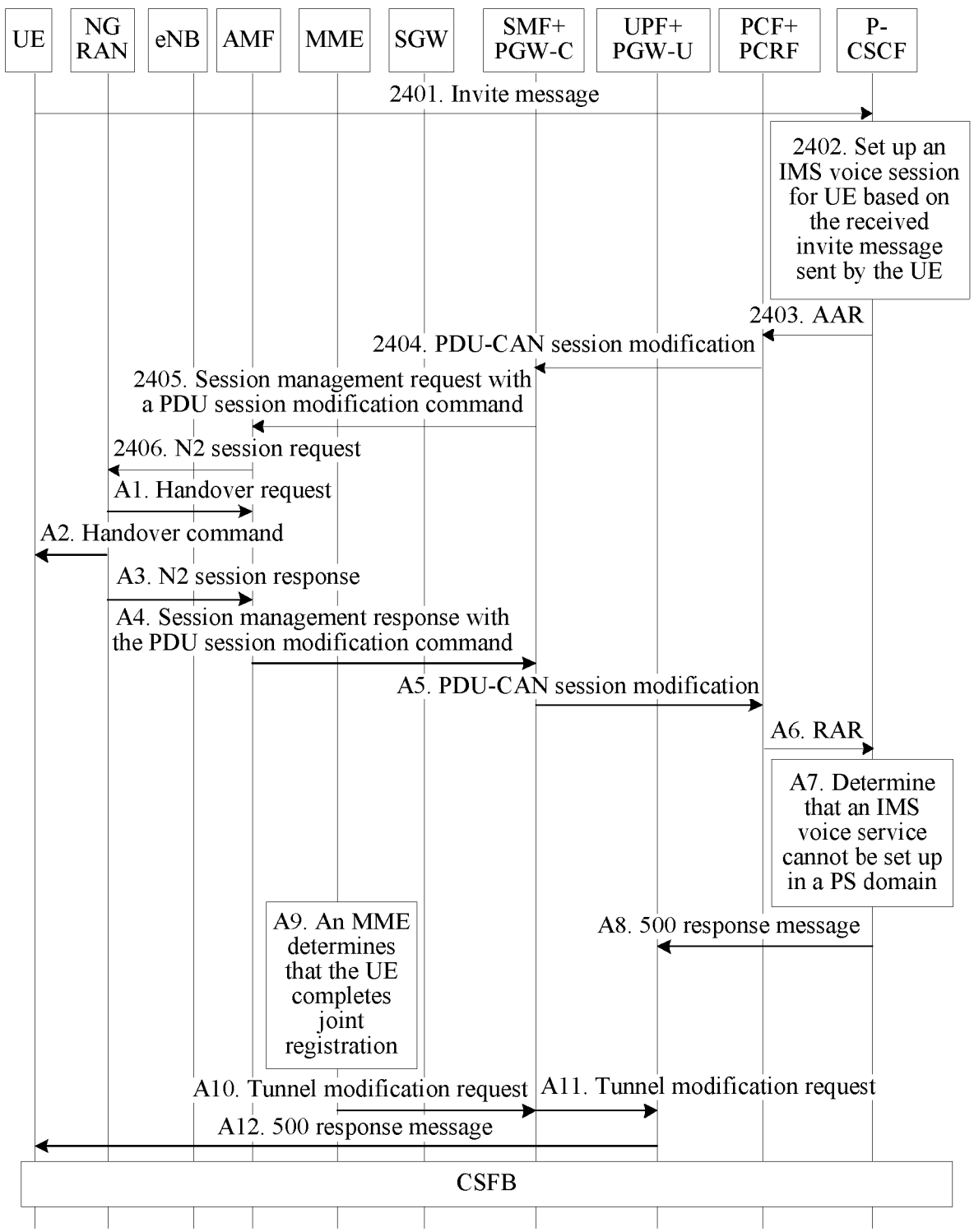
Figure 25:
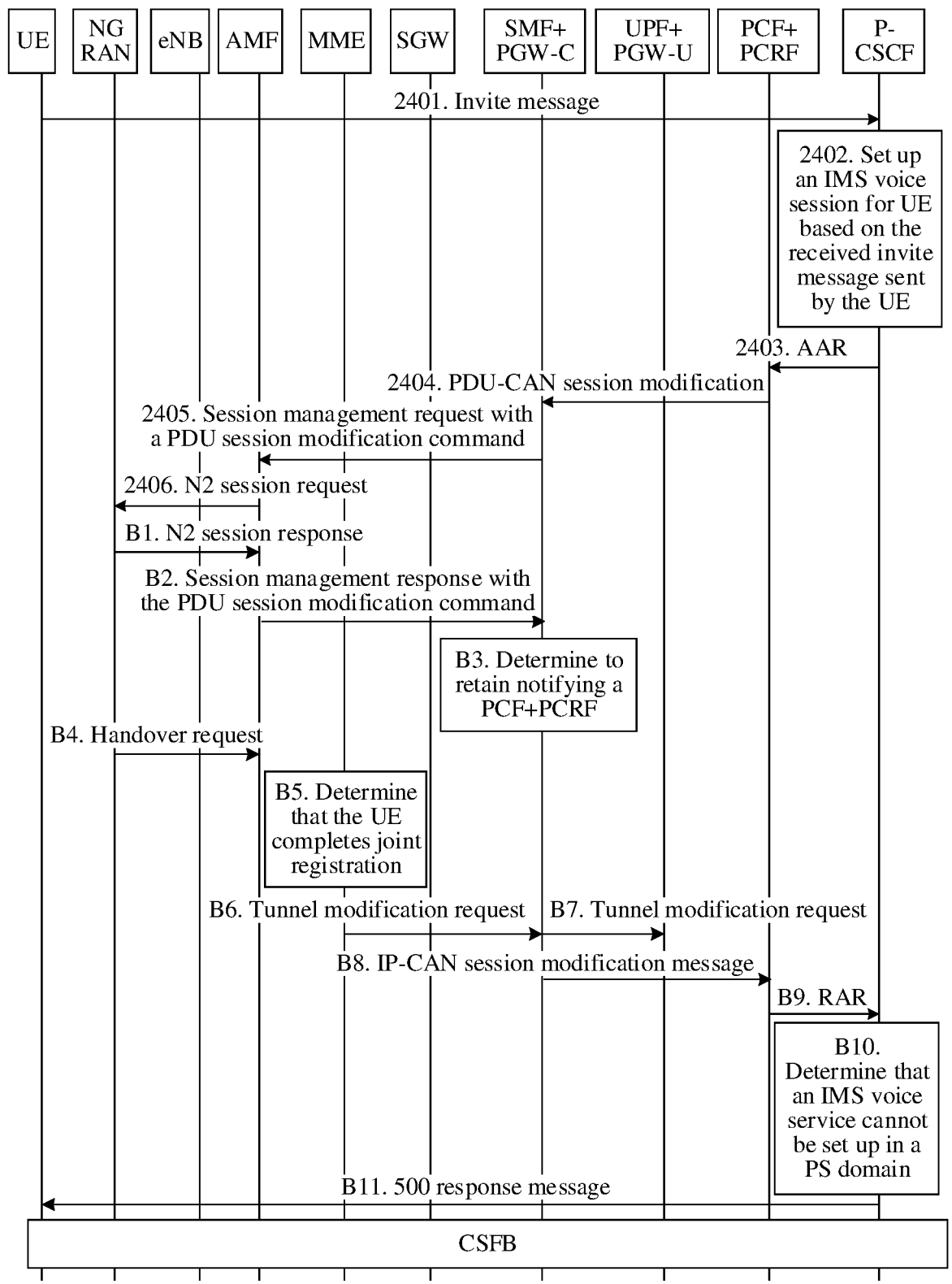
Figure 26:
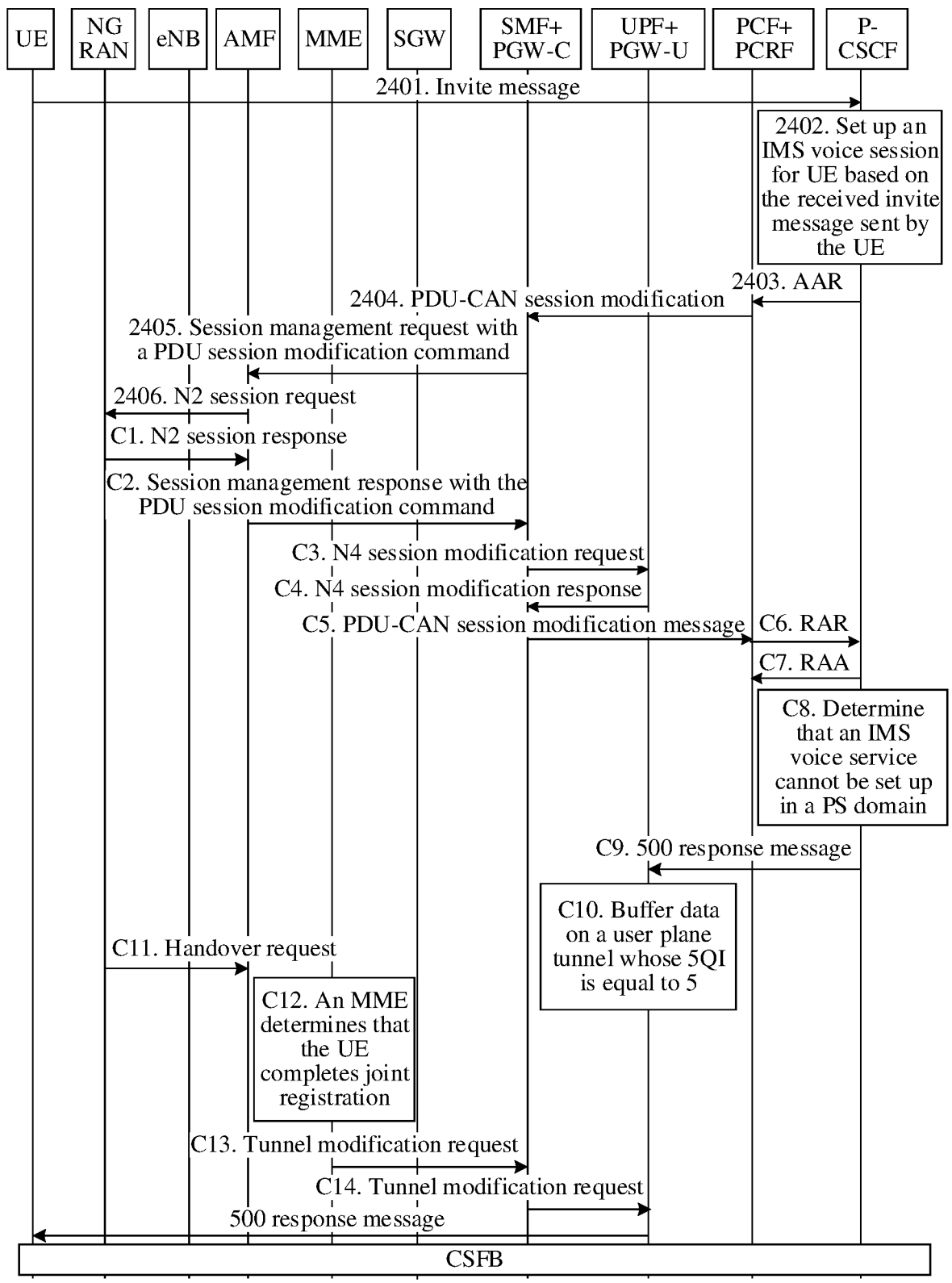

This embodiment further provides a method for performing network handover of called UE. Referring to FIG. 23A and FIG. 23B, the method includes the following steps.

2301 to 2304.

Steps 2301 to 2304 are respectively correspondingly the same as steps 1901 to 1904.

2305 to 2320.

Steps 2305 to 2320 are respectively correspondingly the same as steps 2203 to 2218.

2321. The P-CSCF sends a 500 response message to a TAS in an IMS network through the S-CSCF based on the obtained indication information indicating that the radio resource is insufficient (or indication information indicating that resource allocation fails), where the 500 response message is specifically sent to a terminating access domain selection function module T-ADS in the TAS.

2322. After obtaining the indication information indicating that the radio resource is insufficient (or the indication information indicating that resource allocation fails), the P-CSCF sends a cancel message to the UE, to cancel a requested session related to the IMS voice service.

A precedence relationship between step 2321 and step 2322 is not limited.

After step 2322, the TAS in the IMS network reselects a CS domain as a domain of a called session, and initiates a call to a CS domain call control device (for example, a mobile switching center (MSC)) through a device such as the S-CSCF, the CS domain call control device initiates a call to the MME through an SGs interface, the MME triggers a CSFB process of the UE, and the UE may finally set up a voice session in the CS domain by using the CSFB process of the UE. For details of the specific process, refer to related description in 3GPP TS 23.272. Details are not described herein again.

In the foregoing description of this embodiment, only after determining that the UE completes the joint registration process of the EPS and the CS domain, the MME sends the tunnel setup response to the SGW, aiming to ensure that a message indicating that setup of the user plane tunnel whose QCI is equal to 1 fails reaches the IMS network only after the UE completes the joint registration process of the EPS and the CS domain, so that the 500 response message sent by the IMS network may reach the TAS only after the UE completes the joint registration process of the EPS and the CS domain, to finally ensure that an IMS called voice service may be converted into a CSFB called voice service that is to reach the UE.

To ensure that the 500 response message sent by the IMS network may reach the TAS only after the UE completes the joint registration process of the EPS and the CS domain, in addition to enabling the MME to send, only after determining that the UE completes the joint registration process of the EPS and the CS domain, the tunnel setup response to the SGW, any one of the following manner 1 to manner 5 may be implemented.

Manner 1. The SMF+PGW-C sends the tunnel setup request to the SGW after a delay of a first preset period based on a second condition.

In the manner 1, the second condition includes that the IMS voice service cannot be performed in the EPS network.

Manner 2. The SMF+PGW-C sends the CCR to the PCF+PCRF after a delay of a first preset period.

Manner 3. After obtaining the indication information indicating that the radio resource is insufficient (or the indication information indicating that resource allocation fails), the P-CSCF sends the 500 response message to the TAS after a delay of a second preset period.

Manner 4. After the SMF+PGW-C sends the CCR to the PCF+PCRF, the SMF+PGW-C instructs the UPF+PGW-U to buffer, for a first preset period, data (which may be the cancel message) that is on a user plane tunnel whose QCI is equal to 5 and that is to be sent to the UE, and after the first preset period, the UPF+PGW-U may continue to send the data to the UE.

Manner 5. After determining that the UE completes joint registration, the P-CSCF sends the 500 response message to the TAS.

During specific implementation, the manner 5 may include: after a second preset period since the P-CSCF determines that a voice service cannot be set up in the PS domain of the 5G network or the EPS network, determining, by the P-CSCF, that the terminal device completes joint registration; or determining, by the P-CSCF based on registration location information of the terminal device obtained from an HSS/HLR, that the terminal device completes joint registration.

The first preset period and the second preset period may be set based on an actual network communication condition. For example, the first preset period and the second preset period may each be 500 ms.

Embodiment (4)

This embodiment provides a method for performing network handover of calling UE. Referring to FIG. 24, FIG. 25, FIG. 26, and FIG. 27, the method includes the following steps.

2401 to 2406.

Steps 2401 to 2406 are respectively correspondingly the same as steps 1801 to 1806.

A scenario to which this embodiment is applied is a scenario in which an IMS voice service cannot be performed in the 5G network and the IMS voice service cannot be performed in an EPS network either. Therefore, to ensure that the UE successfully initiates a CSFB call, a 500 response message sent by an IMS network needs to reach the UE only after the UE completes a joint registration process of an EPS and a CS domain.

Figure 27:
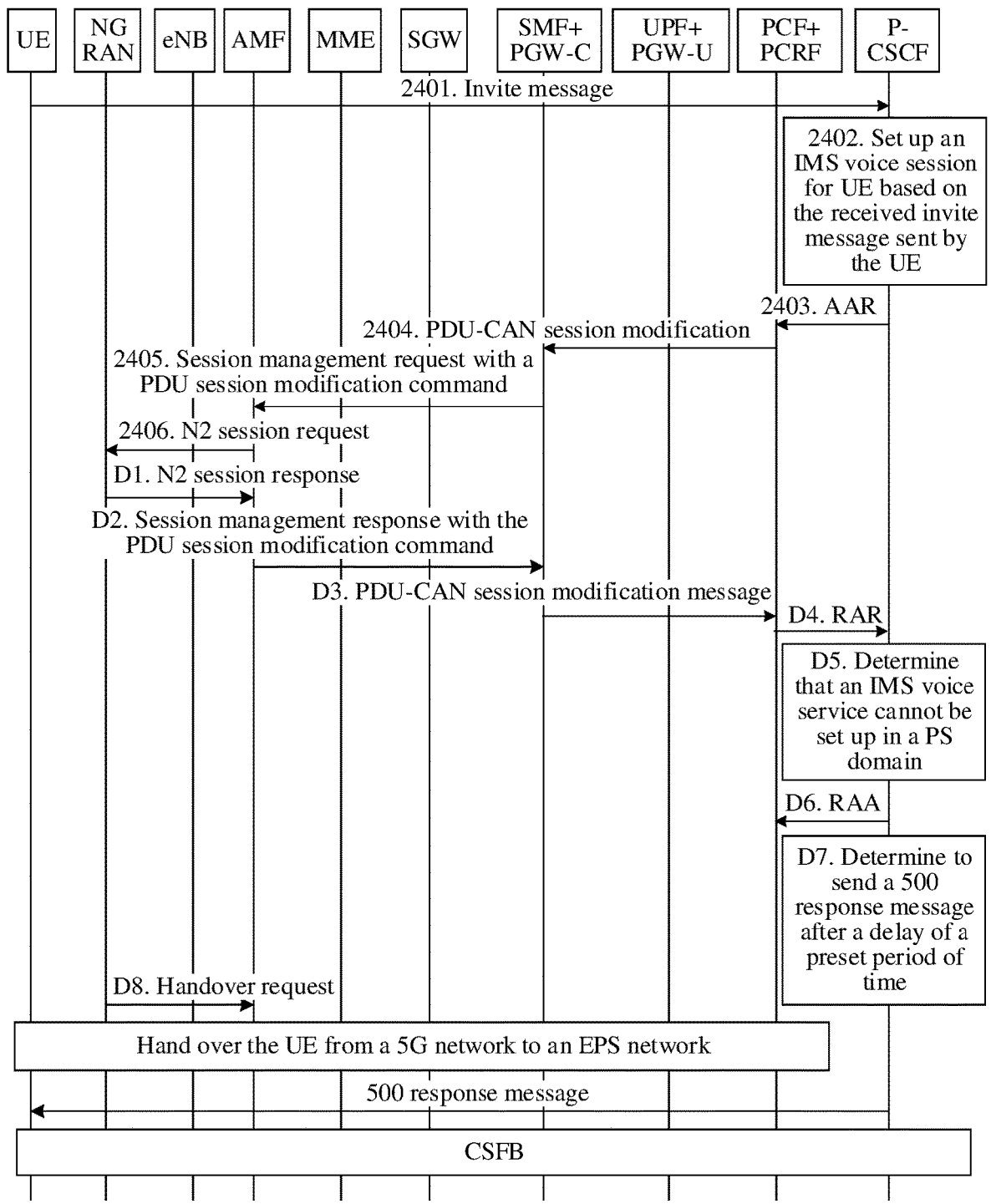

To ensure that the UE successfully initiates the CSFB call, after step 2406, network handover of the UE may be completed by using any one of the following process 1 (referring to FIG. 24), process 2 (referring to FIG. 25), process 3 (referring to FIG. 26), and process 4 (referring to FIG. 27).

Process 1:

A1. The NG RAN sends a handover request to the AMF based on the received first SM information and a first condition to trigger the UE to be handed over from the 5G network to the EPS network.

In this case, the first condition may include the following conditions: (1) a condition that the IMS voice service cannot be performed in a 5G network, where the condition indicates that the IMS voice service is not deployed in the 5G network, or signal coverage of the current 5G network is too poor to satisfy a requirement of the IMS voice service; (2) a condition that a network device (the AMF, the NG RAN, or the like) of the 5G network and the UE support handover between the 5G network and the EPS network, where whether the UE and the AMF support handover between the 5G network and the EPS network may be notified, by using an N2 message, to the NG RAN by the AMF when the UE is changed from an idle state to a connected state; (3) a condition that an EPS network does not support a voice service, where the condition may be configured, as a local policy, in the NG RAN by an operator; and (4) a condition that signal quality of the EPS network does not satisfy a requirement of the voice service, where the NG RAN may determine, by instructing the UE to measure and report signal quality of a neighboring EPS cell, whether the signal quality of the EPS network satisfies the requirement of the voice service.

A2. In a process of handing over the UE from the 5G network to the EPS network, when a handover preparation process ends, the NG RAN sends a handover command to the UE.

A3. The NG RAN sends an N2 session response to the AMF based on the first condition, where the N2 session response carries fourth SM information, the fourth SM information includes information indicating that setup of the user plane tunnel of the IMS voice service is rejected, and the information indicating that setup of the user plane tunnel of the IMS voice service is rejected includes that the radio resource is insufficient (or that resource allocation fails).

A4. The AMF sends a session management response with the PDU session modification command to the SMF+PGW-C based on the received N2 session response, where the fourth SM information is transparently transmitted to the SMF+PGW-C.

A5. After parsing the fourth SM information, the SMF+PGW-C sends a PDU-CAN session modification message to the PCF+PCRF.

The PDU-CAN session modification message includes information for indicating that setup of the user plane tunnel of the IMS voice service fails, and the indication information may be indication information indicating that the radio resource is insufficient (or indication information indicating that resource allocation fails). In this embodiment, a name of the message is not limited to the PDU-CAN session modification message, and may be another message name such as CCR.

A6. The PCF+PCRF sends an RAR to the P-CSCF, where the RAR may carry the information for indicating that setup of the user plane tunnel of the IMS voice service fails.

A7. The P-CSCF determines, based on the received information for indicating that setup of the user plane tunnel fails, that the IMS voice service cannot be set up in a PS domain.

A8. The P-CSCF sends a 500 response message to the UE, where the message reaches a UPF+PGW-U.

The 500 response message is transmitted to the UE by using a tunnel (which is specifically a QoS flow) of the 5G network.

A9. In the process of handing over the UE from the 5G network to the EPS network, an MME determines that the UE completes joint registration.

A10. The MME sends a tunnel modification request for a user plane tunnel whose QCI is equal to 5 to the SMF+PGW-C through an SGW, to indicate a downlink SGW user plane address and tunnel information of a dedicated bearer whose QCI is equal to 5 to the SMF+PGW-C.

A11. The SMF+PGW-C sends the tunnel modification request to the UPF+PGW-U, to indicate the downlink SGW user plane address and the tunnel information of the dedicated bearer whose QCI is equal to 5 to the UPF+PGW-U. After this, the SMF+PGW-C feeds back a tunnel modification response to the MME through the SGW.

A12. The UPF+PGW-U forwards user plane data on the dedicated bearer whose QCI is equal to 5 to the UE, that is, the 500 response message is sent to the UE.

After step A12, the UE initiates a CSFB calling voice service, a UE side cooperates with a network side to perform a CSFB process, and finally a voice call may be set up in the CS domain.

In this case, the UE leaves the 5G network and accesses the EPS network. Therefore, after reaching the UPF+PGW-U, the 500 response message is sent to the UE by the UPF+PGW-U through an IMS signaling tunnel (the user plane tunnel whose QCI is equal to 5) of the EPS network. If the P-CSCF receives a 183 response message, the P-CSCF may send a cancel message to a node in an IMS network such as an S-CSCF, to cancel a requested call related to the IMS voice service.

In the process 1, only after receiving the tunnel modification request, the UPF+PGW-U sends the 500 response message to the UE. Therefore, after determining that the UE completes joint registration, the MME sends the tunnel modification request for the user plane tunnel whose QCI is equal to 5 to the SMF+PGW-C and then to the UPF+PGW-U, so that the 500 response message sent by the IMS network reaches the UE only after the UE completes the joint registration process of the EPS and the CS domain, to ensure that the UE successfully initiates the CSFB call.

Process 2:

B1. The NG RAN sends an N2 session response to the AMF based on a first condition, where the N2 session response carries fourth SM information, the fourth SM information includes information indicating that setup of the user plane tunnel of the IMS voice service is rejected, and the information indicating that setup of the user plane tunnel of the IMS voice service is rejected includes that the radio resource is insufficient (or that resource allocation fails).

Specifically, the NG RAN may determine the fourth SM information based on the first condition.

In this case, the first condition may include the following conditions: (1) a condition that the IMS voice service cannot be performed in a 5G network, where the condition indicates that the IMS voice service is not deployed in the 5G network, or signal coverage of the current 5G network is too poor to satisfy a requirement of the IMS voice service; (2) a condition that a network device (the AMF, the NG RAN, or the like) of the 5G network and the UE support handover between the 5G network and the EPS network, where whether the UE and the AMF support handover between the 5G network and the EPS network may be notified, by using an N2 message, to the NG RAN by the AMF when the UE is changed from an idle state to a connected state; (3) a condition that an EPS network does not support a voice service, where the condition may be configured, as a local policy, in the NG RAN by an operator; and (4) a condition that signal quality of the EPS network does not satisfy a requirement of the voice service, where the NG RAN may determine, by instructing the UE to measure and report signal quality of a neighboring EPS cell, whether the signal quality of the EPS network satisfies the requirement of the voice service.

B2. The AMF sends a session management response with the PDU session modification command to the SMF+PGW-C based on the received N2 session response, where the fourth SM information is transparently transmitted to the SMF+PGW-C.

B3. The SMF+PGW-C determines to retain notifying the PCF+PCRF, that is, postpones notifying the PCF+PCRF of the information indicating that setup of the user plane tunnel of the voice service is rejected.

B4. The NG RAN sends a handover request to the AMF based on the first condition and the first SM information.

B5. In a handover process, the MME determines that the UE completes joint registration.

B6. The MME sends a tunnel modification request for a user plane tunnel whose QCI is equal to 5 to the SMF+PGW-C through an SGW, to indicate a downlink SGW user plane address and tunnel information to the SMF+PGW-C.

B7. The SMF+PGW-C sends the tunnel modification request to the UPF+PGW-U, to indicate the downlink SGW user plane address and the tunnel information of the dedicated bearer whose QCI is equal to 5 to the UPF+PGW-U. After this, the SMF+PGW-C feeds back a tunnel modification response to the MME through the SGW.

B8. The SMF+PGW-C sends an IP-CAN session modification message to the PCF+PCRF.

The IP-CAN session modification message carries information for indicating that setup of the user plane tunnel of the IMS voice service fails, and the indication information may be indication information indicating that the radio resource is insufficient (or indication information indicating that resource allocation fails). In this embodiment, a name of the message is not limited to the IP-CAN session modification message, and may be another message name such as CCR.

B9. The PCF+PCRF sends an RAR to the P-CSCF, where the RAR carries the information for indicating that setup of the user plane tunnel of the IMS voice service fails.

B10. The P-CSCF determines, based on the received information for indicating that setup of the user plane tunnel fails, that the IMS voice service cannot be set up in a PS domain.

B11. The P-CSCF sends a 500 response message to the UE.

After step B11, the UE initiates a CSFB calling voice service, a UE side cooperates with a network side to perform a CSFB process, and finally a voice call may be set up in the CS domain.

In the process 2, only after determining that setup of the user plane tunnel of the IMS voice service fails, the P-CSCF sends the 500 response message to the UE. Therefore, after the MME determines that the UE completes joint registration, the PCF+PCRF sends, to the P-CSCF, the information for indicating that setup of the user plane tunnel of the IMS voice service fails, so that the 500 response message sent by the IMS network reaches the UE only after the UE completes the joint registration process of the EPS and the CS domain, to ensure that the UE successfully initiates the CSFB call.

Process 3:

C1. The NG RAN sends an N2 session response to the AMF based on a first condition, where the N2 session response carries fourth SM information, the fourth SM information includes information indicating that setup of the user plane tunnel of the IMS voice service is rejected, and the information indicating that setup of the user plane tunnel of the IMS voice service is rejected includes that the radio resource is insufficient (or that resource allocation fails).

Specifically, the NG RAN may determine the fourth SM information based on the first condition.

In this case, the first condition may include the following conditions: (1) a condition that the IMS voice service cannot be performed in a 5G network, where the condition indicates that the IMS voice service is not deployed in the 5G network, or signal coverage of the current 5G network is too poor to satisfy a requirement of the IMS voice service; (2) a condition that a network device (the AMF, the NG RAN, or the like) of the 5G network and the UE support handover between the 5G network and the EPS network, where whether the UE and the AMF support handover between the 5G network and the EPS network may be notified, by using an N2 message, to the NG RAN by the AMF when the UE is changed from an idle state to a connected state; (3) a condition that an EPS network does not support a voice service, where the condition may be configured, as a local policy, in the NG RAN by an operator; and (4) a condition that signal quality of the EPS network does not satisfy a requirement of the voice service, where the NG RAN may determine, by instructing the UE to measure and report signal quality of a neighboring EPS cell, whether the signal quality of the EPS network satisfies the requirement of the voice service.

C2. The AMF sends a session management response with the PDU session modification command to the SMF+PGW-C based on the received N2 session response, where the fourth SM information is transparently transmitted to the SMF+PGW-C.

C3. The SMF+PGW-C sends an N4 session modification request to a UPF+PGW-U based on the received session management response with the PDU session modification command sent by the AMF.

The N4 session modification request includes a first command, and the first command is for instructing the UPF+PGW-U to buffer data on a user plane tunnel whose 5QI is equal to 5.

C4. The UPF+PGW-U feeds back an N4 session modification response to the SMF+PGW-C based on the received N4 session modification request.

C5. The SMF+PGW-C sends a PDU-CAN session modification message to the PCF+PCRF.

The PDU-CAN session modification message carries information for indicating that setup of the user plane tunnel of the IMS voice service fails, and the indication information may be indication information indicating that the radio resource is insufficient (or indication information indicating that resource allocation fails). In this embodiment, a name of the message is not limited to the IP-CAN session modification message, and may be another message name such as CCR.

C6. The PCF+PCRF sends an RAR to the P-CSCF, where the RAR carries the information for indicating that setup of the user plane tunnel of the IMS voice service fails.

C7. The P-CSCF feeds back an RAA to the PCF+PCRF.

C8. The P-CSCF determines, based on the received information for indicating that setup of the user plane tunnel fails, that the IMS voice service cannot be set up in a PS domain.

C9. The P-CSCF sends a 500 response message to the UE, where the message reaches a UPF+PGW-U.

C10. The UPF+PGW-U buffers data on a user plane tunnel whose 5QI is equal to 5.

The data on a user plane tunnel whose 5QI is equal to 5 may include the 500 response message.

C11. The NG RAN sends a handover request to the AMF based on the first condition and the first SM information.

C12. The MME determines that the UE completes joint registration.

C13. The MME sends a tunnel modification request (modify bearer request) for a user plane tunnel whose QCI is equal to 5 to the SMF+PGW-C through an SGW, to indicate a downlink SGW user plane address and tunnel information to the SMF+PGW-C.

C14. The SMF+PGW-C sends the tunnel modification request to the UPF+PGW-U, where the tunnel modification request includes a second command, and the second command is for instructing the UPF+PGW-U to stop buffering information about the data on the user plane tunnel whose QCI is equal to 1.

After step C14, the UPF+PGW-U sends the 500 response message to the UE, the UE initiates a CSFB calling voice service, a UE side cooperates with a network side to perform a CSFB process, and finally a voice call may be set up in the CS domain.

In the process 3, the 500 response message sent by the P-CSCF is buffered in the UPF+PGW-U by using the first command, and after the MME determines that the UE completes joint registration, the P-CSCF sends the 500 response message to the terminal device by using the second command, so that the 500 response message sent by the IMS network reaches the UE only after the UE completes the joint registration process of the EPS and the CS domain, to ensure that the UE successfully initiates the CSFB call.

Process 4:

D1. The NG RAN sends an N2 session response to the AMF based on a first condition, where the N2 session response carries fourth SM information, the fourth SM information includes information indicating that setup of the user plane tunnel of the IMS voice service is rejected, and the information indicating that setup of the user plane tunnel of the IMS voice service is rejected includes that the radio resource is insufficient (or that resource allocation fails).

Specifically, the NG RAN may determine the fourth SM information based on the first condition.

In this case, the first condition may include the following conditions: (1) a condition that the IMS voice service cannot be performed in a 5G network, where the condition indicates that the IMS voice service is not deployed in the 5G network, or signal coverage of the current 5G network is too poor to satisfy a requirement of the IMS voice service; (2) a condition that a network device (the AMF, the NG RAN, or the like) of the 5G network and the UE support handover between the 5G network and the EPS network, where whether the UE and the AMF support handover between the 5G network and the EPS network may be notified, by using an N2 message, to the NG RAN by the AMF when the UE is changed from an idle state to a connected state; (3) a condition that an EPS network does not support a voice service, where the condition may be configured, as a local policy, in the NG RAN by an operator; and (4) a condition that signal quality of the EPS network does not satisfy a requirement of the voice service, where the NG RAN may determine, by instructing the UE to measure and report signal quality of a neighboring EPS cell, whether the signal quality of the EPS network satisfies the requirement of the voice service.

D2. The AMF sends a session management response with the PDU session modification command to the SMF+PGW-C based on the received N2 session response, where the fourth SM information is transparently transmitted to the SMF+PGW-C.

D3. The SMF+PGW-C sends a PDU CAN session modification message to the PCF+PCRF. In this embodiment, a name of the message is not limited to the IP-CAN session modification message, and may be another message name such as CCR.

The PDU CAN session modification message carries information for indicating that setup of the user plane tunnel of the IMS voice service fails, and the indication information may be indication information indicating that the radio resource is insufficient (or indication information indicating that resource allocation fails).

D4. The PCF+PCRF sends an RAR to the P-CSCF, where the RAR carries the information for indicating that setup of the user plane tunnel of the IMS voice service fails.

D5. The P-CSCF determines, based on the received information for indicating that setup of the user plane tunnel fails, that the IMS voice service cannot be set up in a PS domain.

D6. The P-CSCF feeds back an RAA message to the PCF+PCRF.

D7. The P-CSCF determines to send a 500 response message after a delay of a second preset period.

D8. The NG RAN sends a handover request to the AMF based on the received first SM information and the first condition to trigger the UE to be handed over from the 5G network to the EPS network.

After step D8, the UE performs a handover process. After the handover process ends, the P-CSCF sends the 500 response message to the UE, the UE initiates a CSFB calling voice service, a UE side cooperates with a network side to perform a CSFB process, and finally a voice call may be set up in the CS domain.

In the process 4, the P-CSCF sends the 500 response message after the delay of the second preset period, so that the 500 response message sent by the IMS network reaches the UE only after the UE completes the joint registration process of the EPS and the CS domain, to ensure that the UE successfully initiates the CSFB call.

This embodiment further provides a method for performing network handover of called UE. A scenario to which this embodiment is applied is a scenario in which an IMS voice service cannot be performed in the 5G network and the IMS voice service cannot be performed in an EPS network either. Therefore, to ensure that the UE successfully initiates a CSFB call, a 500 response message sent by an IMS network needs to reach the TAS only after the UE completes a joint registration process of an EPS and a CS domain, so that the TAS reselects a CS domain as a domain of the called UE, to ensure that the CSFB call succeeds. Referring to FIG. 28, the method includes the following steps.

2801 to 2808.

Steps 2801 to 2808 are respectively correspondingly the same as steps 1901 to 1908.

2809 to 2814.

Steps 2809 to 2814 are respectively correspondingly the same as steps D1 to D6.

2815. The P-CSCF sends a 500 response message to a TAS after a delay of a second preset period. The 500 response message is specifically sent to a terminating access domain selection function module T-ADS in the TAS.

The P-CSCF sends the 500 response message after the delay of the second preset period, so that the 500 response message sent by the P-CSCF reaches the TAS only after the UE completes the joint registration process of the EPS and the CS domain, to ensure that a CSFB call succeeds.

In the network handover methods provided in the embodiment (3) and the embodiment (4), at a stage of setting up the IMS voice session, the 5G terminal device can be handed over to the EPS network, then the UE is enabled to fall back to a 2G/3G network by using a CSFB technology in the EPS network, and finally a voice call is initiated in a CS domain of the 2G/3G network. In this application, by using an EPS network as a springboard, and reusing a conventional 2G/3G network architecture, a method for performing a voice service in a scenario in which an IMS voice service may be performed in neither a 5G network nor the EPS network is provided for a terminal device located in the 5G network.

In Embodiment (1) to Embodiment (4), the 500 response message may be further a 380 response message or a 503 response message, and the RAR message may be further an abort-session-request (ASR) message. In this case, the RAA message may be an abort-session-answer (ASA) message.

An embodiment of this application further provides a network registration method. As shown in FIG. 28A, the method includes the following steps.

2801A. A first mobility management network element receives a registration request from a terminal device, where the registration request is for requesting to register the terminal device with a first network.

The first mobility management network element may be an AMF, and the first network may be a 5G network.

2802A. The first mobility management network element sends first indication information to the terminal device if a third condition is satisfied, where the first indication information is for indicating that a voice service of a PS domain is supported.

The third condition may include that the first network supports movement of the terminal device to a second network. That the first network supports movement of the terminal device to a second network may mean that the first network supports movement of the terminal device to the second network in a handover or redirection manner or another manner.

Optionally, that the first network supports movement of the terminal device to a second network may include that a first access network device in the first network supports, when receiving first session management information from a session management network element, access of the terminal device to the second network, where the first session management information is for requesting to set up a user plane tunnel for a voice service of the terminal device. The first access network device may be an NG RAN, and the session management network element may be an SMF+PGW-C function network element.

For example, the first indication information may be carried in a registration accept message, the voice service may be an IMS voice service, and the terminal device may be specifically a terminal device initiating a calling or called voice service.

Specifically, the first mobility management network element may determine, in any one of the following manners or another manner, whether the third condition is satisfied:

Manner (1): In a process in which the terminal device is registered with the first network, the first mobility management network element determines, by learning whether an access network device and/or a core network element device in which the current terminal device is located has a capability of moving the terminal device to the second network, whether the third condition is satisfied.

Manner (2): The first mobility management network element determines, by using a configuration condition of the first mobility management network element, whether the third condition is satisfied. Whether an access network device and/or a core network element device in which the current terminal device is located can move the terminal device to the second network is configured in the configuration condition.

Optionally, the first network and the second network have a same core network and different access types; or the first network and the second network have different core networks and different access types.

When the first network and the second network have different core networks and different access types, the second network may be an EPS network. When the first network and the second network have a same core network and different access types, the first network and the second network may each be a 5G network, and have a difference in that the first network and the second network have different access types.

Specifically, the first access network device may enable the terminal device to access the second network by sending, to the first mobility management network element, a handover request for handing over the terminal device from the first network to the second network. It should be noted that, when the terminal device initiates a PS domain voice service, the first access network device enables the terminal device to access the second network, and the terminal device may be a terminal device initiating a calling PS domain voice service or may be a terminal device initiating a called PS domain voice service.

Optionally, the third condition may further include that a handover interoperation is supported between the first network and the second network. In this case, the first network supports movement of the terminal device to the second network by performing handover.

Optionally, that a handover interoperation is supported between the first network and the second network includes that a handover interoperation interface exists between the first network and the second network. For example, the handover interoperation interface may be specifically an N26 interface.

Optionally, the second network may support the PS domain voice service or may not support the PS domain voice service. If it is determined that the second network supports the PS domain voice service, the third condition may further include that the second network can support the PS domain voice service.

Optionally, before step 2803A, the method may further include: determining, by the first mobility management network element, that the terminal device is a voice service centric terminal device. Because a data service centric terminal device is unrelated to the voice service, the optional method may distinguish terminal types. The data service centric terminal device does not need to perform this set of solution, that is, does not need to determine whether the third condition is satisfied, and does not need to send the first indication information either.

Optionally, the method may further include: generating, by the terminal device, a registration request, where the registration request carries indication information indicating that the terminal device is a voice service centric terminal device; and sending, by the terminal device, the registration request to the first mobility management network element. In this case, the determining, by the first mobility management network element, that the terminal device is a voice service centric terminal device includes: determining, by the first mobility management network element based on the registration request, that the terminal device is a voice service centric terminal device.

In this case, the terminal device carries, by using the registration request, the indication information indicating that the terminal device is a voice service centric terminal device. Therefore, signaling does not need to be independently sent to inform the first mobility management network element of the indication information, and signaling overheads can be saved.

Optionally, before step 2803A, the method may further include: determining, by the first mobility management network element, that the terminal device supports movement from the first network to the second network in a voice service initiation process and continuity of the voice service initiation process by using the second network. Because the foregoing method may be implemented when the terminal device supports movement from the first network to the second network in a voice service initiation process and continuity of the voice service initiation process by using the second network, the information may be determined in advance, to avoid impact on a terminal device that cannot support movement from the first network to the second network in a voice service initiation process and continuity of the voice service initiation process by using the second network.

Optionally, the registration request further carries indication information indicating that the terminal device supports movement from the first network to a second network in a voice service initiation process and continuity of the voice service initiation process by using the second network, and the determining, by the first mobility management network element, that the terminal device supports movement from the first network to the second network in a voice service initiation process and continuity of the voice service initiation process by using the second network includes: determining, by the first mobility management network element based on the registration request, that the terminal device supports movement from the first network to the second network in a voice service initiation process and continuity of the voice service initiation process by using the second network.

In this case, the terminal device carries, by using the registration request, the indication information indicating that the terminal device supports movement from the first network to the second network in the voice service initiation process and continuity of the voice service initiation process by using the second network. Therefore, signaling does not need to be independently sent to inform the first mobility management network element of the indication information, and signaling overheads can be saved.

It should be noted that, the method provided in this embodiment may be performed before any method described before FIG. 28. Additionally, the first mobility management network element may send the first indication information to the terminal device under another condition other than the third condition.

In the method provided in this embodiment, when the terminal device is registered with the first network, if the first network has a capability of enabling, in a handover or another manner, the terminal device to fall back to a network that can provide the voice service when the terminal device initiates the voice service, the first mobility management entity indicates that the voice service in the PS domain of the terminal device is supported regardless of whether the first network supports the voice service of the terminal device. The terminal device is registered with and camps on the first network and does not reselect another network, thereby saving network resources, and ensuring that the terminal device normally performs a PS domain voice service registration process and initiates a PS domain voice call process by using the first network.

An embodiment of this application further provides a network registration method. As shown in FIG. 28B, the method is used to specifically describe the method shown in FIG. 28A. The method includes the following steps.

2801B. UE sends a registration request to an AMF.

Specifically, the registration request is for requesting to register the UE with a first network, the UE may send the registration request to an NG RAN, and the NG RAN forwards the registration request to the AMF.

The registration request may carry indication information indicating that the UE is voice service centric UE, and indication information indicating that the UE supports movement from the first network to a second network in a voice service initiation process and continuity of the voice service initiation process by using the second network.

2802B. The AMF receives the registration request from the UE.

2803B. The AMF determines, based on the registration request, that the UE supports movement from a first network to a second network in a voice service initiation process and continuity of the voice service initiation process by using the second network.

2804B. The AMF determines, based on the registration request, that the UE is voice service centric UE.

Step 2803B and step 2804B are not performed in order.

2805B. The AMF determines whether a third condition is satisfied.

If yes, step 2806B is performed. The third condition includes that the first network supports movement of the UE to a second network, where the second network can support a voice service of a PS domain. FIG. 28B is drawn by using an example in which the AMF determines that the third condition is satisfied.

2806B. The AMF sends first indication information to the UE, where the first indication information is for indicating that a voice service of a PS domain is supported.

The first indication information may be carried in a registration accept message.

After step 2806B, the UE continues to perform a subsequent process.

The foregoing describes the solutions provided in the embodiments of this application mainly from the perspective of interaction between network elements. It may be understood that, to implement the foregoing functions, the foregoing network devices include corresponding hardware structures and/or software modules for performing the functions. A person skilled in the art should be easily aware that, in combination with the units and algorithm steps of the examples described in the embodiments disclosed in this specification, this application can be implemented by hardware or a combination of hardware and computer software. Whether a function is performed by hardware or by computer software driving hardware depends on particular applications and design constraint conditions of the technical solutions. A person skilled in the art may use different methods to implement the described functions for each particular application, but it should not be considered that the implementation goes beyond the scope of this application.

In the embodiments of this application, the network devices may be divided with respect to function modules based on the foregoing method examples. For example, function modules may be divided corresponding to functions, or two or more than two functions may be integrated in a processing module. The integrated module may be implemented in a form of hardware, or may be implemented in a form of a software function module. It should be noted that module division in the embodiments of this application is an example and is merely logical function division. During actual implementation, there may be another division manner.

For example, an example of a function module division manner of a network device provided in an embodiment of this application is provided below.

An embodiment of this application further provides a network device 290. Referring to FIG. 29, the network device 290 includes a processing unit 2901 and a transceiver unit 2902.

The network device may be a first access network device, a session management network element, a second mobility management network element, a second access network device, an IMS network element, or a first mobility management network element.

Specifically, when FIG. 29 is a schematic diagram of the first access network device, the processing unit 2901 is configured to receive first session management information from a session management network element by using the transceiver unit 2902, where the first session management information is for requesting to set up a user plane tunnel for a voice service of a terminal device; and send, by using the transceiver unit 2902, a handover request to a first mobility management network element based on the first session management information and a first condition, where the handover request is for handing over the terminal device from a first network to a second network, and the first condition includes that the voice service cannot be performed in the first network.

Optionally, the first condition further includes at least one of that the second network supports the voice service, that signal quality of the second network satisfies a requirement of the voice service, and a network device of the first network and the terminal device supports handover between the first network and the second network.

Optionally, the processing unit 2901 is further configured to send second session management information to the session management network element by using the transceiver unit 2902, where the second session management information includes information indicating that setup of the user plane tunnel of the voice service is accepted.

Optionally, the processing unit 2901 is further configured to determine, based on the first session management information and the first condition, not to allocate a radio resource to the user plane tunnel of the voice service.

Optionally, the processing unit 2901 is further configured to send third session management information to the session management network element by using the transceiver unit 2902, where the third session management information includes information indicating that setup of the user plane tunnel of the voice service is rejected.

Optionally, the information indicating that setup of the user plane tunnel of the voice service is rejected includes reason information indicating rejection.

Optionally, the reason information is that the terminal device is performing a handover process.

Optionally, the first condition further includes that the voice service cannot be performed in the second network, and the processing unit 2901 is further configured to send fourth session management information to the session management network element by using the transceiver unit 2902, where the fourth session management information includes the information indicating that setup of the user plane tunnel of the voice service is rejected, and the information indicating that setup of the user plane tunnel of the voice service is rejected includes that a radio resource is insufficient.

When the terminal device in the first network performs a voice service, the network device 290 may hand over the terminal device to the second network, so that the terminal device may perform the voice service in the second network, to resolve a problem that the terminal device in the first network cannot perform the voice service.

When FIG. 29 is a schematic diagram of the session management network element, the processing unit 2901 is configured to receive, by using the transceiver unit 2902, third session management information sent from a first access network device, where the third session management information includes reason information indicating that setup of a user plane tunnel of a voice service of a terminal device is rejected; determine that the terminal device has handed over from a first network to a second network; and set up the user plane tunnel for the voice service in the second network based on the reason information.

Optionally, the reason information is that the terminal device is performing a handover process.

Optionally, the processing unit 2901 is specifically configured to set up the user plane tunnel for the voice service in the second network after a first preset period based on the reason information and a second condition, where the second condition includes that the voice service cannot be performed in the second network.

Optionally, the processing unit 2901 is specifically configured to send, by using the transceiver unit 2902, a tunnel setup request to a serving gateway of the second network after the first preset period based on the reason information and the second condition, where the tunnel setup request is for requesting to set up the user plane tunnel of the voice service.

Optionally, the processing unit 2901 is specifically configured to send, by using the transceiver unit 2902, a tunnel setup request to a serving gateway of the second network based on the reason information, where the tunnel setup request is for requesting to set up the user plane tunnel of the voice service; receive, by using the transceiver unit 2902, a tunnel setup response sent from the serving gateway, where the tunnel setup response includes information indicating that setup of the user plane tunnel of the voice service is rejected; and send, by using the transceiver unit 2902, a first message to a policy function control network element after the first preset period based on the second condition, where the first message is for indicating that setup of the user plane tunnel of the voice service fails.

When the terminal device in the first network is handed over from the first network to the second network, the network device 290 sets up the user plane tunnel for the voice service in the second network based on the reason information, and if the voice service may be performed in the second network, the user plane tunnel may be set up successfully, so that the terminal device may perform the voice service in the second network, to resolve a problem that the terminal device in the first network cannot perform the voice service.

When FIG. 29 is a schematic diagram of the second mobility management network element, the network device 290 may perform the following action 1, action 2, action 3, or action 4.

Action 1. The processing unit 2901 is configured to receive, by using the transceiver unit 2902, a tunnel setup request sent by a serving gateway, where the tunnel setup request is for requesting to set up a user plane tunnel of a voice service for a terminal device; and send, by using the transceiver unit 2902, a tunnel setup response to the serving gateway based on a second condition, where the tunnel setup response includes information indicating that setup of the user plane tunnel of the voice service of the terminal device is rejected, and the second condition includes that the voice service cannot be performed in a second network.

Optionally, the second condition further includes that the terminal device is a terminal device handed over from a first network to the second network.

Optionally, the processing unit 2901 is further configured to determine that the terminal device completes joint registration.

The processing unit 2901 is specifically configured to determine that a joint registration complete message from the terminal device is received.

When the voice service cannot be performed in the second network, the network device 290 sends the tunnel setup response to the serving gateway, so that the serving gateway transfers, to an IMS network, the information indicating that setup of the user plane tunnel is rejected, so that the IMS network may trigger a CSFB service of the terminal device, and then the terminal device performs a CS voice service.

Action 2. The processing unit 2901 is configured to send, by using the transceiver unit 2902, a radio tunnel setup request to a second access network device, where the radio tunnel setup request is for requesting to set up a user plane tunnel for a voice service of a terminal device; receive, by using the transceiver unit 2902, a radio tunnel setup response sent by the second access network device, where the radio tunnel setup response includes information indicating that setup of the user plane tunnel of the voice service of the terminal device is rejected; and send, by using the transceiver unit 2902, a tunnel setup response to a serving gateway based on a second condition, where the tunnel setup response includes the information indicating that setup of the user plane tunnel of the voice service of the terminal device is rejected, and the second condition includes that the voice service cannot be performed in a second network.

Optionally, the second condition further includes that the terminal device is a terminal device handed over from a first network to the second network.

Optionally, the processing unit 2901 is specifically configured to determine that the second condition is satisfied and the terminal device completes joint registration; and send the tunnel setup response to the serving gateway by using the transceiver unit 2902.

Optionally, the processing unit 2901 is specifically configured to determine that a registration complete message from the terminal device is received.

The network device 290 sends, to the serving gateway, the information indicating that setup of the user plane tunnel is rejected, so that the serving gateway transfers, to an IMS network, the information indicating that setup of the user plane tunnel is rejected, the IMS network triggers a CSFB service of the terminal device, and then the terminal device performs a CS voice service.

Action 3. The processing unit 2901 is configured to receive, by using the transceiver unit 2902, a tunnel setup request sent by a serving gateway, where the tunnel setup request is for requesting to set up a user plane tunnel of a voice service for user equipment, namely, a terminal device; and if a second condition is satisfied, determine that the terminal device completes joint registration, where the second condition includes that the voice service cannot be performed in a second network; send, by using the transceiver unit 2902, a radio tunnel setup request to a second access network device, where the radio tunnel setup request is for requesting to set up the user plane tunnel for the voice service of the terminal device; receive, by using the transceiver unit 2902, a radio tunnel setup response sent by the second access network device, where the radio tunnel setup response includes information indicating that setup of the user plane tunnel of the voice service of the terminal device is rejected; and send, by using the transceiver unit 2902, a tunnel setup response to the serving gateway based on the radio tunnel setup response, where the tunnel setup response includes the information indicating that setup of the user plane tunnel of the voice service of the terminal device is rejected.

Optionally, the second condition further includes that the terminal device is a terminal device handed over from a first network to the second network.

Optionally, the processing unit 2901 is specifically configured to determine that a registration complete message sent by the terminal device is received.

After determining that the terminal device completes joint registration, the network device 290 sends, to the serving gateway, the information indicating that setup of the user plane tunnel is rejected, so that the serving gateway transfers, to an IMS network, the information indicating that setup of the user plane tunnel is rejected, the IMS network triggers a CSFB service of the terminal device, and then the terminal device performs a CS voice service, to further ensure that the terminal device successfully initiates a CSFB call.

Action 4. The processing unit 2901 is configured to receive, by using the transceiver unit 2902, a fourth message sent by a first mobility management network element, where the fourth message is for determining that a terminal device completes relocation; and send, by using the transceiver unit 2902, a tunnel modification request to a serving gateway based on a second condition, where the tunnel modification request is for modifying signaling plane tunnel information of a voice service of the terminal device, and the second condition includes that the voice service cannot be performed in a second network.

Optionally, the processing unit 2901 is specifically configured to determine that the second condition is satisfied and the UE completes joint registration; and send the tunnel modification request to the serving gateway by using the transceiver unit 2902.

When the voice service cannot be performed in the second network, the network device 290 sends the tunnel modification request to the serving gateway, the serving gateway forwards the tunnel modification request to a session management network element, and because only after receiving the tunnel modification request, the session management network element sends, to the terminal device, a message (that is, the foregoing second message) for triggering the terminal device to initiate a CSFB call, the network device 290 may trigger the terminal device to initiate the CSFB call when the voice service cannot be performed in the second network, so that the terminal device performs a CS voice service.

When FIG. 29 is a schematic diagram of the second access network device, the processing unit 2901 is configured to receive, by using the transceiver unit 2902, a radio tunnel setup request sent by a second mobility management network element, where the radio tunnel setup request is for requesting the second access network device to set up a user plane tunnel of a voice service for a terminal device; and send, by using the transceiver unit 2902, a radio tunnel setup response to the second mobility management network element based on a second condition, where the radio tunnel setup response includes information indicating that setup of the user plane tunnel of the voice service is rejected, and the second condition includes that the voice service cannot be performed in a second network.

Optionally, the second condition further includes that the terminal device is a terminal device handed over from a first network to the second network.

When the voice service cannot be performed in the second network, the network device 290 rejects allocating a radio resource to the user plane tunnel, adds, to the radio tunnel setup response, the information indicating that setup of the user plane tunnel of the voice service is rejected, and sends the radio tunnel setup response to the second mobility management network element, and the second mobility management network element may transfer, to an IMS network, the information indicating that setup of the user plane tunnel is rejected, so that the IMS network triggers a CSFB service of the terminal device, and then the terminal device performs a CS voice service.

When FIG. 29 is a schematic diagram of the IMS network element, the processing unit 2901 is configured to receive, by using the transceiver unit 2902, a request message for setting up a voice service for a terminal device in a packet switched PS domain; determine that the voice service cannot be set up in a PS domain of a first network or a second network; determine that the terminal device completes joint registration; and trigger a circuit switched fallback CSFB service of the terminal device.

Optionally, the processing unit 2901 is further configured to determine that the terminal device is registered with the first network.

Optionally, the processing unit 2901 is specifically configured to obtain voice service setup failure information that is from the PS domain of the first network; or obtain voice service setup failure information that is from the PS domain of the second network.

Optionally, the processing unit 2901 is specifically configured to: after a second preset period since the IMS network element determines that the voice service cannot be set up in the PS domain of the first network or the second network, determine that the terminal device completes joint registration; or determine, based on registration location information of the terminal device obtained from a policy control network element or a home subscriber server, that the terminal device completes joint registration.

Optionally, the terminal device is a calling terminal device of the voice service, and the processing unit 2901 is specifically configured to send, by using the transceiver unit 2902, a second message to the calling terminal device, where the second message is for triggering the calling terminal device to initiate a CSFB calling service.

Optionally, the terminal device is a called terminal device of the voice service, and the processing unit 2901 is specifically configured to send, by using the transceiver unit 2902, a third message to a terminating access domain selection device, where the third message is for indicating that setup of a called voice service in the PS domain of the first network or the second network fails, so that the terminating access domain selection device triggers a CSFB called voice service of the called terminal device.

When determining that a voice service cannot be set up in the PS domain of the first network or the second network, and the terminal device completes joint registration, the network device 290 triggers the CSFB service of the terminal device. Because that the terminal device completes joint registration is a necessary condition on which the terminal device initiates a CSFB call, it may be ensured that the terminal device successfully initiates the CSFB call, so that the terminal device performs a CS voice service.

When FIG. 29 is a schematic diagram of the first mobility management network element, the processing unit 2901 is configured to receive a registration request from a terminal device by using the transceiver unit 2902, where the registration request is for requesting to register the terminal device with a first network; the processing unit 2901 is further configured to determine that a third condition is satisfied, where the third condition includes that the first network supports movement of the terminal device to a second network, where the second network can support a voice service of a PS domain; and the processing unit 2901 is further configured to send first indication information to the terminal device by using the transceiver unit 2902, where the first indication information is for indicating that a voice service of a PS domain is supported.

Optionally, the first network and the second network have a same core network and different access types; or the first network and the second network have different core networks and different access types.

Optionally, that the first network supports movement of the terminal device to a second network includes that a first access network device in the first network supports, when receiving first session management information from a session management network element, access of the terminal device to the second network, where the first session management information is for requesting to set up a user plane tunnel for a voice service of the terminal device.

Optionally, the third condition further includes that a handover interoperation is supported between the first network and the second network.

Optionally, that a handover interoperation is supported between the first network and the second network includes that a handover interoperation interface exists between the first network and the second network.

Optionally, the processing unit 2901 is further configured to determine that the terminal device is a voice service centric terminal device.

Optionally, the registration request carries indication information indicating that the terminal device is a voice service centric terminal device, and the processing unit 2901 is specifically configured to determine, based on the registration request, that the terminal device is a voice service centric terminal device.

Optionally, the processing unit 2901 is further configured to determine that the terminal device supports movement from the first network to the second network in a voice service initiation process and continuity of the voice service initiation process by using the second network.

Optionally, the registration request further carries indication information indicating that the terminal device supports movement from the first network to a second network in a voice service initiation process and continuity of the voice service initiation process by using the second network, and the processing unit 2901 is specifically configured to determine, based on the registration request, that the terminal device supports movement from the first network to the second network in a voice service initiation process and continuity of the voice service initiation process by using the second network.

Regardless of whether the first network supports the voice service of the terminal device, provided that the first network has a capability of enabling, in a handover or another manner, the terminal device to fall back to a network that can provide the voice service when the terminal device initiates the voice service, when the terminal device is registered with the first network, the first mobility management network element indicates that the voice service in the PS domain of the terminal device is supported, thereby ensuring that the terminal device is registered with and camps on the first network and does not reselect another network, thereby saving network resources, and ensuring that the terminal device normally performs a PS domain voice service registration process and initiates a PS domain voice call process by using the first network.

An embodiment of this application further provides a terminal device 290A. Referring to FIG. 29A, the terminal device 290A includes a processing unit 2901A and a transceiver unit 2902A. The processing unit 2901A is configured to generate a registration request, where the registration request is for requesting to register the terminal device with a first network, and the registration request carries indication information indicating that the terminal device is a voice service centric terminal device; and the processing unit 2901A is further configured to send the registration request to a first mobility management network element by using the transceiver unit 2902A.

Optionally, the registration request further includes indication information indicating that the terminal device supports movement from the first network to a second network in a voice service initiation process and continuity of the voice service initiation process by using the second network.

Optionally, the first network and the second network have a same core network and different access types; or the first network and the second network have different core networks and different access types.

When the first network has a capability of enabling, in a handover or another manner, the terminal device to fall back to a network that can provide the voice service when the terminal device initiates the voice service, the terminal device is registered with and camps on, based on the received first indication information sent by the first mobility management network element, the first network and does not reselect another network, thereby saving network resources, and ensuring that the terminal device normally performs a PS domain voice service registration process and initiates a PS domain voice call process by using the first network.

An embodiment of this application further provides a network device. The network device includes: a memory, a processor, and a communications interface. The memory is configured to store a computer executable instruction, and the processor executes the computer executable instruction stored in the memory, and enables, by using the communications interface, the network device to implement a method corresponding to the instruction. For a schematic structural diagram of the network device, refer to FIG. 6.

The network device may be a first access network device, a session management network element, a second mobility management network element, a second access network device, an IMS network element, or a first mobility management network element. Specifically, when FIG. 6 and FIG. 29 are schematic diagrams of the first access network device, the processing unit 2901 may be the processor 601, and the transceiver unit 2902 may be the communications interface 604. When FIG. 6 and FIG. 29 are schematic diagrams of the session management network element, the processing unit 2901 may be the processor 601, and the transceiver unit 2902 may be the communications interface 604. When FIG. 6 and FIG. 29 are schematic diagrams of the second mobility management network element, the processing unit 2901 may be the processor 601, and the transceiver unit 2902 may be the communications interface 604. When FIG. 6 and FIG. 29 are schematic diagrams of the second access network device, the processing unit 2901 may be the processor 6*oi*, and the transceiver unit 2902 may be the communications interface 604. When FIG. 6 and FIG. 29 are schematic diagrams of the IMS network element, the processing unit 2901 may be the processor 6*oi*, and the transceiver unit 2902 may be the communications interface 604. When FIG. 6 and FIG. 29 are schematic diagrams of the first mobility management network element, the processing unit 2901 may be the processor 6*oi*, and the transceiver unit 2902 may be the communications interface 604.

An embodiment of this application further provides a terminal device. The terminal device includes: a memory, a processor, and a communications interface. The memory is configured to store a computer executable instruction, and the processor executes the computer executable instruction stored in the memory, and enables, by using the communications interface, the terminal device to implement a method corresponding to the instruction. For a schematic structural diagram of the terminal device, refer to FIG. 6A. The processing unit 2901A may be the processor 601A, and the transceiver unit 2902A may be the communications interface 604A.

An embodiment of this application further provides a computer readable storage medium. The computer readable storage medium includes an instruction, and when run on a computer, the instruction enables the computer to perform the foregoing method.

An embodiment of this application further provides a computer program product including an instruction. When run on a computer, the instruction enables the computer to perform the foregoing method.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method, comprising:
    sending, by a session management network element, session management information to an access network device in a first network, wherein the session management information requests to set up a user plane tunnel for a voice service of a terminal device, and the first network is a fifth-generation (5G) network;
    sending, by the access network device, a handover request to a mobility management network element in the first network based on the session management information when the voice service cannot be performed in the first network, wherein the handover request requests to hand over the terminal device from the first network to a second network, and the second network is a fourth generation (4G) network; and
    sending, by the access network device, indicating information to the session management network element, wherein the indicating information indicates that setup of the user plane tunnel of the voice service is rejected;

determining, by the session management network element, that the terminal device has handed over from the first network to the second network; and setting up, by the session management network element, the user plane tunnel for the voice service in the second network; and wherein the session management network element is a network element having both a session management function in the first network and a packet data network gateway-control plane function in the second network.

2. The method according to claim 1, wherein determining, by the session management network element, that the terminal device has handed over from the first network to the second network comprises:

setting, by session management network element, a timer when the indicating information is received from the access network device; and determining, by the session management network element, that the terminal device has handed over from the first network to the second network when the timer times out.

3. The method according to claim 1, wherein the indicating information indicates that the terminal device is performing a handover process.

4. The method according to claim 1, wherein sending, by the access network device, the handover request to the mobility management network element in the first network based on the session management information when the voice service cannot be performed in the first network comprises:

sending, by the access network device, the handover request to the mobility management network element in the first network based on the session management information when a condition is satisfied, wherein the condition comprises:

the first network does not support an internet protocol multimedia subsystem (IMS) voice service, the first network supports movement of the terminal device to the second network, and the second network supports a voice service of a packet switched (PS) domain.

5. A method, comprising:

sending, by a session management network element, session management information to an access network device in a first network, wherein the session management information requests to set up a user plane tunnel for a voice service of a terminal device, and the first network is a fifth-generation (5G) network;

receiving, by the session management network element, indicating information from the access network device, wherein the indicating information indicates that setup of the user plane tunnel of the voice service is rejected;

determining, by the session management network element, that the terminal device has handed over from the first network to a second network, wherein the second network is a fourth generation (4G) network; and setting up, by the session management network element, the user plane tunnel for the voice service in the second network; and wherein the session management network element is a network element having both a session management function in the first network and a packet data network gateway-control plane function in the second network.

6. The method according to claim 5, wherein determining, by the session management network element, that the terminal device has handed over from the first network to the second network comprises:

setting, by session management network element, a timer when the indicating information is received from the access network device; and determining, by the session management network element, that the terminal device has handed over from the first network to the second network when the timer times out.

7. The method according to claim 5, wherein the indicating information indicates that the terminal device is performing a handover process.

8. An apparatus, comprising:

a non-transitory memory storing computer readable instructions; and at least one processor configured to execute the instructions to cause the apparatus to:

send session management information to an access network device in a first network, wherein the session management information requests to set up a user plane tunnel for a voice service of a terminal device, and the first network is a fifth-generation (5G) network;

receive indicating information from the access network device, wherein the indicating information indicates that setup of the user plane tunnel of the voice service is rejected;

determine that the terminal device has handed over from the first network to a second network, wherein the second network is a fourth generation (4G) network; and set up the user plane tunnel for the voice service in the second network; and wherein the apparatus is a network element having both a session management function in the first network and a packet data network gateway-control plane function in the second network.

9. The apparatus according to claim 8, wherein the at least one processor being configured to execute the instructions to cause the apparatus to determine that the terminal device has handed over from the first network to a second network comprises the at least one processor being configured to execute the instructions to cause the apparatus to:

set a timer when the indicating information is received from the access network device; and determine that the terminal device has handed over from the first network to the second network when the timer times out.

10. The apparatus according to claim 8, wherein the indicating information indicates that the terminal device is performing a handover process.

11. A system, comprising:

a session management network element, configured to send session management information to an access network device in a first network, wherein the session management information requests to set up a user plane tunnel for a voice service of a terminal device, and the first network is a fifth-generation (5G) network; and the access network device, configured to:

send a handover request to a mobility management network element in the first network based on the session management information when the voice service cannot be performed in the first network, wherein the handover request requests to hand over the terminal device from the first network to a second network, and the second network is a fourth generation (4G) network; and send indicating information to the session management network element, wherein the indicating information indicates that setup of the user plane tunnel of the voice service is rejected; and wherein the session management network element is further configured to:

determine that the terminal device has handed over from the first network to a second network; and set up the user plane tunnel for the voice service in the second network; and wherein the session management network element is a network element having both a session management function in the first network and a packet data network gateway-control plane function in the second network.

12. The system according to claim 11, wherein, the session management network element is configured to set a timer when the indicating information is received from the access network device; and to determine that the terminal device has handed over from the first network to the second network when the timer times out.

13. The system according to claim 11 wherein indicating information indicates that the terminal device is performing a handover process.

14. The system according to claim 11, wherein the access network device is configured to send the handover request to the mobility management network element in the first network based on the session management information when a condition is satisfied, wherein the condition comprises:

the first network does not support an internet protocol multimedia subsystem (IMS) voice service, the first network supports movement of the terminal device to the second network, and the second network supports a voice service of a packet switched (PS) domain.

15. A non-transitory computer readable storage medium storing instructions that are executable by at least one processor, the instructions comprising instructions for, when the instructions are executed, causing an apparatus to:

sending session management information to an access network device in a first network, wherein the session management information requests to set up a user plane tunnel for a voice service of a terminal device, and the first network is a fifth-generation (5G) network;

receiving indicating information from the access network device, wherein the indicating information indicates that setup of the user plane tunnel of the voice service is rejected;

determining that the terminal device has handed over from the first network to a second network, wherein the second network is a fourth generation (4G) network; and setting up the user plane tunnel for the voice service in the second network; and wherein the apparatus is a network element having both a session management function in the first network and a packet data network gateway-control plane function in the second network.

16. The non-transitory computer readable storage medium according to claim 15, wherein determining that the terminal device has handed over from the first network to the second network comprises:

setting a timer when the indicating information is received from the access network device; and determining that the terminal device has handed over from the first network to the second network when the timer times out.

17. The non-transitory computer readable storage medium according to claim 15, wherein the indicating information indicates that the terminal device is performing a handover process.

* * * * *